(12) United States Patent
Machado et al.

(10) Patent No.: US 8,229,809 B2
(45) Date of Patent: Jul. 24, 2012

(54) SYSTEM AND METHOD FOR USE IN MANAGEMENT OF FINANCIAL ASSETS

(75) Inventors: Manuel A. Machado, Newington, CT (US); Marino Monti, Jr., Cheshire, CT (US); Susan A. Rickard, West Suffield, CT (US); Mark A. Strogoff, Ashford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 284 days.

(21) Appl. No.: 12/631,517

(22) Filed: Dec. 4, 2009

(65) Prior Publication Data

US 2011/0106670 A1 May 5, 2011

Related U.S. Application Data

(60) Provisional application No. 61/257,704, filed on Nov. 3, 2009.

(51) Int. Cl.
G07B 17/00 (2006.01)

(52) U.S. Cl. .............. 705/30; 705/37; 705/36 R; 705/39

(58) Field of Classification Search .................... 705/30, 705/39, 40, 44, 14.17–14.18, 37, 335
See application file for complete search history.

(56) References Cited

U.S. PATENT DOCUMENTS

2007/0192254 A1 8/2007 Hinkle
2008/0243713 A1 10/2008 Chiulli et al.

Primary Examiner — Vanel Frenel
(74) Attorney, Agent, or Firm — Howard IPLaw Group, PC

(57) ABSTRACT

A computer system has a processor; and a memory storage device in communication with the processor. The processor is configured, in a business cycle, to access fund expense calculation data and perform verification of the fund expense calculation data; receive data indicative of prices of the funds, perform verification with respect to the received price data; after completion of verification of the fund price data, receive data indicative of trades, perform verification on the received trade data; after completion of verification of the trade data, provide output signals indicative of instructions for execution of trades consistent with the verified price and trade data; based on the trade instructions data, determine instructions for payment in settlement of trades, provide output signals indicative of the instructions for payment; and update accounting ledgers with data from the business cycle.

39 Claims, 58 Drawing Sheets

Fig. 4

THE HARTFORD — 402

Set New Day | Pricing Center | Trading Center | Settlement Center | Accounting Center | Product Center | Contact Center | Maintain Calendar | Reporting Center | Admin Center Home | Help | Logout : A A A Current Date : 04/02/2009

Set New Day
Status
Initiate — 404

Status

Domestic

- Current Valuation Day : 03/30/2009 — 412
- Previous Valuation Day : 03/27/2009 — 414
- Next Valuation Day : 03/31/2009 — 416
- Accrual Arrears Days : 3 — 418
- Accrual Forward Days : 1 — 420
- Production cycle is complete — 422

— 410

Offshore

- Current Valuation Day : 03/30/2009
- Previous Valuation Day : 03/27/2009
- Next Valuation Day : 03/31/2009
- Accrual Arrears Days : 3
- Accrual Forward Days : 1
- Production cycle is complete

— 450

400

Desktop    My Do    Local Intranet    2:52 AM Thursday
         My Co

Status

Current valuation dates for domestic and offshore cycles have been submitted

Domestic

| | | |
|---|---|---|
| Current Valuation Day | : | 03/02/2009 |
| Previous Valuation Day | : | 02/27/2009 |
| Next Valuation Day | : | 03/03/2009 |
| Accrual Arrears Days | : | 3 |
| Accrual Forward Days | : | 1 |

Production cycle is in progress — 702

Offshore

| | | |
|---|---|---|
| Current Valuation Day | : | 03/02/2009 |
| Previous Valuation Day | : | 02/27/2009 |
| Next Valuation Day | : | 03/03/2009 |
| Accrual Arrears Days | : | 3 |
| Accrual Forward Days | : | 1 |

Production cycle is in progress — 704

THE HARTFORD — 902

Set New Day | Pricing Center | Trading Center | Settlement Center | Accounting Center | Product Center | Contact Center | Maintain Calendar | Reporting Center | Admin Center Home | Help | Logout  A A A ▶ Domestic ▸ Fund Pricing Status
▸ Pricing Entry
  NAVs/Rates
  Market Indices
  Externals
▸ QA
  Exhibit 1
  Exhibit 2
  Exhibit 3
  Exhibit 4
▸ Release
  Early Distribution
  Release
  Smart Release ▶ Offshore Fund Pricing Status — 915

Current Valuation Date: 03/31/2009
Current Date: 04/03/2009
Print — 935

NAV — 910
From All Vendors         32.15%
From Partial Vendors     31.66%
Manual Input             36.19%
Complete                 100.0%
Missing                  0.0%

DAILY ACCRUALS — 930
From All Vendors         22.45%
From Partial Vendors     34.01%
Manual Input             43.54%
Complete                 100.0%
Missing                  0.0%

MARKET INDICES / EXTERNALS — 920
Market Indices Status    COMPLETE
Externals Status         COMPLETE

UNIVERSAL VARIANCES — 940
Exhibit 1    0
Exhibit 2    0
Exhibit 3    0
Exhibit 4    0

WOODBURY STATUS — 950
No. of Files Expected (2)
No. of Files Received (2)
No. of Files Processed Unsuccessfully (0)

Done | Local Intranet

THE HARTFORD  
Home | Help | Logout A A A

Set New Day | Pricing Center | Trading Center | Settlement Center | Accounting Center | Product Center | Contact Center | Maintain Calendar | Reporting Center | Admin Center ▽ Domestic  
  ▷ Fund Pricing Status  
  ▷ Pricing Entry  
    NAVs/Rates  
    Market Indices  
    Externals  
  ▷ QA  
    Exhibit 1  
    Exhibit 2  
    Exhibit 3  
    Exhibit 4  
  ▷ Release  
    Early Distribution  
    Release  
    Smart Release  
▷ Offshore

Vendor Mismatch Report

Current Valuation Date: 03/12/2009  
Current Date: 04/06/2009  
Print

Early Distribution [Select Early Distribution ▽]  Pricing Type [NAV ▽]

Fund Company Name [All ▽]  Fund Company Code [Daily Accrual / Dividend / Capital Gain ▽]  Status [All Verified Variances ▽] [Go]

| Fund Company Code | Fund Company Name | Class | Fund Price Code | Accrual Days | CUSIP/ISIN | Ticker | Source | NAV | UIT |
|---|---|---|---|---|---|---|---|---|---|
| ACI | American Century Investors, Inc. | INV | TUUU | 1 | 025083882 | TWCUX | VIPSTAR | 12.62 | ☑ |
|  |  |  |  |  |  |  | VMS | 13.04 | ☑ |
| FAC | Fred Alger and Company | O | AUCU | 1 | 015544505 | AAGOX | VIPSTAR | 24.08 | ☑ |
|  |  |  |  |  |  |  | VMS | 24.84 | ☑ |
| JAN | Janus Aspen Series Funds | SRV | 4NNU | 1 | 471021691 | N/A | VIPSTAR | 22.49 | ☑ |
|  |  |  |  |  |  |  | VMS | 22.77 | ☑ |
| PCM | Putnam Variable Trust Funds | IA | PUGU | 1 | 746896208 | N/A | VIPSTAR | 9.56 | ☑ |
|  |  |  |  |  |  |  | VMS | 9.55 | ☑ |
|  | Putnam Variable |  |  |  |  |  | VIPSTAR | 6.69 |  |

Number of rows returned [7]

1610, 1620, 1622

Done — Local Intranet

THE HARTFORD

| Set New Day | Pricing Center | Trading Center | Settlement Center | Accounting Center | Product Center | Contact Center | Maintain Calendar | Reporting Center | Admin Center |

Home | Help | Logout  A A A

Release Prices

Current Valuation Date: 03/31/2009
Current Date: 04/03/2009
Print

▷ Domestic
▷ Fund Pricing Status
▷ Pricing Entry
   NAVs/Rates
   Market Indices
   Externals
▷ QA
   Exhibit 1
   Exhibit 2
   Exhibit 3
   Exhibit 4
▷ Release
   Early Distribution
   Release
   Smart Release
▷ Offshore ☐ VISTA
☐ FARS
☐ Hartford Life Private Placement
☐ ICM
☐ LIDP
☐ OMNI-Group Annuities
☐ Policylink
☐ Repetitive Payment System

| Status | Time Stamps |
|---|---|
| SLA Regular Release Acknowledged | Apr. 3, 2009 9:53 AM |
| SLA Regular Release Completed | Apr. 2, 2009 5:43 PM |
| SLA Regular Release Initiated | Apr. 2, 2009 5:33 PM |

THE HARTFORD

| Set New Day | Pricing Center | Trading Center | Settlement Center | Accounting Center | Product Center | Contact Center | Maintain Calendar | Reporting Center |

Home | Help | Logout  A A A

Admin Center

▽ Domestic
  ▷ SLA Trade Activity
    Monitor Trade Activity
    Maintain Trade Activity
    Threshold
  ▷ Supplemental Trade Activity
  ▷ Transfer Agent Trade Activity
  ▷ NSCC
    Override NSCC File Times
    On Demand NSCC Activity
    Void NSCC Timestamps
    Test Trade Transaction
  ▷ Trade Sheets
  ▷ Trade Report Acknowledge
  ▷ Reverse Duplicate Trade ▷ Offshore Supplemental Trade Activity — 2420

Current Valuation Date: 03/31/2009
Current Date: 04/03/2009
Print — 2440

| Supplemental File | File | Status |
|---|---|---|
| FARS | Not Processed | Not Available |
| ILAD | Not Processed | Available Import |
| OMNI | Not Processed | Available Import |
| PLK | Not Processed | Not Available |
| RPS | Not Processed | Available Import |

— 2430

— 2410

Done    Local Intranet

| | | | | | | | | | Home | Help | Logout   A A A |
|---|---|---|---|---|---|---|---|---|---|

THE
HARTFORD

| Set New Day | Pricing Center | Trading Center | Settlement Center | Accounting Center | Product Center | Contact Center | Maintain Calendar | Reporting Center | Admin Center |
|---|---|---|---|---|---|---|---|---|---|

Process Daily Trade - Process On Demand NSCC Activity

Current Valuation Date: 03/31/2009
Current Date: 04/03/2009
Print

▷ Domestic
 ▷ SLA Trade Activity
    Monitor Trade Activity
    Maintain Trade Activity Threshold
 ▷ Supplemental Trade Activity
 ▷ Transfer Agent Trade Activity
 ▷ NSCC
    Override NSCC File Times
    On Demand NSCC Activity
    Void NSCC Timestamps
    Test Trade Transaction
 ▷ Trade Sheets
 ▷ Trade Report Acknowledge
 ▷ Reverse Duplicate Trade
 ▷ Corrections And Adjustments ▷ Offshore

| Run Time | Type | Status | Record Count |
|---|---|---|---|
| 06:17PM | Scheduled | COMPLETE | 20579 |
| 5:00 AM | Scheduled | NOT AVAILABLE | 0 |

[ Initiate On Demand NSCC File ] ← 2920

THE HARTFORD

| Set New Day | Pricing Center | Trading Center | Settlement Center | Accounting Center | Product Center | Contact Center | Maintain Calendar | Reporting Center |

Home | Help | Logout  A A A

Current Valuation Date: 03/31/2009
Current Date: 04/03/2009
Print

Admin Center

▷ Domestic — Void NSCC Timestamps
   SLA Trade Activity
   Monitor Trade Activity
   Maintain Trade Activity Threshold
  ▷ Supplemental Trade Activity   ● Void NSCC Files
  ▷ Transfer Agent Trade Activity   ○ Void Mutual Fund Companies
  ▷ NSCC
   Override NSCC File Times   Select   Mutual Fund Company
   On Demand NSCC Activity   ☐
   Void NSCC Timestamps   ☐  Putnam Funds
   Test Trade Transaction   ☐  Fidelity VIP Funds
   Trade Sheets   ☐  UBS Retail Global Asset Mgmt
   Trade Report Acknowledge   ☐  Eaton Vance Funds
   Reverse Duplicate Trade   ☐  The Royce Funds
     ☐  American Beacon
▷ Offshore   ☐  Allegiant All ▽ — 3120

Save

THE HARTFORD

Set New Day | Pricing Center | Trading Center | Settlement Center | Accounting Center | Product Center | Contact Center | Maintain Calendar | Reporting Center Admin Center ▽ Domestic Generate Wire ▷ Offshore Home | Help | Logout A A A Current Valuation Date: 03/31/2009
Current Date: 04/03/2009
Print Create Cash Forecast and Wire Instructions ⌐ 4920

Initial Wires process must have been initiated first

Initial | Supplemental | Reprint | Refresh & Rerun

Settlement Date : 04/01/2009 ⌐ 4930

[ Generate Wire Instructions ]

*Fig. 49*

THE
HARTFORD

| Set New Day | Pricing Center | Trading Center | Settlement Center | Accounting Center | Product Center | Contact Center | Maintain Calendar | Reporting Center |

Home | Help | Logout  A A A

Admin Center

▽ Domestic

Generate Wire

▷ Offshore

Create Cash Forecast and Wire Instructions ⌒ 5220

Current Valuation Date: 03/31/2009
Current Date: 04/03/2009
Print

Generate Wire Instructions has been completed

| Initial | Supplemental | Reprint | Refresh & Rerun

Settlement Date : 04/01/2009

[ Generate Wire Instructions ]

Done     Local Intranet

SYSTEM AND METHOD FOR USE IN MANAGEMENT OF FINANCIAL ASSETS

RELATED APPLICATION

This application is based on and claims benefit of and priority to U.S. Provisional Patent Application Ser. No. 61/257,704 filed on Nov. 3, 2009, the contents of which are hereby incorporated by reference herein in their entirety for all purposes.

FIELD OF INVENTION

The present invention relates to computer systems, and particularly to computer systems for use in the management of financial assets.

BACKGROUND

In the field of management of financial assets, numerous calculations must be carried out on a daily basis in order to determine accurate holdings of clients, process trades, and provide accurate financial reporting, among other needs. By way of non-limiting example, for an insurance company that provides life insurance products, including annuities, having assets invested in a holder s selection of funds, there are numerous daily calculations. Fractional fees, such as mortality and expense fees, rider fees, and management fees, are based on net asset value on a daily basis, such as 360 days per year, and must be calculated daily and deducted from account values. Daily variations in net asset values of funds must be received and made available for reporting to clients as well as being used in various calculations. Instructions from clients to move funds from one investment vehicle to another must be converted into trade instructions that can be executed by brokers and clearinghouses. Funds must be transferred to and from company bank accounts in appropriate amounts in settlement of trading transactions. Financial reporting for client records, corporate record keeping and regulatory oversight must be performed based on information including values and holdings of funds and securities.

Problems that are encountered in the administration of these systems include assuring that all transactions are completed in a timely and accurate manner. For example, as prices of securities and net asset values of funds vary on a daily basis, any delay or errors in executing trades and reconciling payments may result in significant losses. Further challenges are encountered in providing timely and accurate data for financial reporting purposes. The creation of records that are sufficiently detailed and reliable for audit purposes is a still further challenge. A further challenge is integration of these processes with the requirements of other entities, such as fund companies and investment managers. Some entities may perform some of their own trading functions for example, while others may not. Various entities may employ different electronic and paper standards for data transmission.

SUMMARY

In one embodiment, a computer system includes a processor and a memory storage device in communication with the processor. The processor is configured to perform the following steps on a business day cycle: access a memory storage device having fund expense calculation data, perform verification of the fund expense calculation data and store in one of the memory storage devices verified fund expense data, and store at least a portion of the verified fund expense data in fund expense accounting journals; after completion of verification of the expense calculation data, receive data indicative of prices of the funds, perform verification with respect to the received price data, store the verified price data in one or more of the memory storage devices, and store at least a portion of the verified price data in fund price accounting journals; after completion of verification of the fund price data, receive data indicative of trades, perform verification on the received trade data, store verified trade data in at least one of the memory devices, and store at least a portion of the verified trade data in trade accounting journals; after completion of verification of the trade data, provide output signals indicative of instructions for execution of trades consistent with the verified price and trade data, and store at least a portion of the trade execution instructions data in trade instructions accounting journals; based on the trade instructions data, determine instructions for payment in settlement of trades, provide output signals indicative of the instructions for payment in settlement of trades, and store data comprising at least a portion of the instructions for payment in settlement of trades in settlement accounting journals; and access accounting ledgers stored in one or more of the memory storage devices and update the accounting ledgers with data from the accounting journals.

In an embodiment, a computer system includes a processor; and a memory storage device in communication with the processor. The processor is configured to perform the following steps on a business day cycle: access a memory storage device having fund expense calculation data, perform verification of the fund expense calculation data and store in one of the memory storage devices verified fund expense data; after completion of verification of the expense calculation data; receive data indicative of prices of the funds, perform verification with respect to the received price data, store the verified price data in one or more of the memory storage devices; after completion of verification of the fund price data, receive data indicative of trades, perform verification on the received trade data, store verified trade data in at least one of the memory devices; after completion of verification of the trade data, provide output signals indicative of instructions for execution of trades consistent with the verified price and trade data; based on the trade instructions data, determine instructions for payment in settlement of trades, provide output signals indicative of the instructions for payment in settlement of trades; and access accounting ledgers stored in one or more of the memory storage devices and update the accounting ledgers in accordance with data from the business day cycle.

In an embodiment, a computer-implemented method includes accessing by a processor a memory storage device having fund expense calculation data, performing verification of the fund expense calculation data and storing in a memory storage device verified fund expense data; after completion of verification of the expense calculation data, receiving by the processor data indicative of prices of the funds, performing by the processor verification with respect to the received price data, and storing by the processor the verified price data in one or more of the memory storage devices; after completion of verification of the fund price data, receiving by the processor data indicative of trades, performing by the processor verification of the received trade data, and storing by the processor the verified trade data in at least one memory device; after completion of verification of the trade data, providing by the processor output signals indicative of instructions for execution of trades consistent with the verified price and trade data; based on the trade instructions data, determining by the processor instructions for payment in settlement of trades and providing output signals indicative of the instructions for payment in settlement of trades; and accessing by the processor accounting ledgers stored in one or more of the memory storage devices and updating the accounting ledgers in accordance with data from a business day cycle.

In an embodiment, a computer-readable medium has instructions thereon, which instructions, when executed by a processor, cause the processor to: access a memory storage device having fund expense calculation data, perform verification of the fund expense calculation data and store in one of the memory storage devices verified fund expense data; after completion of verification of the expense calculation data; receive data indicative of prices of the funds, perform verification with respect to the received price data, store the verified price data in one or more of the memory storage devices; after completion of verification of the fund price data, receive data indicative of trades, perform verification on the received trade data, store verified trade data in at least one of the memory devices; after completion of verification of the trade data, provide output signals indicative of instructions for execution of trades consistent with the verified price and trade data; based on the trade instructions data, determine instructions for payment in settlement of trades, provide output signals indicative of the instructions for payment in settlement of trades; and access accounting ledgers stored in one or more of the memory storage devices and update the accounting ledgers in accordance with data from a business day cycle.

In an embodiment, a computer system for management of financial data relating to funds holding investments includes: an expense module for accessing fund expense calculation data, performing verification of the fund expense calculation data and storing the verified fund expense data in a memory storage device; a pricing module for receiving data indicative of prices of the funds, performing verification with respect to the received price data, and storing the verified price data in one or more memory storage devices; a trading module for receiving data indicative of trades, performing verification on the received trade data, storing verified trade data in at least one of the memory devices, and for providing output signals indicative of instructions for execution of trades consistent with the verified price and trade data; a settlement module for accessing the trade instructions data, determining instructions for payment in settlement of trades consistent with the trade instructions data, and providing output signals indicative of the instructions for payment in settlement of trades; and an accounting module for accessing accounting ledgers stored in one or more of the memory storage devices and updating the accounting ledgers in accordance with data from a business day cycle.

In an embodiment, a computer system for management of financial data relating to funds holding investments includes: an expense module for accessing fund expense calculation data, performing verification of the fund expense calculation data and storing the verified fund expense data in a memory storage device; a pricing module for receiving data indicative of prices of the funds, performing verification with respect to the received price data, and storing the verified price data in one or more memory storage devices; a settlement module for accessing data indicative of instructions for execution of trades, determining instructions for payment in settlement of trades consistent with the trade instructions data, and providing output signals indicative of the instructions for payment in settlement of trades; and an accounting module for accessing accounting ledgers stored in one or more of the memory storage devices and updating the accounting ledgers in accordance with data from a business day cycle.

In an embodiment, a computer system for management of financial data relating to funds holding investments includes: an expense module for accessing fund expense calculation data, performing verification of the fund expense calculation data and storing the verified fund expense data in a memory storage device; a pricing module for receiving data indicative of prices of the funds, performing verification with respect to the received price data, and storing the verified price data in one or more memory storage devices; a trading module for receiving data indicative of trades, performing verification on the received trade data, storing verified trade data in at least one of the memory devices, and for providing output signals indicative of instructions for execution of trades consistent with the verified price and trade data; and an accounting module for accessing accounting ledgers stored in one or more of the memory storage devices and updating the accounting ledgers in accordance with data from a business day cycle.

BRIEF DESCRIPTION OF THE FIGURES

FIG. 4 is an exemplary set new day status screen displayed to a user according to an embodiment.

FIG. 5 is an exemplary set new day domestic screen displayed to a user according to an embodiment.

FIG. 6 is an exemplary screen prompting a user to indicate whether a current day is to be designated a product add/update day displayed to a user according to an embodiment.

FIG. 7 is an exemplary screen showing a set new day process status displayed to a user according to an embodiment.

FIG. 8 is an exemplary screen showing a calendar for use in the set new day process displayed to a user according to an embodiment.

FIG. 9 is an exemplary fund pricing status screen displayed to a user according to an embodiment.

FIG. 10 is an exemplary screen in a fund pricing process showing a listing of fund companies displayed to a user according to an embodiment.

FIG. 11 is an exemplary screen in a fund pricing process showing fund data displayed to a user according to an embodiment.

FIG. 12 is an exemplary screen providing additional information regarding a selected market index displayed to a user according to an embodiment.

FIG. 13 is an exemplary screen providing external index values displayed to a user according to an embodiment.

FIG. 14 is an exemplary screen showing fund company data with verification data displayed to a user according to an embodiment.

FIG. 15 is an exemplary screen showing a mutual fund to sub account ratio of return comparison report displayed to a user according to an embodiment.

FIG. 16 is an exemplary screen showing an external pricing vendor mismatch report displayed to a user according to an embodiment.

FIG. 17 is an exemplary screen showing a report of daily accrual tolerance displayed to a user according to an embodiment.

FIG. 18 is an exemplary screen prompting a user to authorize furnishing price data to selected recipients displayed to a user according to an embodiment.

FIG. 19 is an exemplary screen prompting a user to authorize furnishing a portion of price data to selected recipients displayed to a user according to an embodiment.

FIG. 20 is an exemplary screen prompting a user to release complete price data to selected recipients displayed to a user according to an embodiment.

FIG. 23 is an exemplary screen showing selected trading file records displayed to a user according to an embodiment.

FIG. 24 is an exemplary screen showing the status of supplemental trade activity files displayed to a user according to an embodiment.

FIG. 25 is an exemplary screen displaying data relating to supplemental trade activity files displayed to a user according to an embodiment.

FIG. 27 is an exemplary screen prompting the user to provide data for files to be transmitted to transfer agents displayed to a user according to an embodiment.

FIG. 28 is an exemplary screen displaying confirmation of trade activity displayed to a user according to an embodiment.

FIG. 29 is an exemplary screen showing status of NSCC file transfers displayed to a user according to an embodiment.

FIG. 30 is an exemplary screen showing updated status of NSCC file transfers displayed to a user according to an embodiment.

FIG. 31 is an exemplary screen prompting a user to void certain timestamps displayed to a user according to an embodiment.

FIG. 32 is an exemplary screen showing further status of exemplary NSCC file transfers displayed to a user according to an embodiment.

FIG. 33 is an exemplary screen providing a user an option of voiding files associated with a certain timestamp displayed to a user according to an embodiment.

FIG. 34 is an exemplary screen providing a user a display for entry of NSCC test data for trade transactions displayed to a user according to an embodiment.

FIG. 35 is an exemplary screen showing an error message related to NSCC test data for trade transactions displayed to a user according to an embodiment.

FIG. 36 is an exemplary screen showing a message related to NSCC test data for trade transactions displayed to a user according to an embodiment.

FIG. 37 is an exemplary screen prompting a user for instructions for generation of trade sheets displayed to a user according to an embodiment.

FIG. 38 is an exemplary screen illustrating a message related to generation of trade sheets displayed to a user according to an embodiment.

FIG. 39 is an exemplary screen prompting a user to enter adjusted values related to generation of trade sheets displayed to a user according to an embodiment.

FIG. 40 is an exemplary screen showing a system-corrected adjusted related to generation of trade sheets displayed to a user according to an embodiment.

FIG. 41 is an exemplary screen showing an error message related to generation of trade sheets displayed to a user according to an embodiment.

FIG. 42 is an exemplary screen prompting a user to provide an instruction for generation of supplemental trade sheets displayed to a user according to an embodiment.

FIG. 43 is an exemplary screen identifying generated supplemental trade sheets displayed to a user according to an embodiment.

FIG. 44 is an exemplary screen prompting a user to delete and regenerate trade sheets displayed to a user according to an embodiment.

FIG. 45 is an exemplary screen providing a message related to regeneration of trade sheets displayed to a user according to an embodiment.

FIG. 46 is an exemplary screen relating to a process for reversing duplicate trades displayed to a user according to an embodiment.

FIG. 47 is an exemplary screen listing reports generated associated with a trading process displayed to a user according to an embodiment.

FIG. 48 is an exemplary screen prompting a user to generate wiring instructions in a settlement process displayed to a user according to an embodiment.

FIG. 49 is an exemplary screen indicating an error message reflecting application of a rule in a settlement process displayed to a user according to an embodiment.

FIG. 52 is an exemplary screen indicating a message reporting generation of wire instructions in a settlement process displayed to a user according to an embodiment.

FIG. 53 is an exemplary screen indicating a message reporting generation of supplemental wire instructions in a settlement process displayed to a user according to an embodiment.

FIG. 54 is an exemplary screen displaying times of generation of wire instructions in a settlement process displayed to a user according to an embodiment.

FIG. 55 is an exemplary screen displaying a message as to report status in a settlement process displayed to a user according to an embodiment.

FIG. 56 is an exemplary screen prompting a user to provide instructions to delete existing wire instructions and generate new wire instructions displayed to a user according to an embodiment.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for performing administration and accounting functions for investment management.

In an embodiment, a system includes separate modular components that perform functions including expense calculation, pricing, trading and settlement. Each process may include writing data to accounting journals so that data can be transferred readily to accounting programs for financial reporting purposes. The system applies rules that require each sequential process on each business day to be completed and verified before launching the next process. In an embodiment, separate modular processes are executed in the following order: set new day process; expense calculation process; pricing process; pre-trade process; trading process; settlement process; accounting process, and reporting process. Each process may be modular in that each process is performed by a processor executing distinct instructions contained in computer-readable code, and that the outputs and inputs for each process are in a predetermined data format. In an embodiment, each user action may be recorded by user, the action and a transaction type code in a transaction log; errors may also be stored in the transaction log; this transaction log serves the purpose of permitting auditing. Each action is logged; any rule violations are identified to users and must be verified or corrected. User verifications are recorded in the transaction log.

Figure 1:
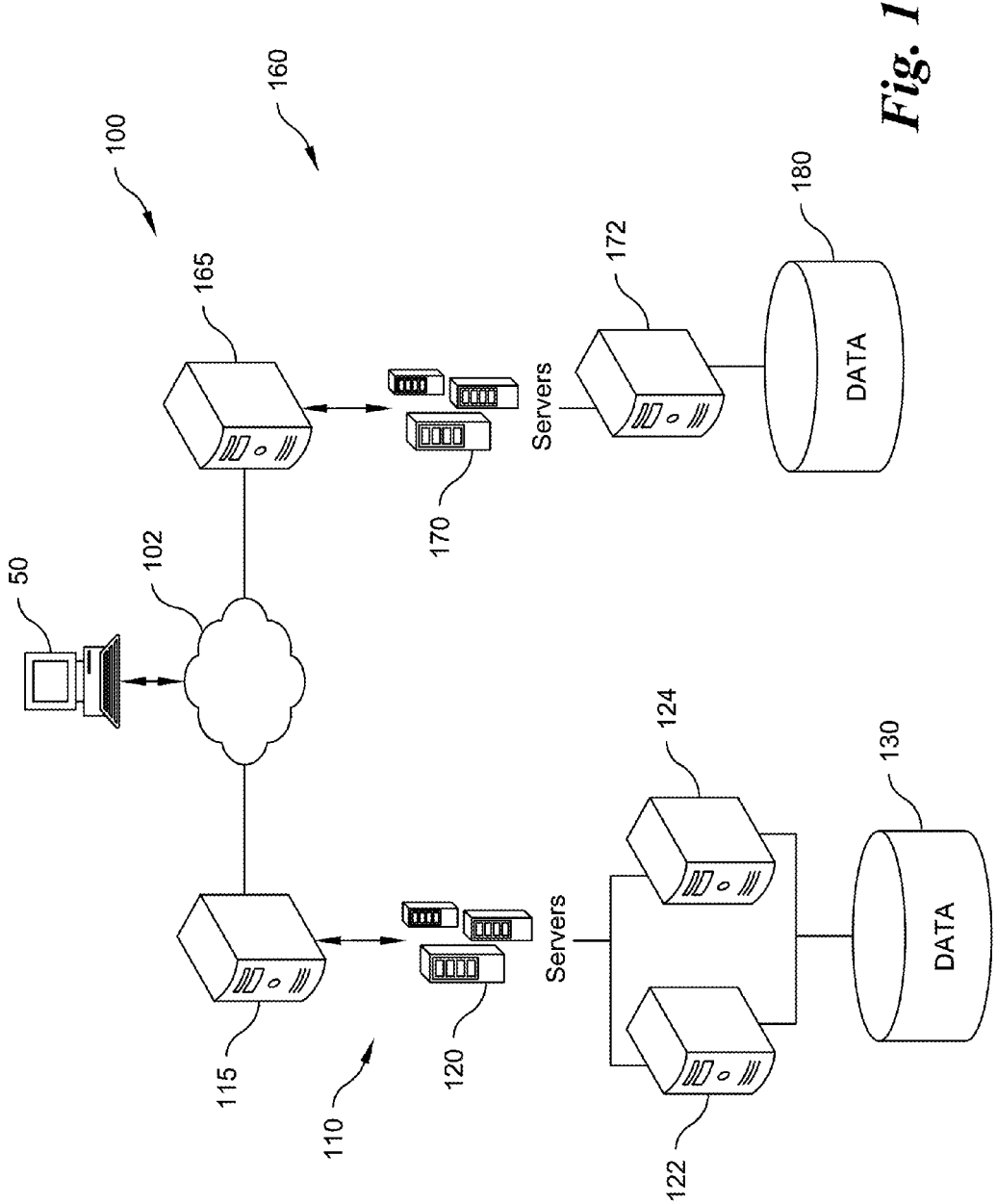
FIG. 1 is a schematic diagram of an exemplary computer system for implementation of a method and system of the invention.

Referring to FIG. 1, an exemplary computer system 100 for use in implementing a method and system according to an embodiment of the network configuration is shown. User computer system 50 accesses computer system 100 via network 102. Network 100 may be or include any type of network, including a local area network (LAN), a wide area network (WAN), an intranet, the Internet, a public switched telephone network (PSTN) or other network. Network 100 may employ any suitable data protocols. User computer system 50 is exemplary of computer systems that may exchange data with computer system 100.

Computer system 100 includes primary production environment 110 and secondary or recovery environment 160. Primary production environment 110 interfaces with network 102 via production load balancer 115. Production load balancer 115 may be any suitable server running load balancing software. Production load balancer 115 interfaces with and balances the computing load of servers 120. In an environment, production load balancer may employ Internet protocol (IP) address aliasing to map IP addresses to differing servers. Servers 120 may constitute a server farm. Processors of the servers 120 may access computer-readable media of the servers 120 and execute instructions stored in the computer-readable media to perform steps of methods of the invention. Servers 120 access, via database servers 122, 124, datastore 130. Database server 122 may serve as a primary production database server, and database server 124 may serve as a secondary production database server. Mirroring is performed for database servers 122, 124, such that, in normal operation, both database servers 122, 124 are performing mirrored operations. In the event of a failure of primary production database server 122, the operations are not seamlessly shifted to secondary database server 124. Instead, jobs that were in process at the time of the failure are rolled back. The records that have been altered as a result of any jobs in process at the time of the failure are returned to their values immediately prior to the commencement of processing any in-process jobs. Once both database servers 122, 124 are operational, normal processing resumes with the jobs that were in process at the time of the failure.

Data store 130 may be maintained in any suitable hardware storage, using any suitable database organization. By way of example, a storage area network (SAN) may be employed.

Recovery environment 160 may be physically located distant from primary production environment 110. Load balancing server 165 may communicate with network 102 and provide load balancing services for server farm 170. Server farm 170 may duplicate the functions of server farm 120. Server farm 170 may communicate with database 180 via recovery database server 172. Database 180 may be implemented as a SAN, for example.

In embodiments, a firewall unit may be interposed between system 50 and WAN 102 to provide data security services. In embodiments, system 50 may be linked to WAN 102 via a network or data processing network, which may include a plurality of individual networks, such as a wireless network and a landline based network, each of which may include a plurality of servers, individual workstations or personal computers. Additionally, as those skilled in the art will appreciate, one or more LANs may be included where a LAN may comprise a plurality of intelligent workstations coupled to a host processor. The networks may also include mainframe computers or servers, such as a gateway computer or application server. A gateway computer serves as a point of entry into each network. The gateway may be preferably coupled to another network by means of one or more communications links. The gateway may also be directly coupled to one or more workstations using a communications link. The gateway computer may also be coupled to a storage device for storing data. Further, the gateway may be directly or indirectly coupled to one or more workstations. Those skilled in the art will appreciate that the gateway computer may be located geographically remote from the network, and similarly, the workstations may be located geographically remote from the networks and/or network servers. The client devices or workstations may connect to the wireless network using a networking protocol such as the Transmission Control Protocol/Internet Protocol ("TCP/IP") over a number of alternative connection media, such as cellular phone, radio frequency networks, satellite networks, etc. The wireless network may connect to the gateway using a network connection a such as TCP (Transmission Control Protocol) or UDP (User Datagram Protocol) over IP, X.25, Frame Relay, ISDN (Integrated Services Digital Network), PSTN (Public Switched Telephone Network), etc.

Communication between system 100 and other devices and systems, including systems of fund companies, customers, vendors, internal financial and reporting systems, banks, and others, may be accomplished via any suitable computer network, telephone systems, fax, or other systems. Firewall units, which may be stand alone computer devices having one or more processors and memory devices may be provided to provide various tasks related to providing firewall services, such as identifying malicious code and taking appropriate steps to remove the code or isolate data containing the malicious code. Firewall units may also perform services related to authentication of credentials presented by users, translation of data between formats, routing of data, and calling of services. Firewall units may accordingly serve as authentication modules to permit users to login to system 100. In embodiments, system 100 may permit a single login to access all functions, or may require multiple logins for various services.

Servers may include one or more processors and memory devices having code stored therein, which code, when executed by a processor, causes the processor to perform functions including. The term module, as used herein, includes computer hardware, including processors and memory devices, having loaded program code causing the processor and other devices to perform particular functions.

Figure 2:
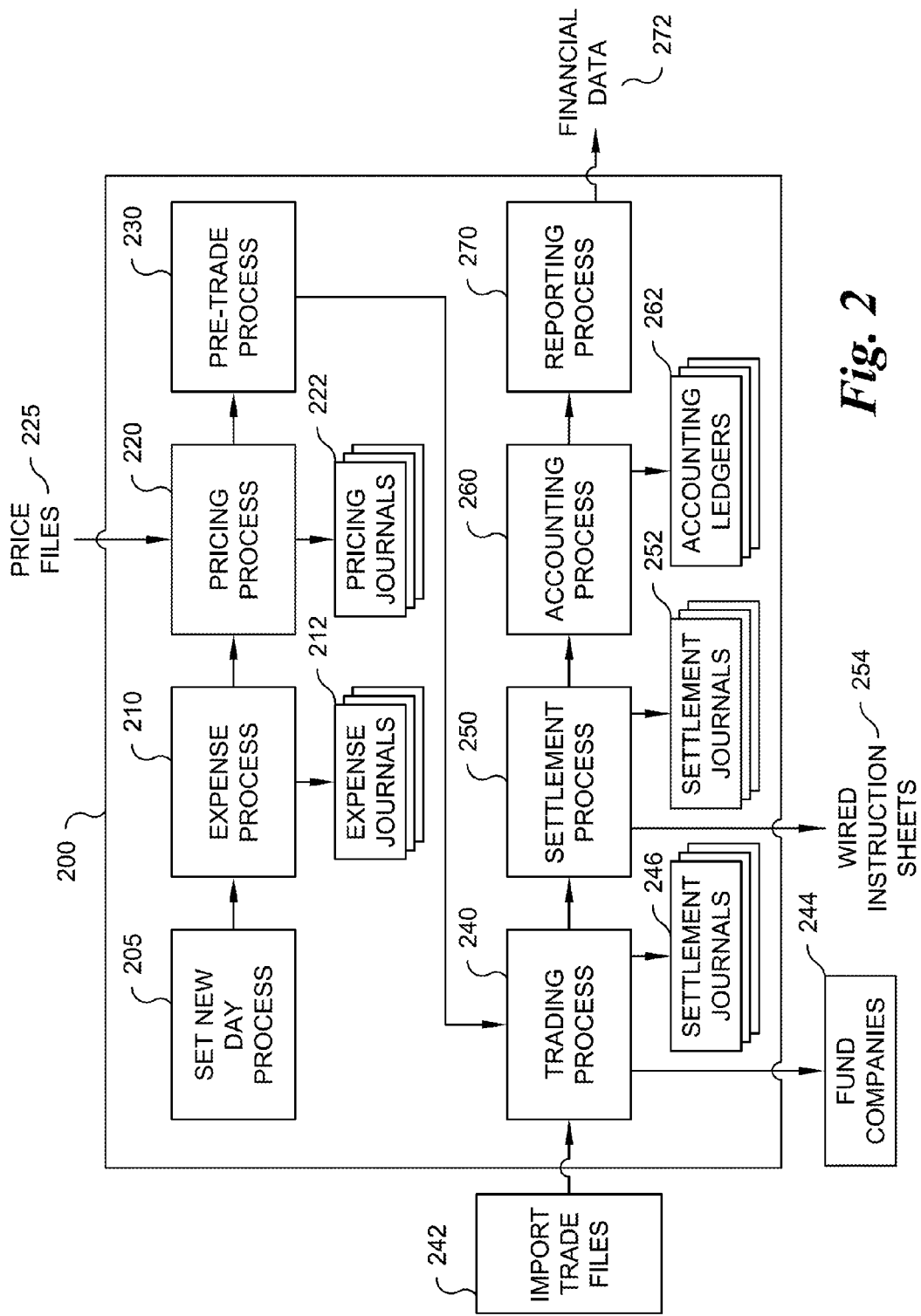
FIG. 2 is a schematic diagram of components of a system according to an embodiment.

Referring now to FIG. 2, components of a system that that may be implemented on server farm 120 of FIG. 1 will be described at a high level. Block 200 includes major functional components. Each functional component may be implemented in software, such as in one or more modules. In an implementation, the functional components of block 200 operate on a periodic basis, such as on each business day or each trading day. Separate functional components may be described herein as processes. Each process may be executed using one or more software modules executing serially and/or in parallel on one or more processors in a server farm 120. Each process may be understood as one or more general purpose computers that load and execute software containing instructions, thereby functioning as special purpose computer systems. Execution in server farm 120 is merely exemplary. Processes may be executed, depending on throughput requirements and system capacity, on single or multiple processors, and the calculations may be distributed among multiple processors that are physically separate or are physically co-located.

Set New Day Process 205 determines an applicable date for valuation of securities and funds, considering applicable domestic and foreign trading days and holidays. The accurate date is promulgated to all system processes and is consistently used throughout all system processes throughout the cycle of the day, including all date-dependent calculations and all time stamps associated with stored data.

As part of Set New Day Process 205, a determination of accrual days in arrears or forward for expenses for each fund may be made. Expenses on funds are calculated on a daily basis, typically based on an annual percentage of net asset value. The number of days in each year for calculation of expenses is typically 360 or 365. For example, an annual fee, such as a rider fee, of 1% of net asset value, is calculated by multiplying the then-current net asset value by 1/360% throughout the year. As the number of business days in a year is fewer than 360, a protocol must be selected for calculating the fees. For each fund in the system, the data in the system associated with the fund includes whether the fees are to be calculated in arrears or forward. If the fees are to be calculated in arrears, the fees are calculated for a non-business day on the next succeeding business day. If the fees are to be calculated forward the fees are calculated for a non-business day on the last prior business day.

Expense Process 210 is configured to calculate each of the expense categories applicable to each fund held by an investment manager. Expenses are generally calculated on a business day basis as a fractional percentage of a net asset value of holdings of a fund on that business day. The processor executing the Expense Process must, in general terms, access files indicative of applicable charges to each fund account, and access price files for each fund account. Price files are received on a business day basis from sources, including external fund companies, affiliated investment managers, and the like. As each daily fund expense is calculated, the fund expense is stored in memory. The calculated fund expense is also stored in an accounting journal feature of accounting program software running on a processor, such as one or more processors of the server farm. These are represented as expense journals 212. In an embodiment, a ledger feature of an accounting program may receive the calculated fund expenses.

Pricing Process 220 performs operations using price file transmissions 225 received from external systems. Price file transmissions 225 may be electronic files listing fund prices for the applicable day as determined by set new day process 205. Price file transmissions 225 may include price data in other forms, such as structured faxes suitable for scanning and OCR, or other formats. Received prices are entered into suitable records, including accounting files. Internal files containing updated prices are made available for internal record keeping purposes, communication to third parties, such as account owners and their representatives such as brokers and financial planners, regulators and other parties. The pricing data is also stored in accounting journal features of suitable accounting software, creating pricing journals 222.

Pre Trade Process 230 receives and evaluates data relating to fund ownership to determine fund trading requirements. By way of example, data relating to new investments, withdrawals, and investment reallocations by account owners may be processed and may require sales and purchases of underlying funds. The processes result in output files specifying data required by fund managers to execute trades, including identity of fund to be traded, whether the trade is a buy or sell, number of shares or dollar amount, date trade to be executed, and other information. Resulting trade file data is incorporated in accounting books as well as output files.

Trading Process 240 receives data indicative of trades to be executed, such as in the form of trade files prepared by Pre Trade Process 230. Trade files may be received 242 from other sources, such as investment companies, pension funds and the like. Trading Process 240 accesses data concerning data format requirements of fund companies, for example, and provides as outputs trade instructions, in formats specific to fund companies according to requirements of the fund. Outputs may include data in fax trade or NSCC trade formats provided to fund companies 244. Trading Process 240 updates creates trading journals 246 in suitable accounting software to reflect trades.

Settlement process 250 accesses data relating to trades created by Trading Process 240 and Pre Trade Process 230. Based on accessed trade data, including dollar amounts, fund company identities and the like, Settlement Process 250 creates suitably formatted instructions, such as wired instructions sheets 254, for transfers of funds from company accounts, e.g., bank accounts of the company, to fund company accounts, e.g., fund company bank accounts, for settlement purposes. Settlement Process 250 updates settlement accounting journals 252 to reflect the instructions and the deductions from company accounts.

Accounting Process 260 accesses data from the accounting journals, which, as noted, have been updated in accordance with each of the business processes. Using the data accessed from the accounting journals, the accounting process 260 updates accounting ledgers 262 maintained in electronic form.

Report Process 270 processes data from the accounting ledgers, and prepares financial data 272 for transmission to other computer systems that provide financial reporting functionality.

The above processes, and steps in the above processes, are executed only after verification of certain rules. By way of example, a rule may provide that, prior to starting the Expense Process 210, the system must verify that Set New Day Process 205 has been completed. If the system determines that the Set New Day Process has been completed, then Expense Process 210 may proceed. If the system determines that the Set New Day Process has not been completed, then Expense Process 210 will not execute, and a warning or error message may be provided to a user.

Figure 3:
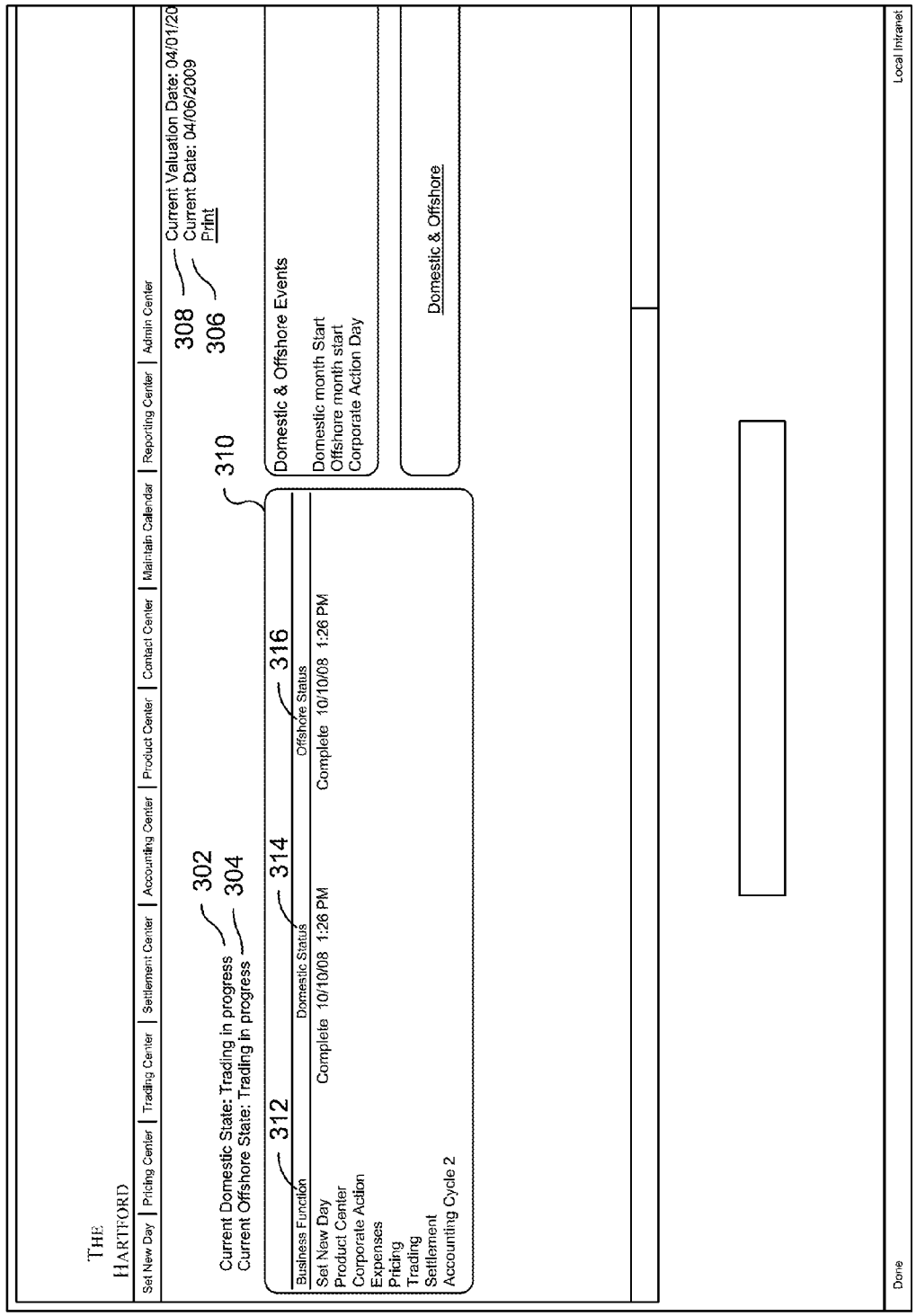
FIG. 3 is an exemplary landing page displayed to a user according to an embodiment.

User interactions in an embodiment of a system will now be explained. In the exemplary screen shots shown below, the user interface employs the Microsoft Internet Explorer browser being executed on a local processor of a client device. In other embodiments, other programs suitable for display of data furnished by a server on a client device may be employed, including by way of example other browser programs, such as Mozilla Firefox, Apple Safari, Google Chrome, Opera, Midori. In an embodiment, a landing page, such as that shown at FIG. 3, is presented to a user after login. The system may monitor and return current states, which may be different for different categories, such as offshore and domestic. The available states may include trading in progress, as shown at 302, 304, or may indicate, for example, a trading holiday. The current date and the current valuation date for funds may be indicated at 306, 308. The overall status of a variety of business functions, corresponding to the functionality described above with reference to FIG. 2, may be shown in a chart at 310. The business functions may be shown in column 312, and the domestic status at 314 and offshore status 316 in separate columns. The set new day process 318 is listed first. As explained above, the remaining functions may not commence for the day until the set new day process has been completed. The remaining functions are not yet in process. As the day proceeds, each process will be indicated as in process, and then complete, before the next process commences.

Referring to FIG. 4, a set new day process status screen 400, associated with the set new day process, has been selected from set new day tab 402. Set new day process status screen 400 has a domestic trading section 410 and offshore trading section 450. Domestic trading section 410 indicates a current valuation day 412, previous valuation day 414, and next valuation day. Accrual arrears days 418 and accrual forward days 420 are also shown. The status 422 of the previous day s production cycle is shown. Offshore trading section 450 similarly displays the same information.

Figure 5:
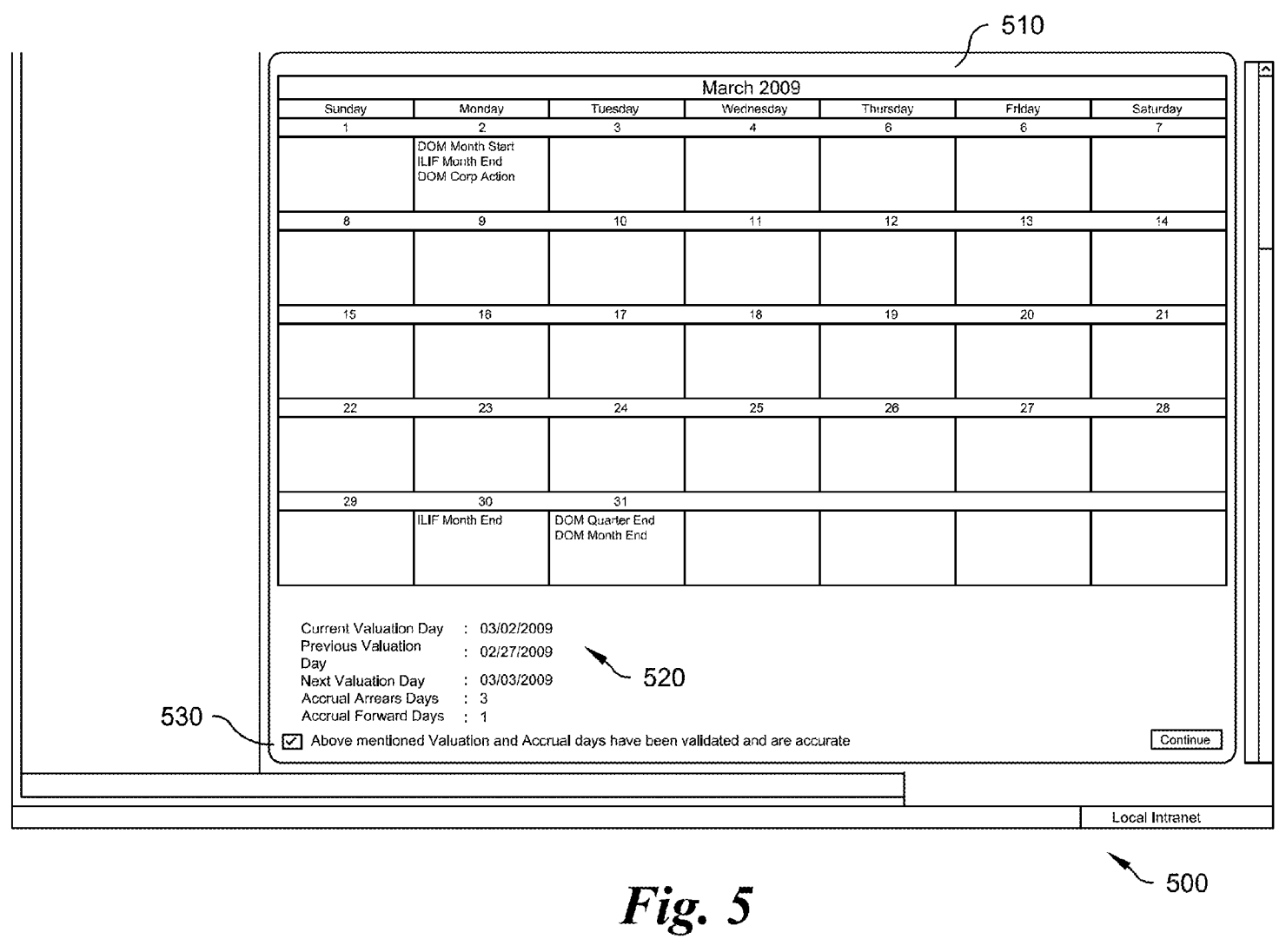
Figure 6:
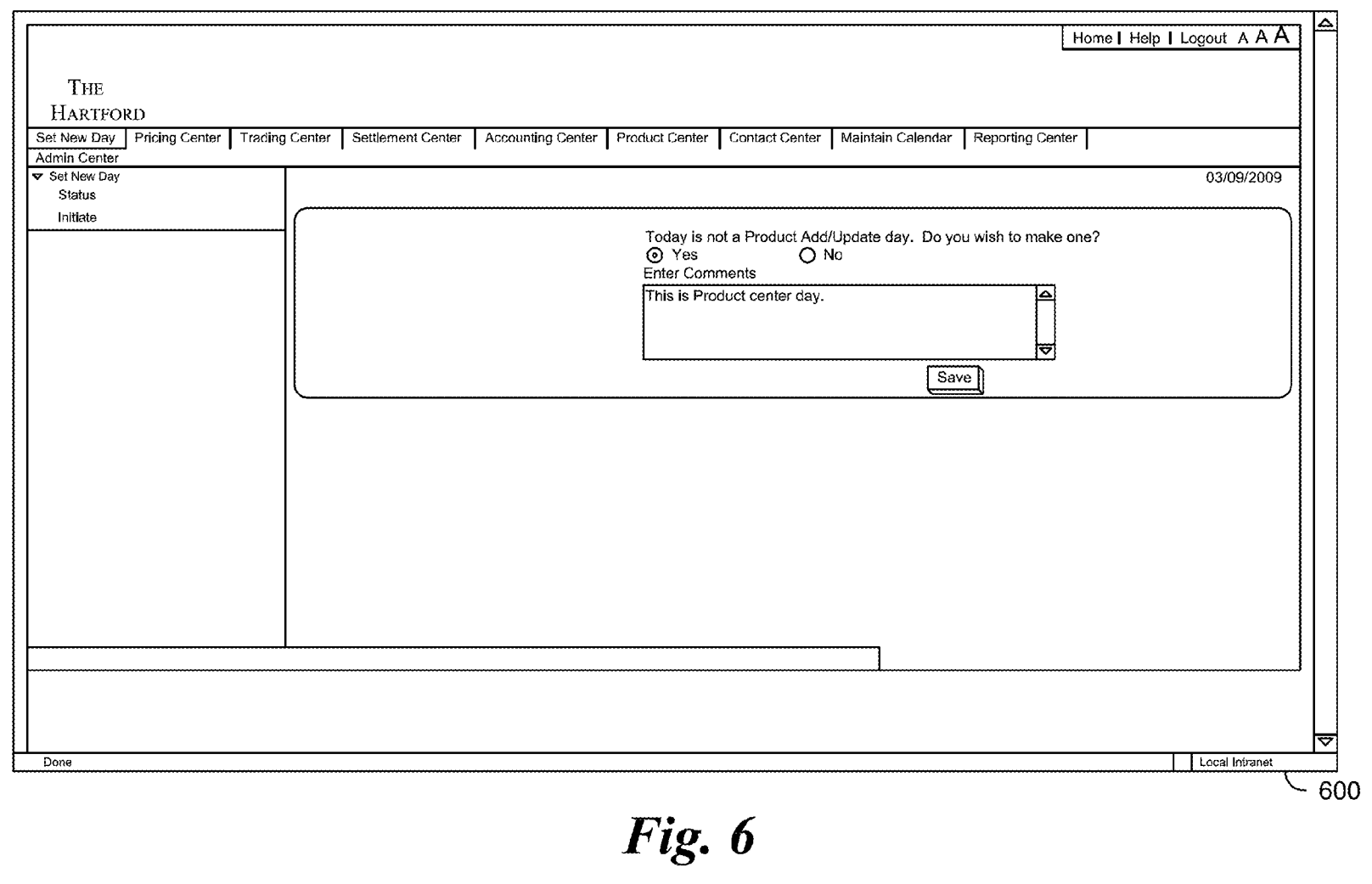

Referring to FIG. 5, a set new day—domestic screen 500 from an initiate set new day procedure, which may be selected from tab 404 of FIG. 4, is shown. Date information is displayed in a calendar format 510, and domestic information relating to valuation and accrual is displayed at 520. The user is prompted 530 to provide a response indicative of whether or not the valuation and accrual data has been validated. In response to receipt of the user response indicating that the valuation and accrual data has been validated, the system may perform a check to verify whether the current valuation date is indicated as a product add/update day. A product add/update day permits investment products, such as funds, to be added, deleted and modified. If the current valuation date is not indicated as a product add/update day, then the system prompts the user, such as by screen 600 shown in FIG. 6, to indicate whether the current day is to be designated a product add/update day. If the current valuation date as already been updated as a product add/update day, then the set new day process will proceed to be set, and an appropriate confirmation message will be provide to the user, such as by display on the Set New Day' Status page, as shown in FIG. 4.

Referring to FIG. 7, the Set New Day' Status page is shown after the Set New Day status is completed. The domestic product cycle status 702 has been updated to in progress, and the offshore product cycle status 704 has similarly been updated to in progress.

Figure 8:
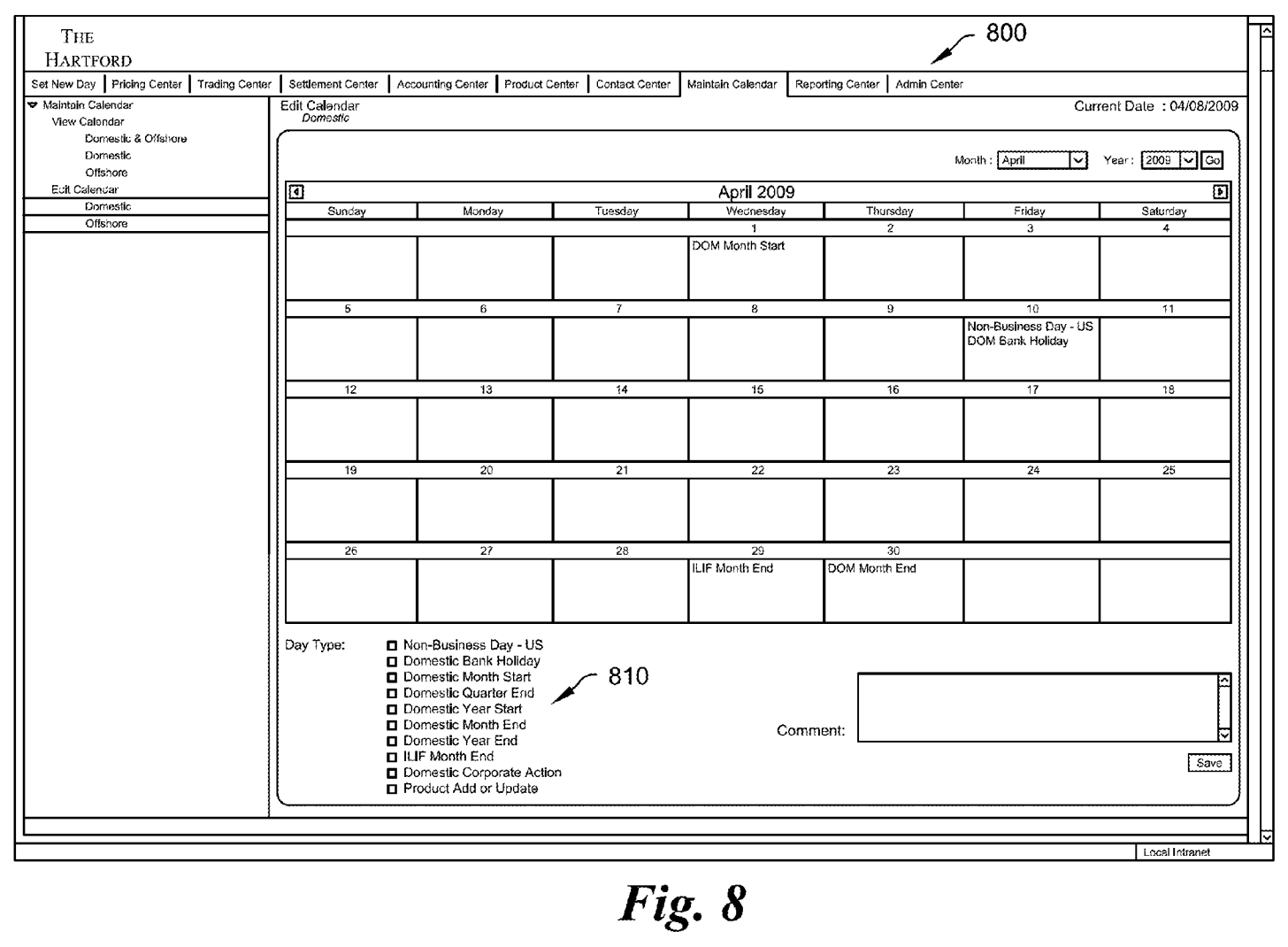

Referring to FIG. 8, an edit calendar screen 800 for the set new day function is shown. A calendar display is provided; a user may select any one of a number of statuses 810 for a given calendar day.

A series of user interfaces illustrating functionality related to the pricing process 220 of FIG. 2 will now be explained. Referring to FIG. 9, a fund pricing status screen is displayed. Fund pricing status screen may be selected from the Pricing Center menu 902. At net asset value block 910, the status of receipt of net asset value data for funds from various sources is shown. The sources are in this example categorized by all vendors, partial vendors, and manual input. A total is provided. Missing data 915 is provided with a link, so that the user can obtain additional detail regarding missing net asset value data. Market indices/externals block 920 displays the status of receipt of two sub-categories of data, namely market indices and external data. Daily accruals block 930 shows an overview of the status of daily accrual data from various categories of vendors and a manual input file. A link is provided to return additional detail regarding missing data 935. An unverified variances block 940 may provide details as to the results of data integrity checks in various categories; in this example, the integrity checks are listed as Exhibits 1-4. Block 950 indicates the status of receipt of files from another source. In this example, the pricing data has all been received, and all integrity checks have been passed.

Figure 10:
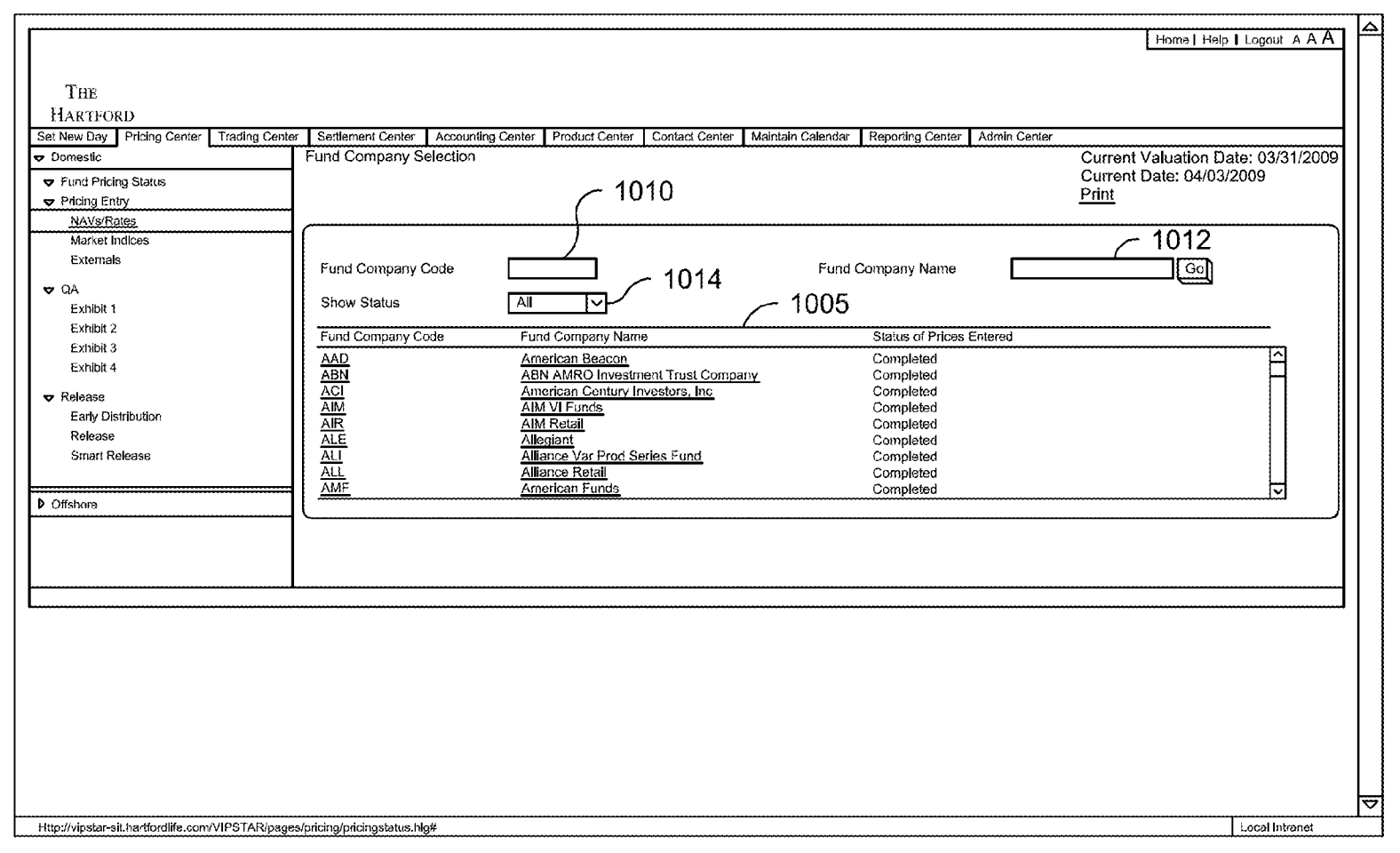

Referring now to FIG. 10, by selecting NAV/Rates option n the Pricing Center menu of FIG. 9, the system returns a listing 1005 of fund companies tracked by the system. The fund company data can be searched by fund company code 1010 or fund company name 1012. The data may also be filtered by status of prices entered 1014, such as complete or incomplete. The fund company codes and fund company names are linked; in response to user selection of a fund company code or name, additional data may be returned.

Figure 11:
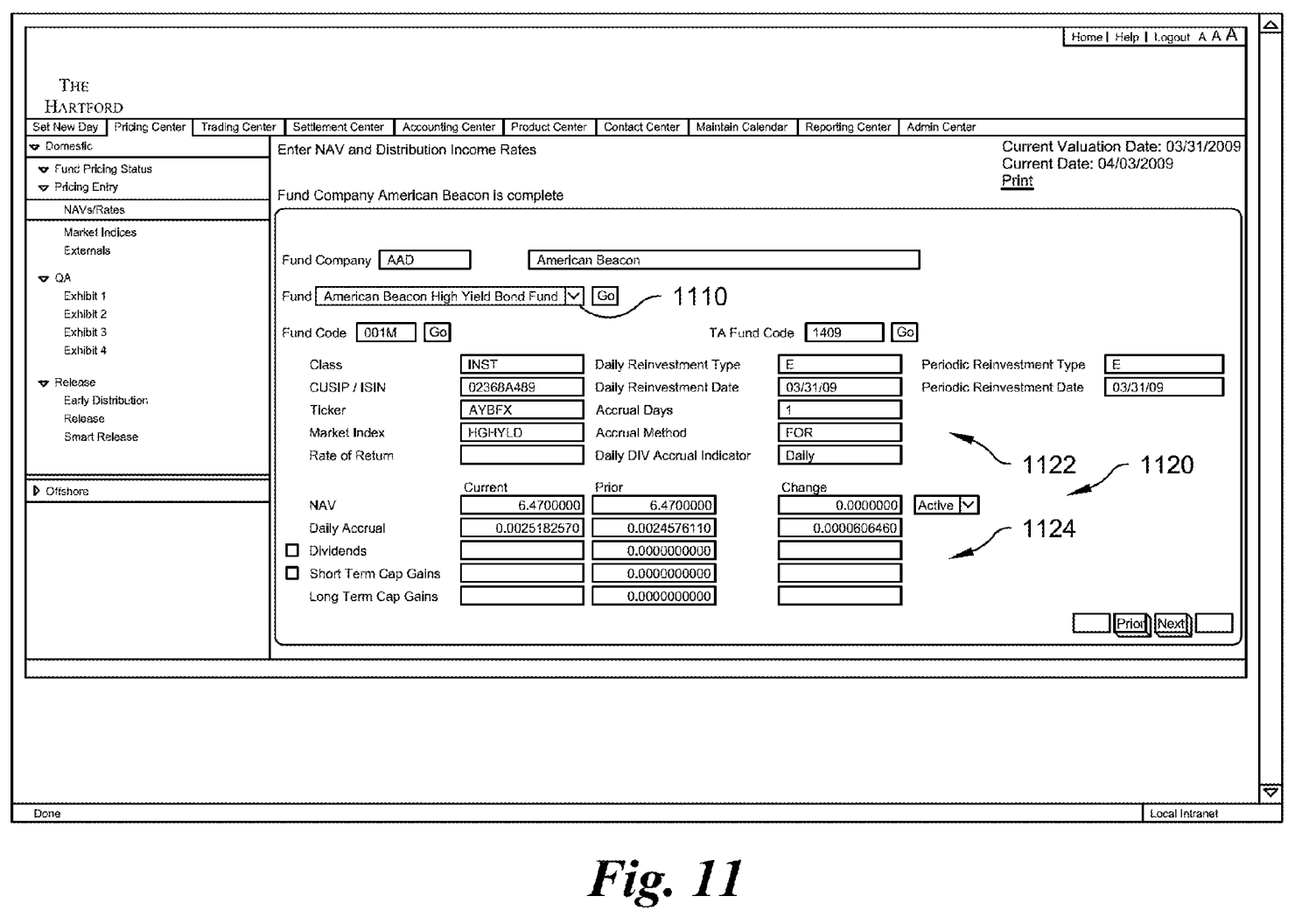

Referring to FIG. 11, additional data displayed in response to a user selection of a fund company from FIG. 10 is shown. A drop down menu 1110 permits the user to select a particular fund managed by the fund company. In response to the selection of a particular fund, fund data is shown generally at 1120. General fund data, such as class, identifiers, and daily reinvestment type are shown generally at 1122. Price data, such as current and prior day net asset value are shown generally at 1124.

Figure 12:
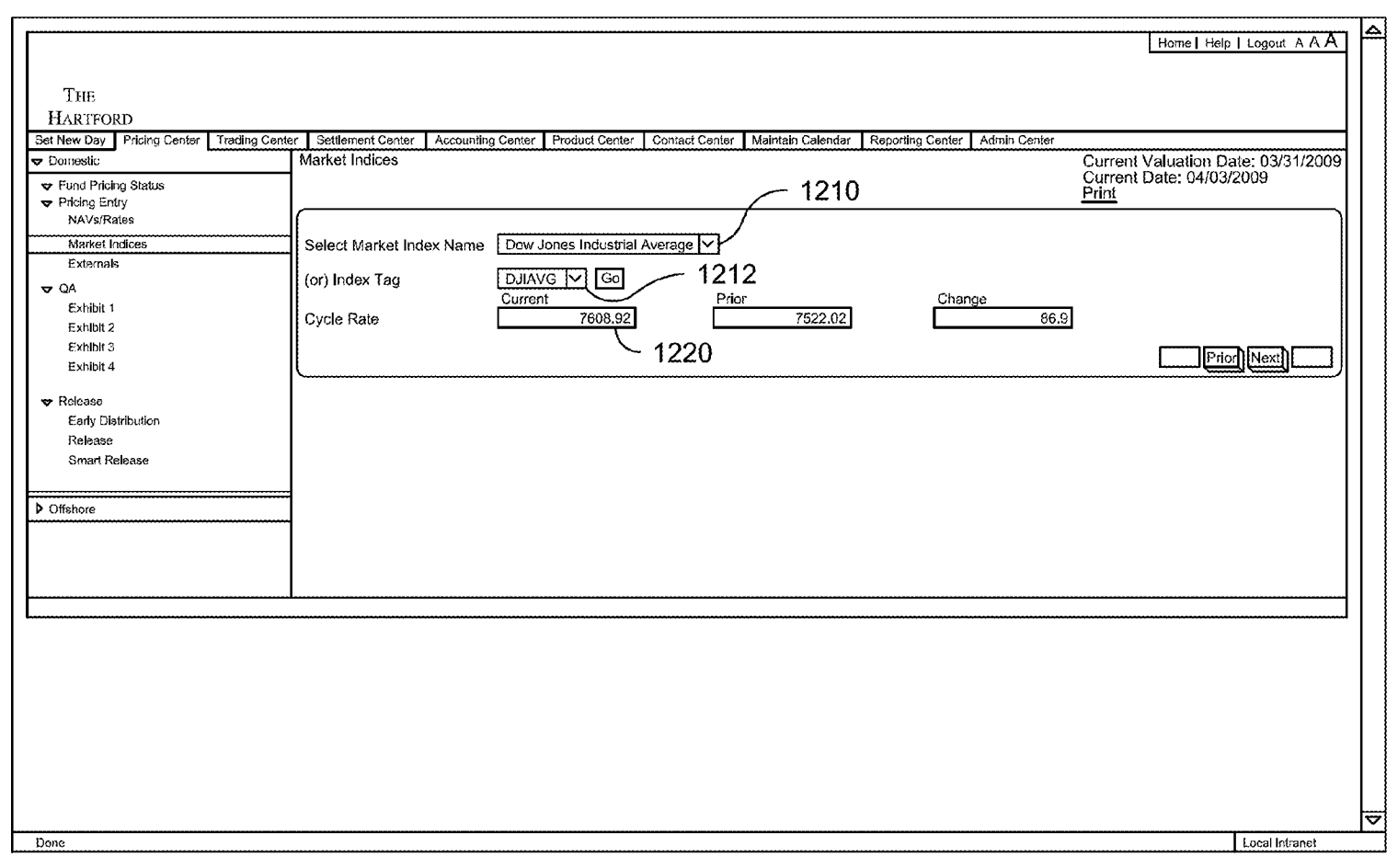

Referring to FIG. 12, in response to data indicative of user selection of market indices option in the Pricing Center menu of FIG. 9, the system returns display 1200 providing additional information regarding a selected market index. The market index may be selected from drop down menus 1210, 1212. Index value data may be shown at block 1220.

Figure 13:
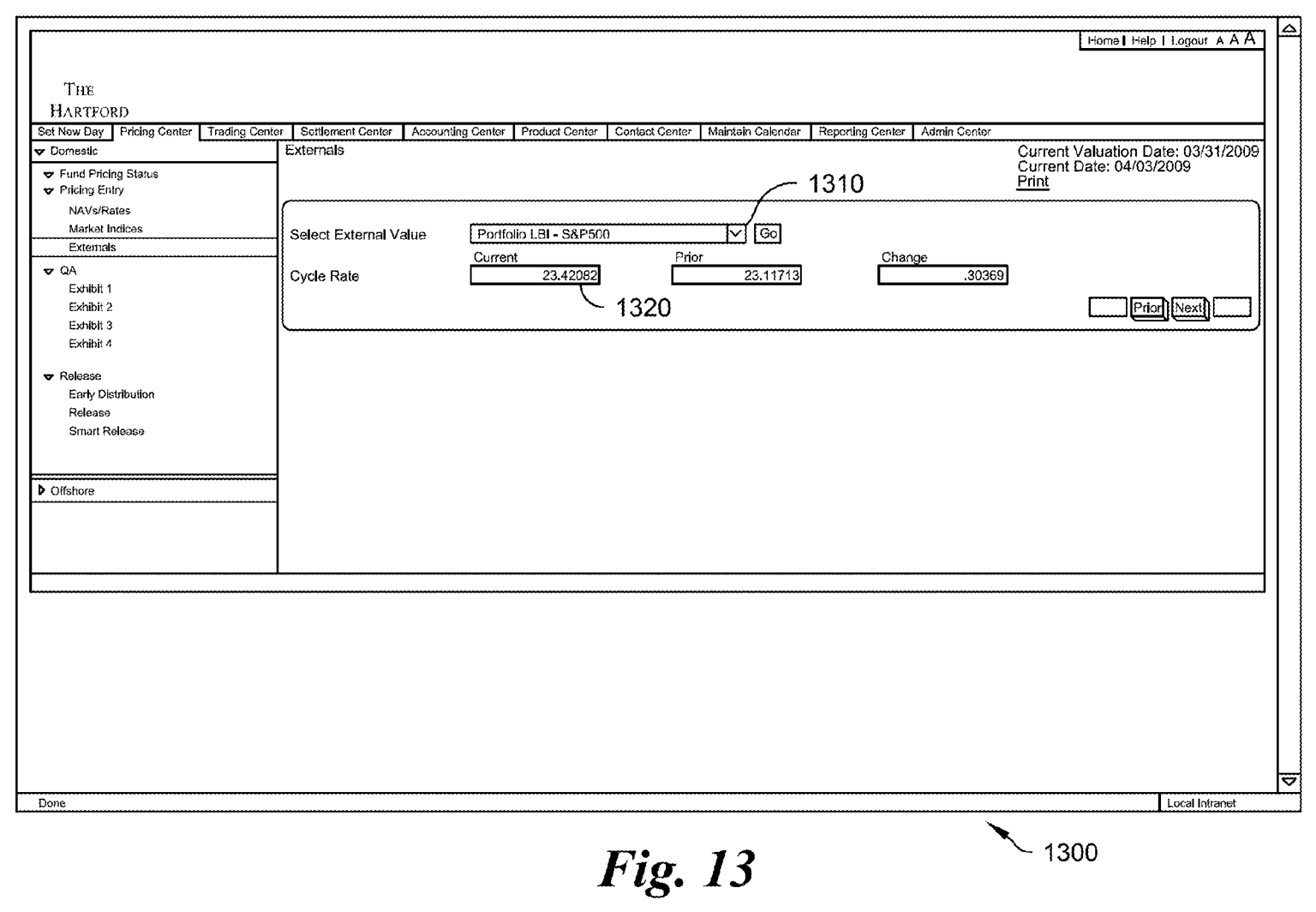

Referring to FIG. 13, in response to receipt of data indicative of a user selection of externals data from the Pricing Center menu, the system returns a screen with a drop down menu 1310 displaying available external index values. In response to user selection of one of the external indices, a display 1300 featuring current price data 1320 is returned.

Figure 14:
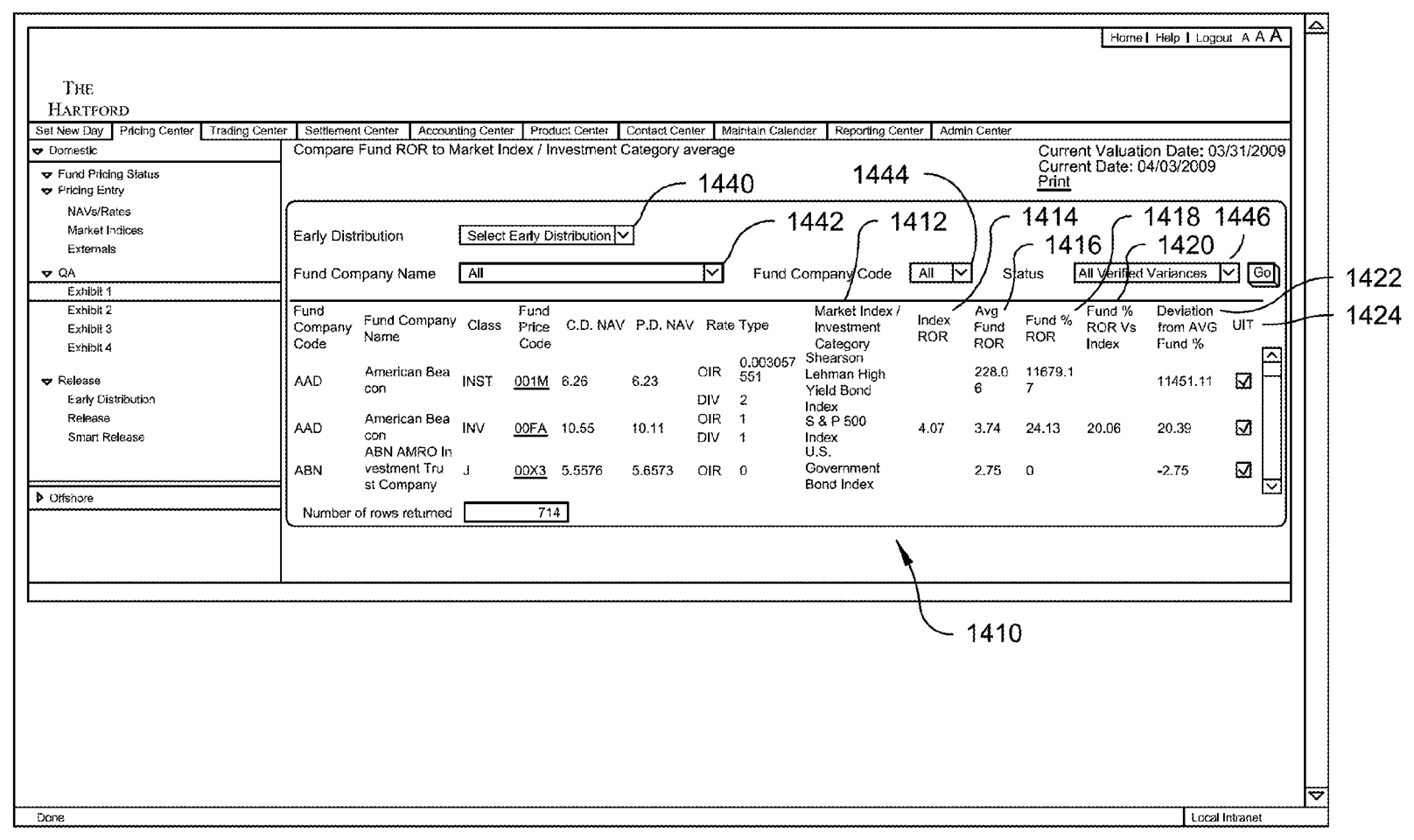

Referring to FIG. 14, in response to receipt of data indicative of a user selection of a QA, or quality assurance data from the Pricing Center menu, the system returns a display 1410 of fund company data with certain verification data. In this display, the verification data compares the rate of return (ROR) of each fund to a market index or investment category average ROR. In this chart, the market index or investment category is indicated at column 1412. The ROR of the index, if available, is indicated in column 1414. Column 1416 reports an average ROR of the fund. Column 1418 displays the fund ROR as a percentage of fund net asset value. Column 1420 displays a difference between a fund percentage ROR and the index/investment category ROR. Column 1422 displays a deviation from the average fund percentage ROR. Column 1424 provides a user prompt to indicate that the user has reviewed the entry and verified that the tolerance is acceptable. Filters are available at drop down menus 1440, 1442, 1444, 1446.

Figure 15:
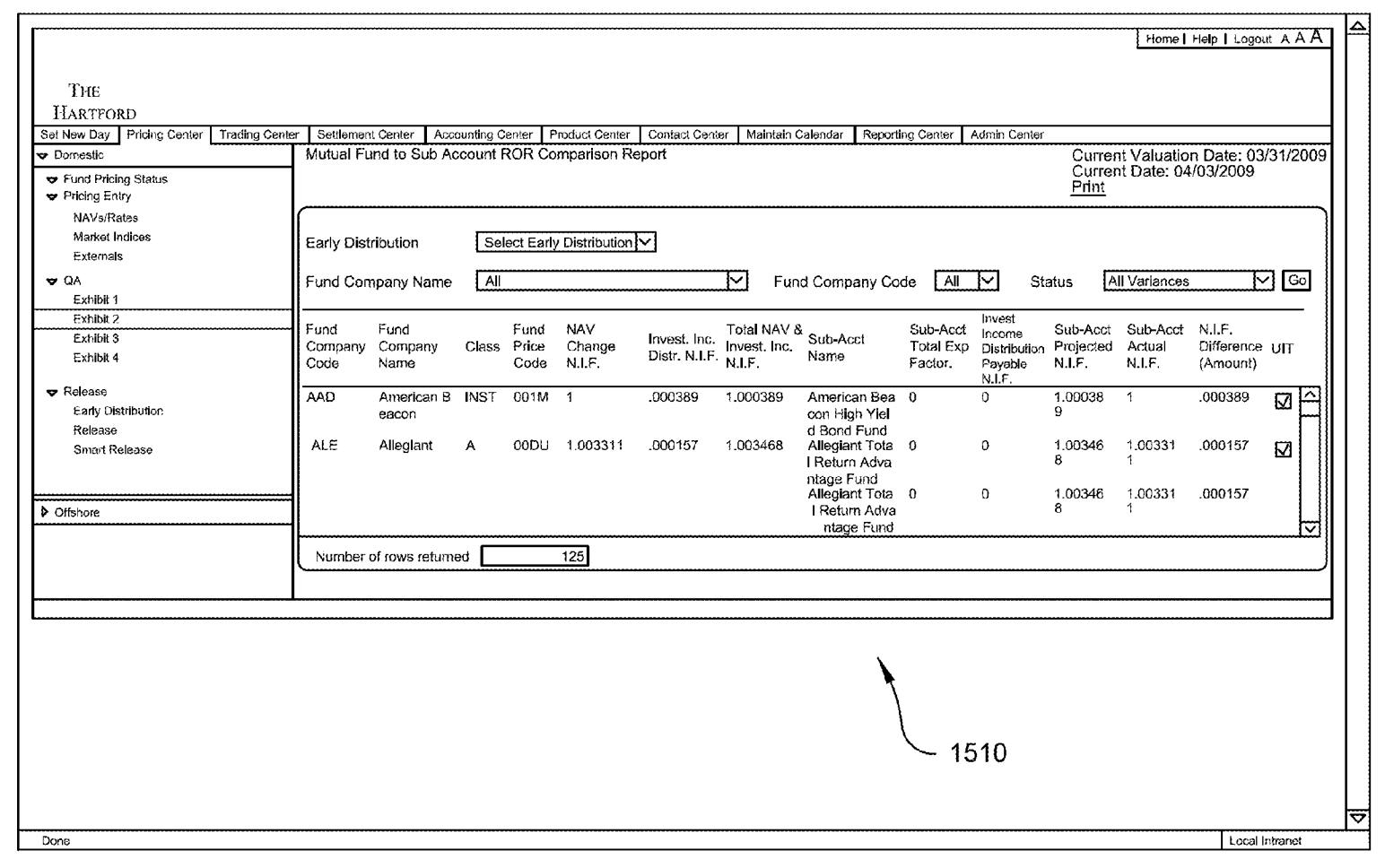

Referring to FIG. 15, in response to receipt of data indicative of a user selection of QA' Exhibit 2 from the Pricing Center menu, the system returns a display 1510 showing a mutual fund to sub account ROR comparison report. The data is generally similar to the data selection in FIG. 14.

Referring to FIG. 16, in response to receipt of data indicative of a user selection of QA-Exhibit 3 from the Pricing Center menu, the system returns a display 1610 of a vendor mismatch report. In this example, funds with mismatches in net asset value between difference sources are listed. Column 1620 displays sources of NAV data, and column 1622 displays the respective NAV values from those sources.

Figure 17:
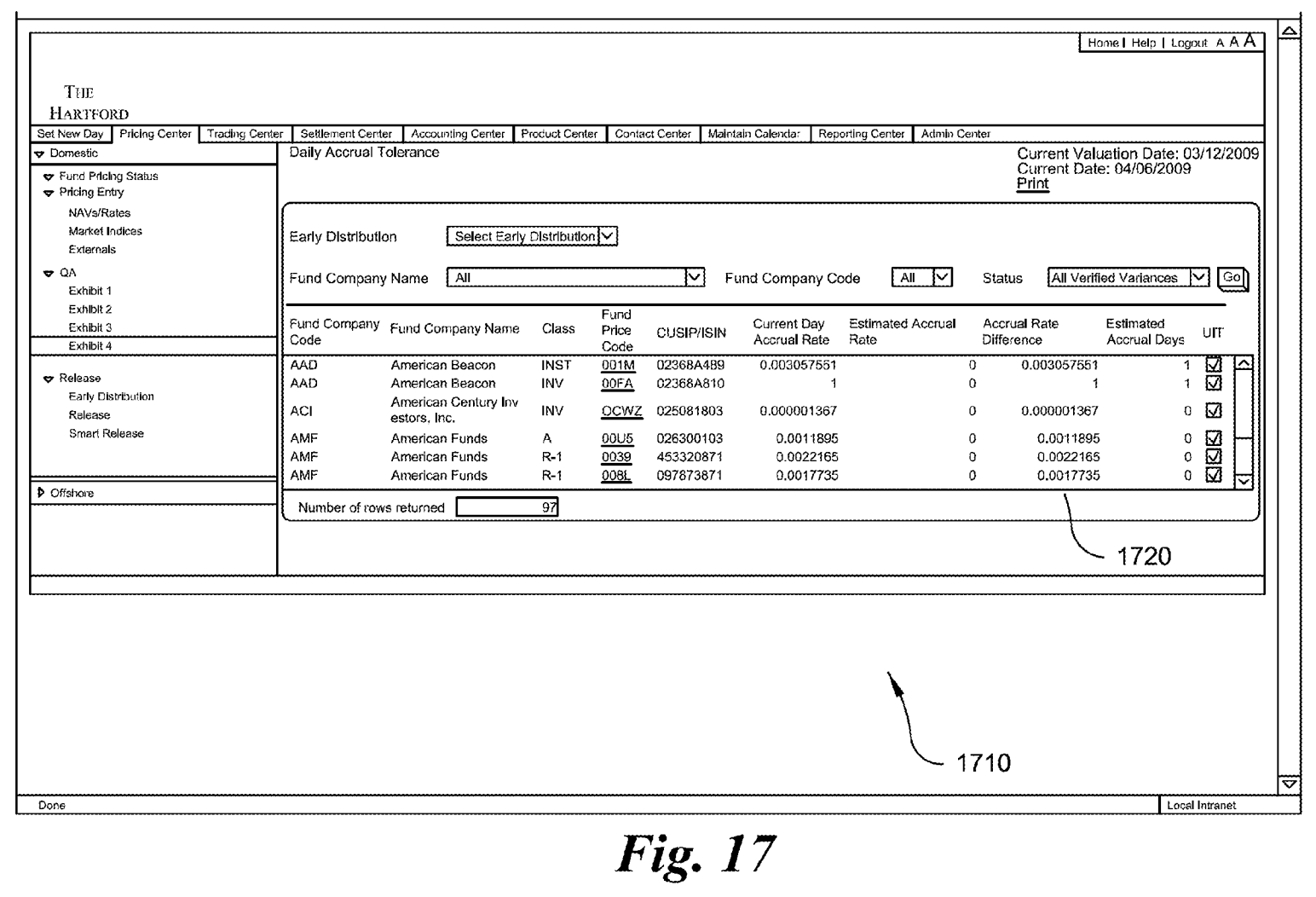

Referring to FIG. 17, in response to receipt of data indicative of a user selection of QA' Exhibit 4 from the Pricing Center menu, the system returns a display 1710 of a report of daily accrual tolerance. Column 1720 lists accrual rate differences.

Figure 18:
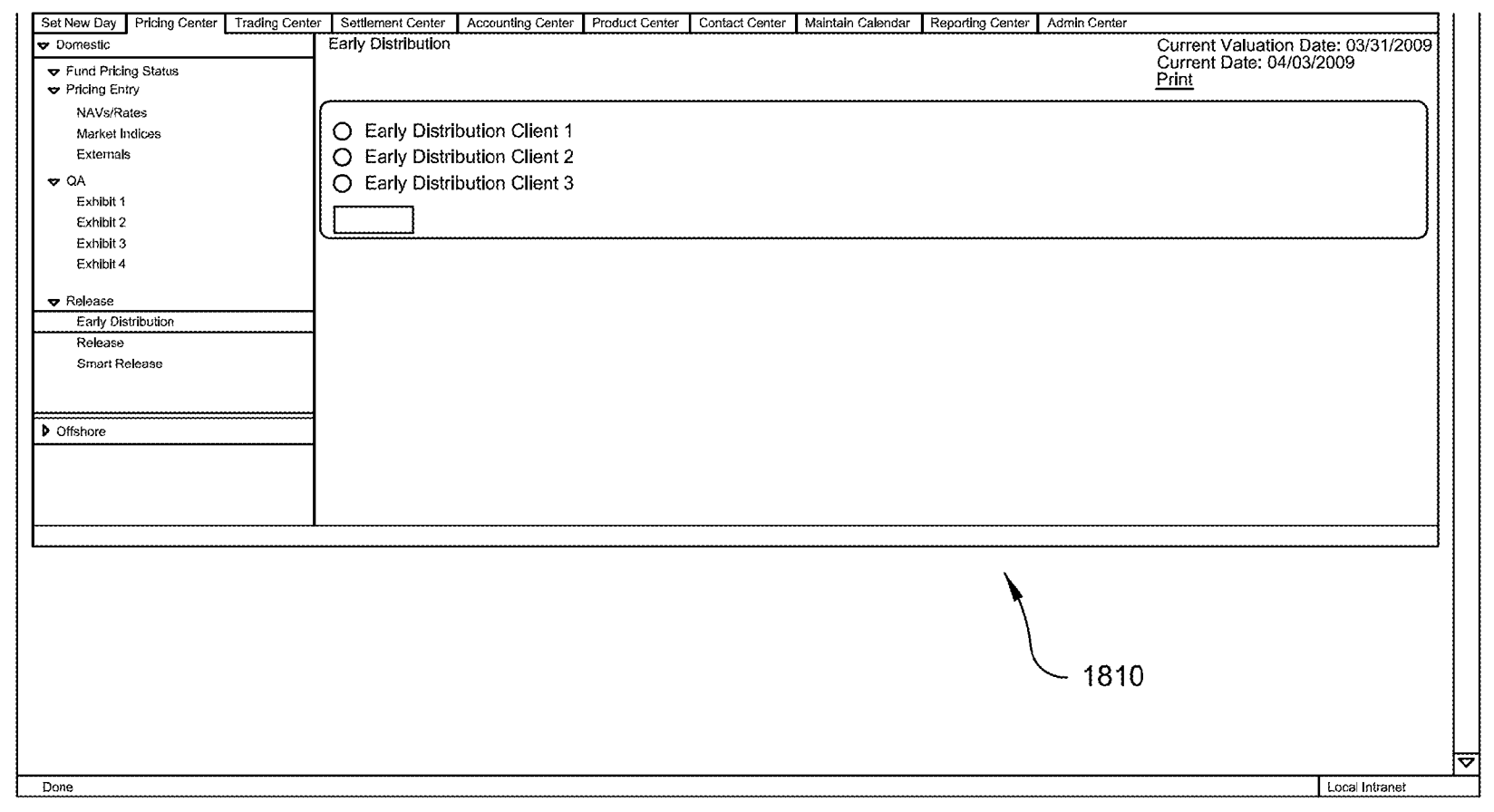

Referring to FIG. 18, in response to receipt of data indicative of a user selection of Release-Early Distribution from the Pricing Center menu, the system returns a display 1810 that prompts a user to provide data to those recipients that are designated as early distribution recipients. Early distribution customers require data regarding their fund pricing holdings earlier in the daily cycle than the standard fund price reporting time. In an embodiment, fund pricing calculations may commence with funds held by each early distribution entity. If fund pricing calculations are complete, and any exceptions have been resolved, the user may respond with an indication that data is to be distributed to one or more of the recipients of early distribution data.

Figure 19:
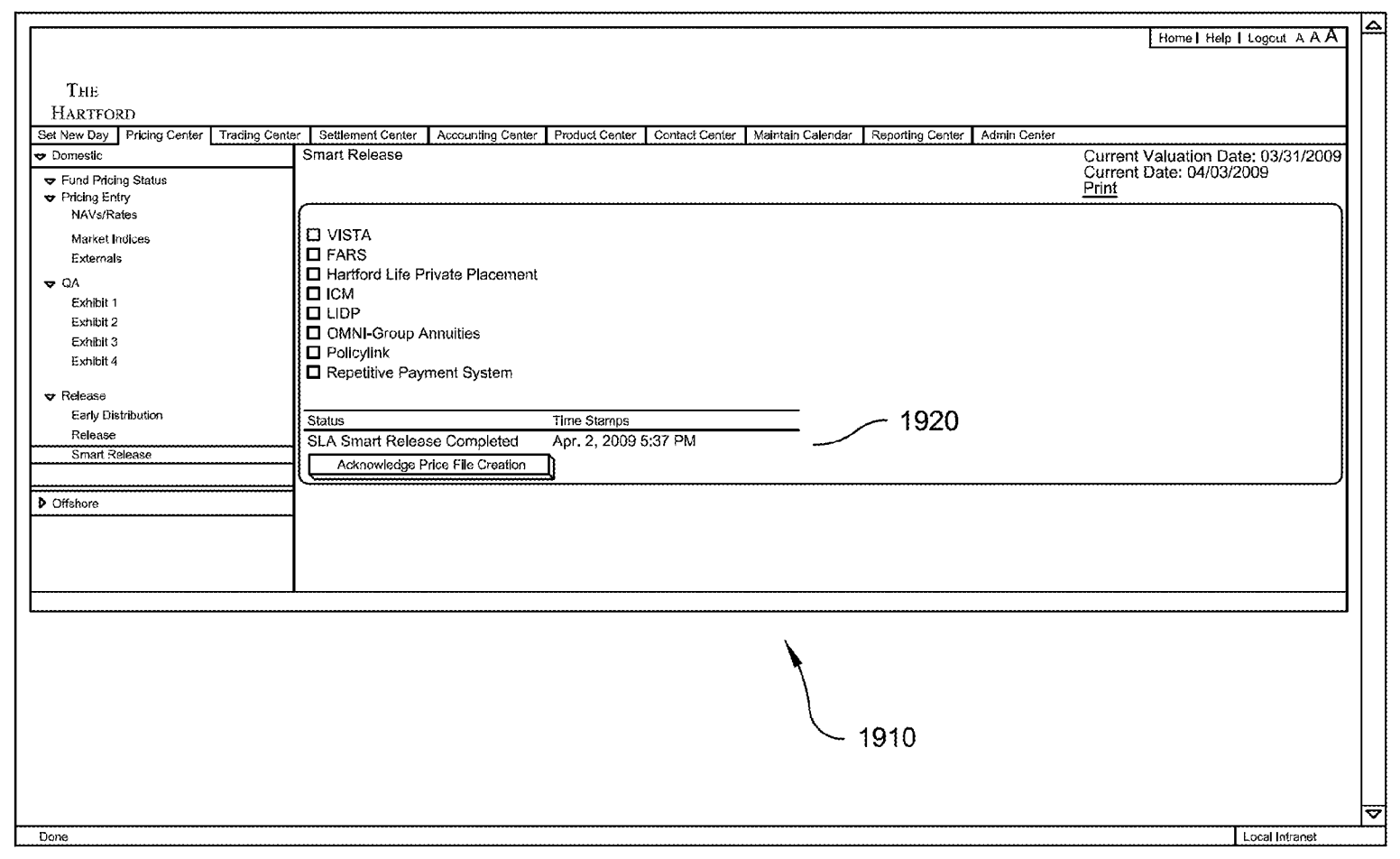

Referring to FIG. 19, in response to receipt of data indicative of a user selection of Release-Smart Release from the Pricing Center menu, the system returns a display 1910 that prompts a user to release fund pricing data to one or more recipients. A smart release is a release of the fund data applicable to the recipient, even though not all of the pricing process is complete. The pricing process may not be complete for all funds in the system at a given time. For example, there may be unresolved exceptions with respect to data from certain funds, or certain fund companies may not have yet provided data. In an embodiment, the system may determine whether the processing of data for each fund that is applicable to a recipient is complete. If so, the system is able to send price file data for each fund applicable to the recipient. Display 1920 also provides a status of the previous days release of und pricing data prior to completion of the pricing process for all funds. Upon receipt from the user of data indicative of instructions to proceed with release of pricing data, which may be provided on a recipient-by-recipient basis, the system will proceed to furnish the pricing data to the one or more designated recipients.

Referring now to FIG. 20, in response to receipt of data indicative of a user selection of Release-Release from the Pricing Center menu, the system returns a display 1910 that prompts a user to release complete fund pricing data for the daily cycle to one or more recipients. Upon verification that the pricing process is complete, all prices may be released. The user may select individual recipients for release of price data. The recipients may be recipients who have received partial pricing data earlier in the cycle. Recipients who have received partial pricing data earlier in the cycle may receive only sufficient price data to complete the pricing data for the cycle. The recipients may be those recipients who have not previously received any pricing data during the current cycle. If price files have been released, the display may identify the release initiation time, the time of completion of release of the files, and the time of receipt of acknowledgment of the final one of the price files in the daily cycle.

Figure 21:
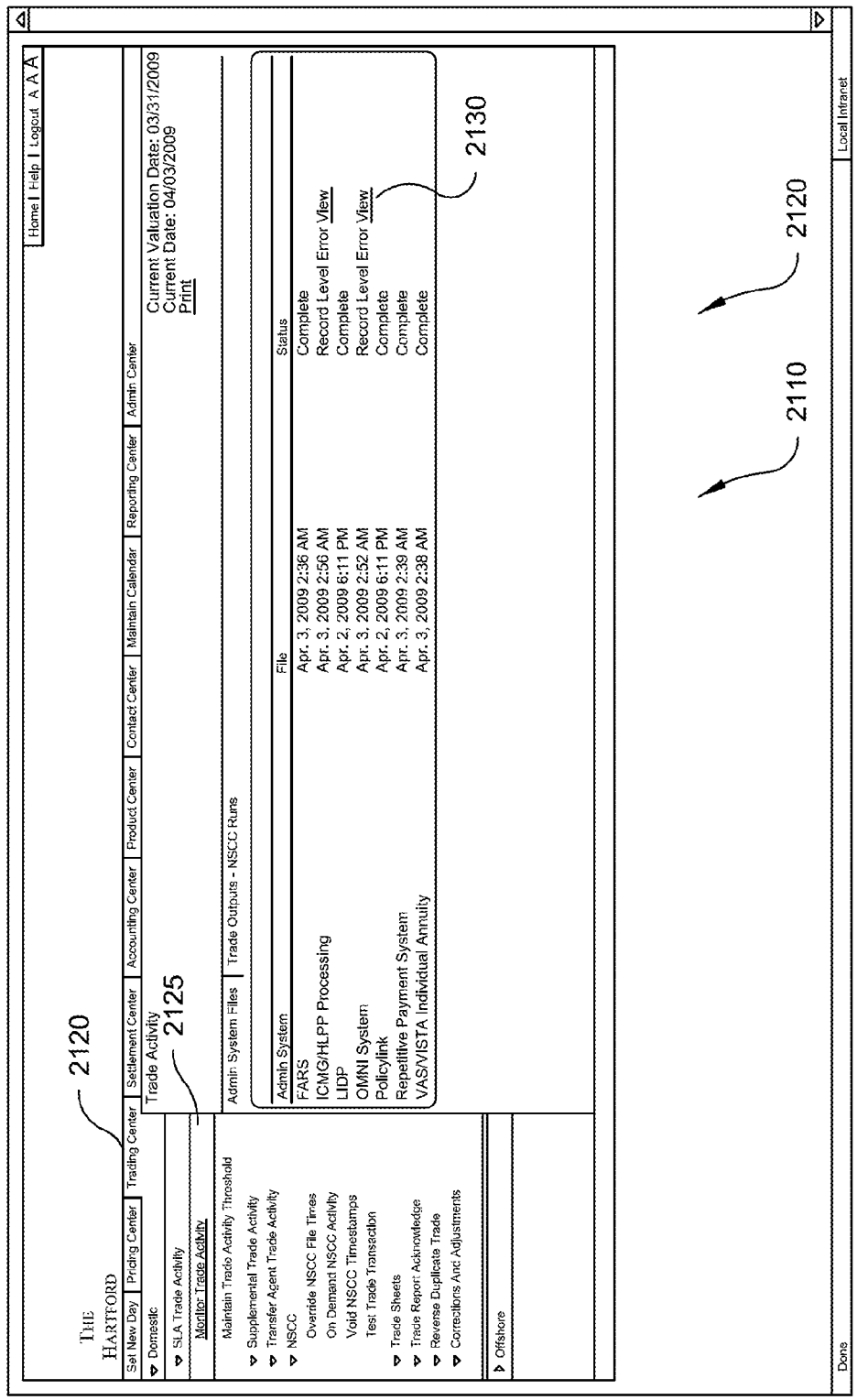
FIG. 21 is an exemplary screen showing a status of trading files displayed to a user according to an embodiment.
Figure 22:
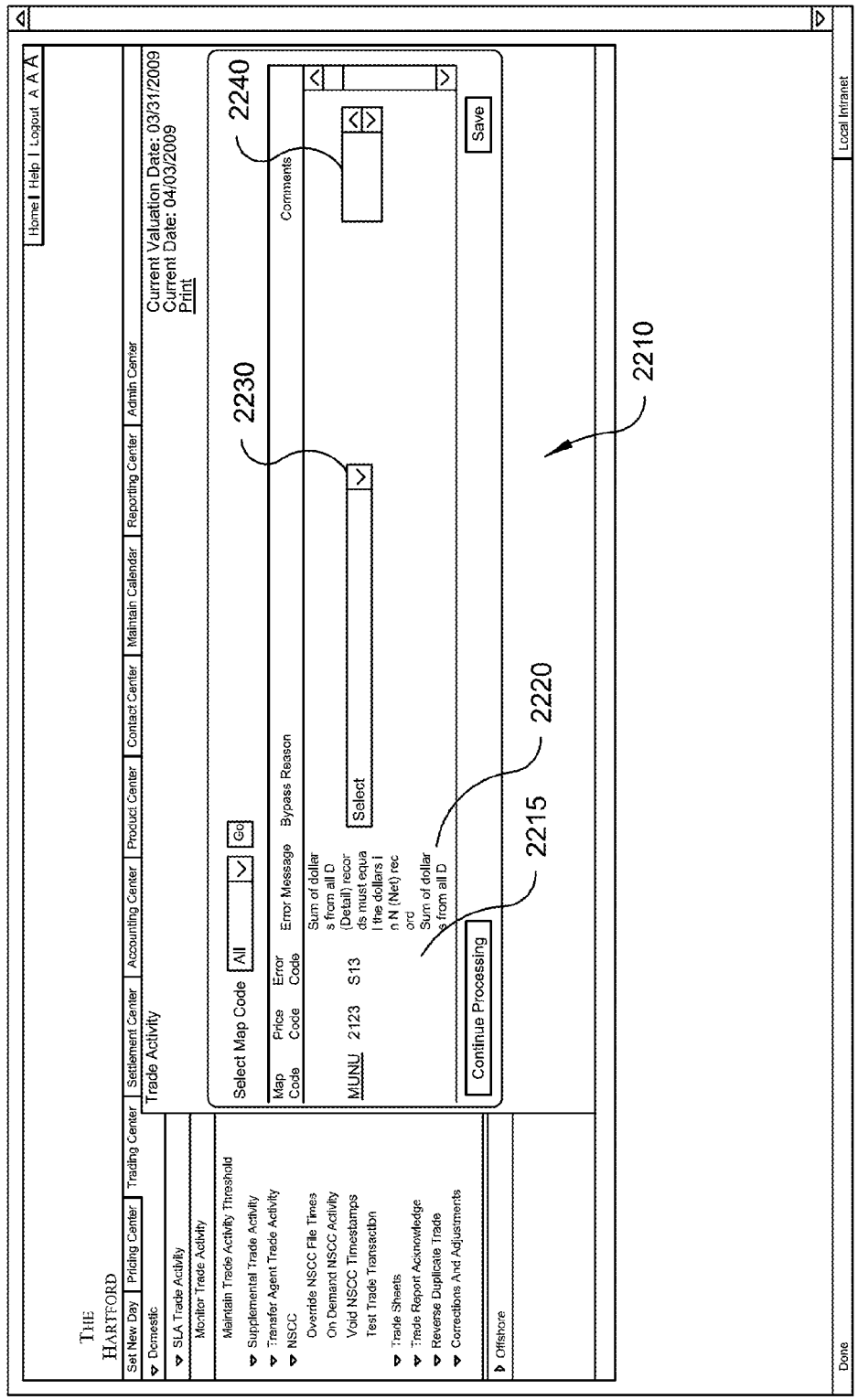
FIG. 22 is an exemplary screen showing detail relating to a detected error in a record in a trading file displayed to a user according to an embodiment.

With reference to FIG. 21, displays associated with the trading functionality, and particularly displays selected with reference to trading center drop down menu 2120, will now be described. In response to receipt of data indicative of a user selection of a monitor trade activity item 2125 from the trading center menu, display 2110 is shown. Display 2110 shows each administrative system that performs trades, when the trading file was provided to the system, and the status of each of the trading files. The status may include complete, or many include a record level error. The record level error may include a hot link, as at 2130 to permit a user to view details of an error in a record. Referring now to FIG. 22, a detail of an error in a record, displayed in response to selection of link such as link 2130, is shown. An error code 2215 and detailed error explanation 2220 are shown. The user may have the option to use drop down menu 2230 to select a reason for by passing the error, and may provide text comments in block 2240. In response to receipt of a reasons and comments, the system may change the status of the file to complete, assuming that no other unresolved errors remain in the file.

Figure 23:
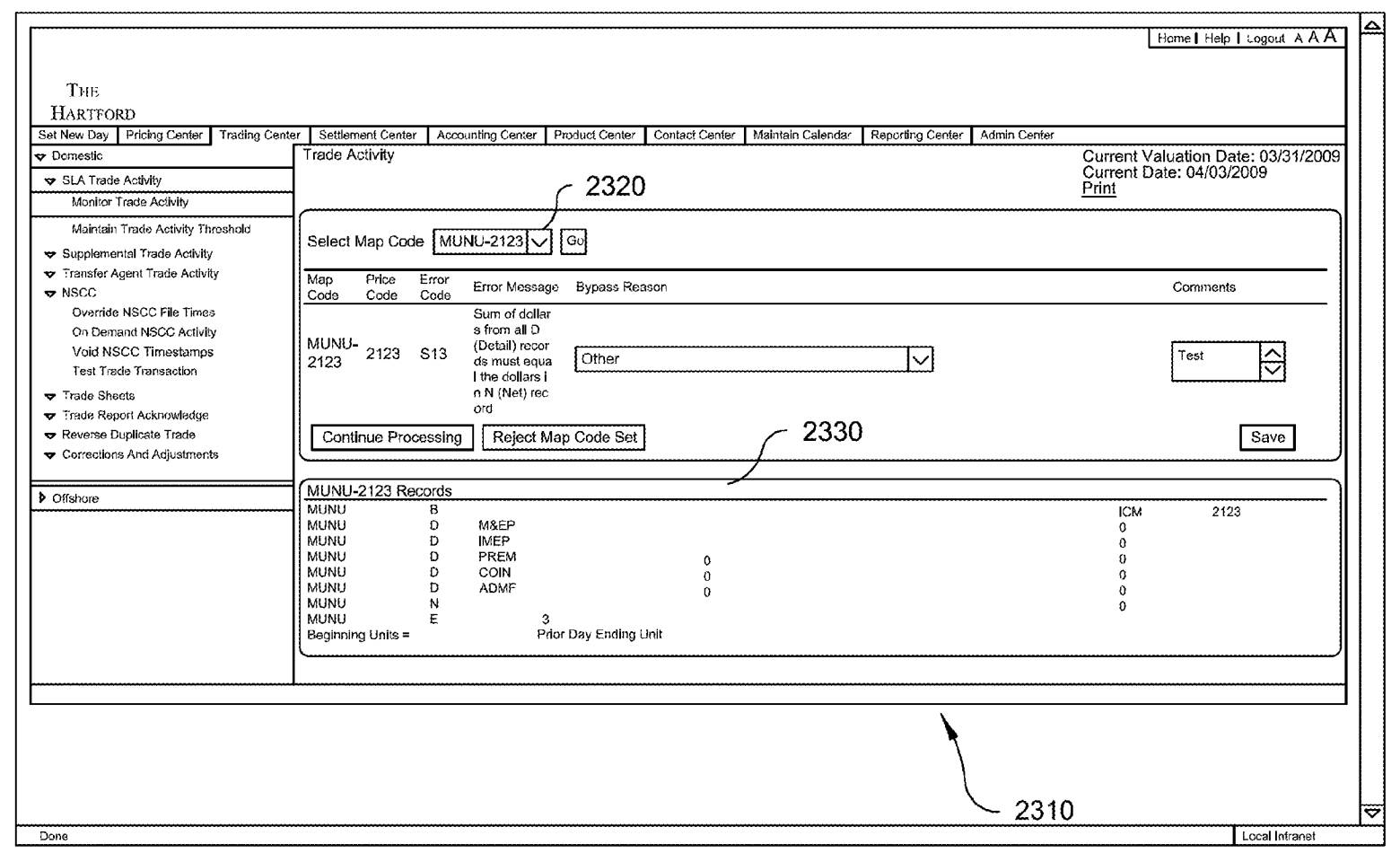

Referring to FIG. 23, a display 2310 is shown in which a user has selected a map code at 2320. Records associated with the selected map code are shown at 2330. The error bypass may be applied to all of the selected records, or the user may reject the map code set.

Figure 25:
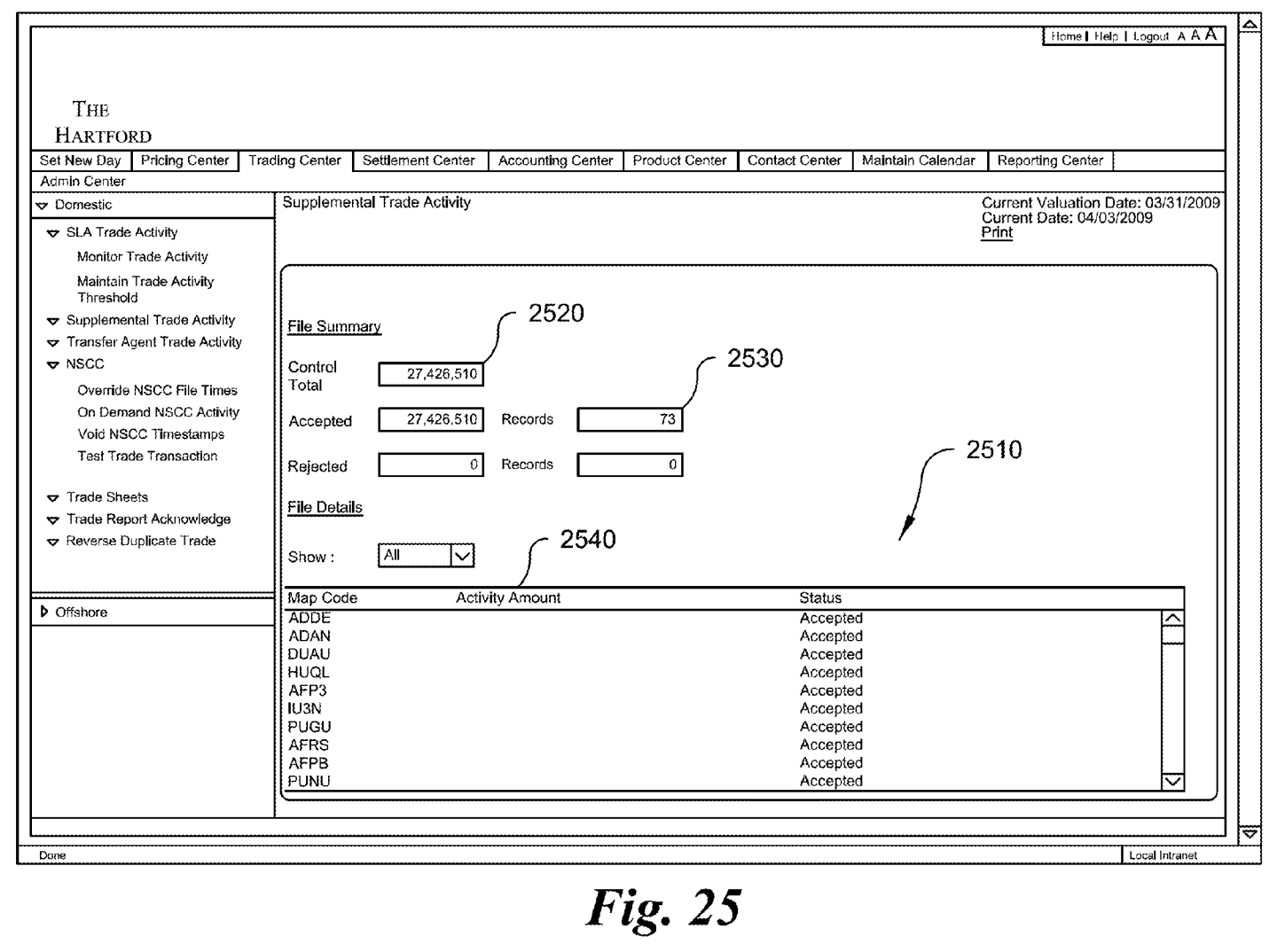

Referring to FIG. 24, a display 2410 is shown generated in response to data indicative of user selection of Supplemental Trade Activity in the Trading Center menu. Supplemental Trade Activity may refer to software applications that require or that furnish trade data. The supplemental files are identified at 2420. The status of whether each file has been processed by the system is shown at 2430. The status of the file as to availability for import is shown at 2440. The user has a links available to initiate a process of importing data from the available files. Once the user selects importing of a file, a display such as display 2510 of FIG. 25 may be returned by the system. The display includes a display of a summary of the numbers of transactions 2520 and a number of records in which the transactions are stored 2530. A file details chart 2540 identifies each file by map code and lists numbers of transactions and an indication as to whether the file has passed business rules and integrity checks and has been accepted. In an embodiment, links may be provided to rejected files for user review of rejection reasons and manual acceptance if appropriate.

Figure 26:
FIG. 26 is an exemplary screen displaying data including import data as to supplemental trade activity files displayed to a user according to an embodiment.

Referring to FIG. 26, a display 2610 is shown, similar to display 2410 of FIG. 24, but after import of two of the supplemental files. The import date is shown, as well as the status as complete. Links 2630 are provided to permit the user to view details of imported files.

Figure 27:
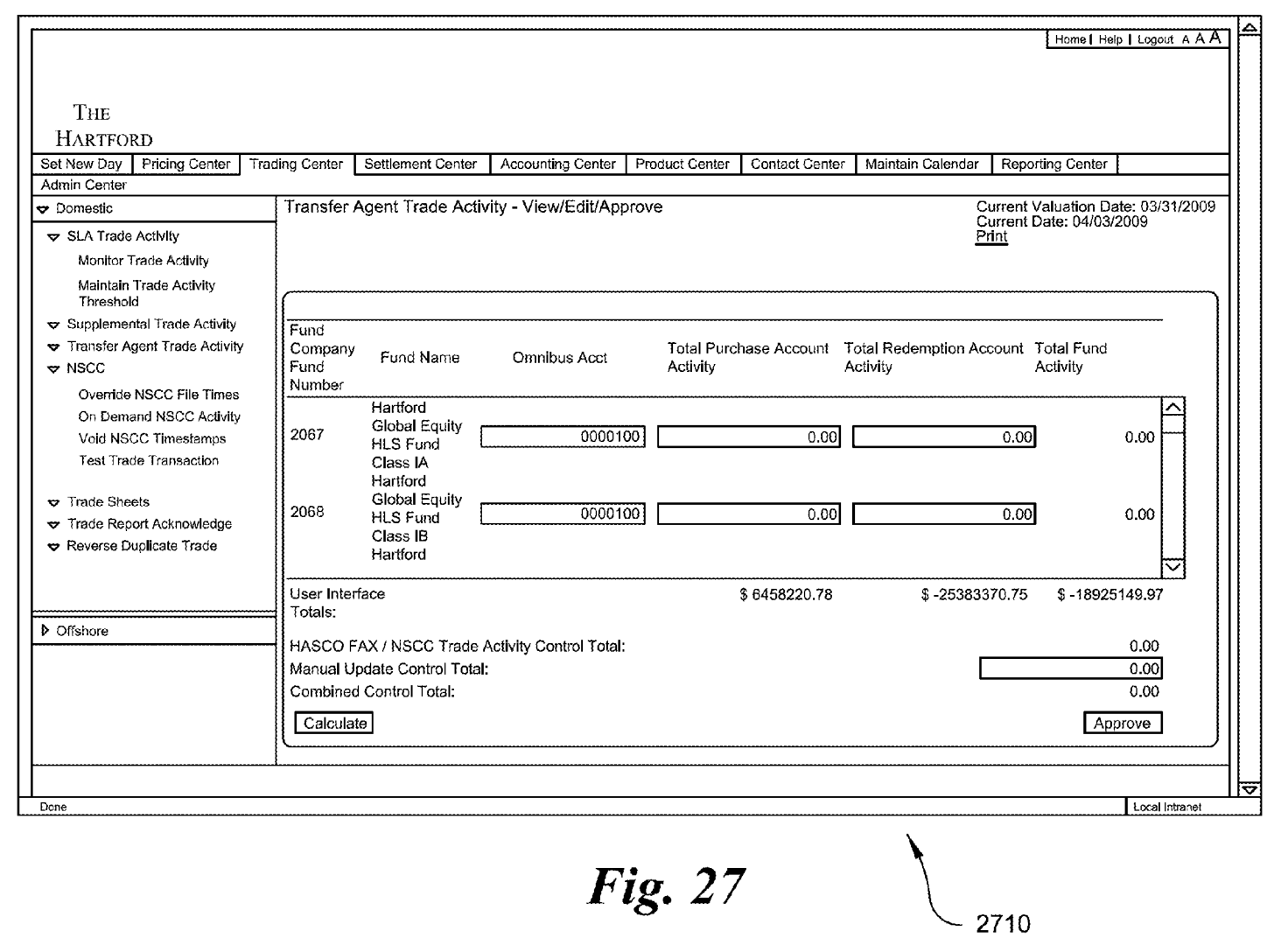
Figure 28:
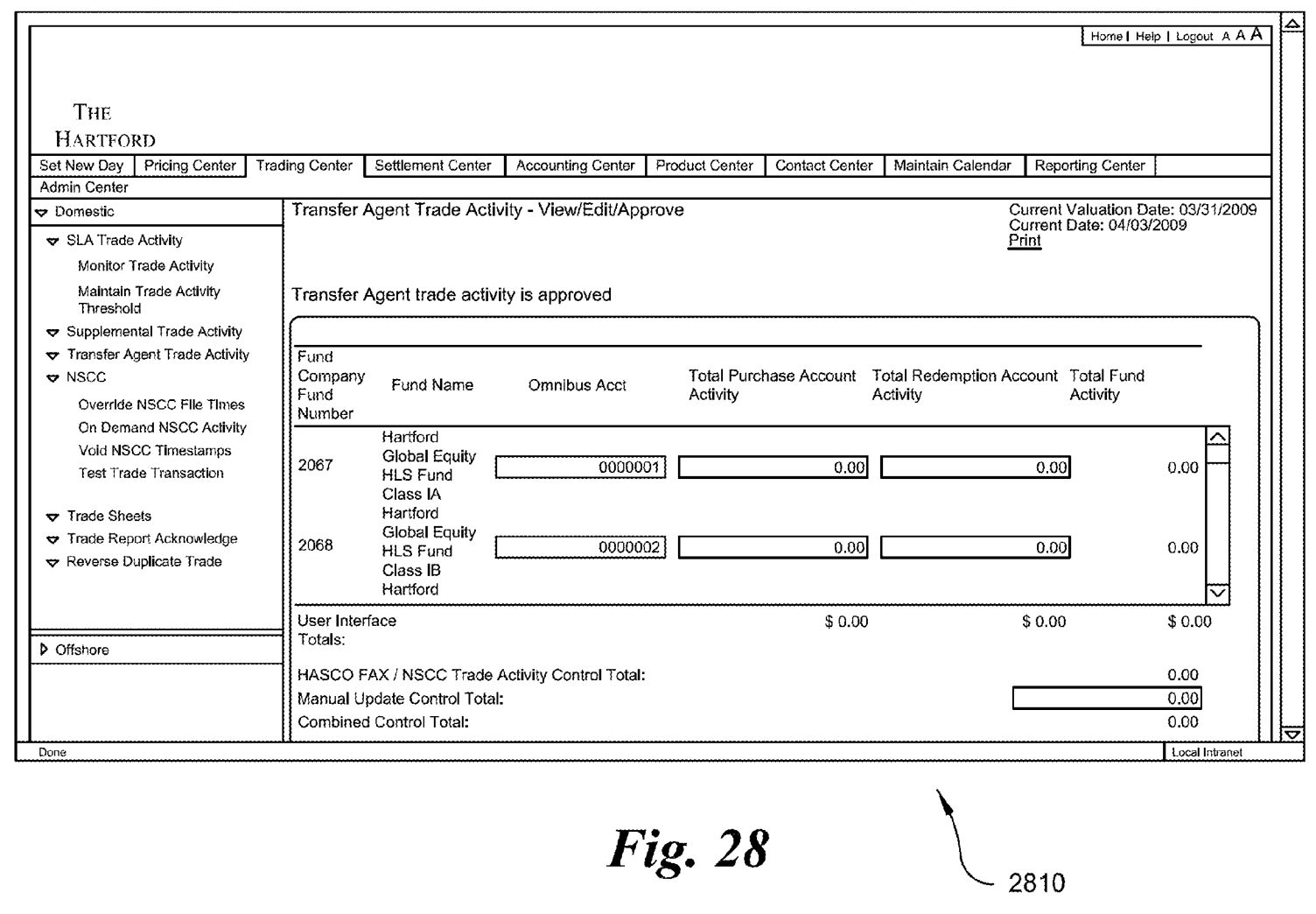

Referring to FIG. 27, a display 2710 is shown which is furnished by the system responsive to receipt of data indicative of user selection of transfer agent trade activity from the trading center menu. Display 2710 permits the user to provide data required for files to be transmitted to transfer agents. Display 2710 arranges the data on a fund by fund basis from generated trade files. Manual adjustments to total purchase account activity and total redemption account activity may be input by the user on a fund by fund basis to account for any activity not incorporated in generated trade files. Totals of dollar value of fund activity may be listed of both data from generated trade files and manually input data. A user may approve the reviewed data for transmission to transfer agents. After receipt of user approval, the system provides display 2810 as shown in FIG. 28, showing that the transfer agent activity is approved, and indicating both individual fund purchase and redemption activity dollar figures and cumulative dollar figures.

Figure 30:
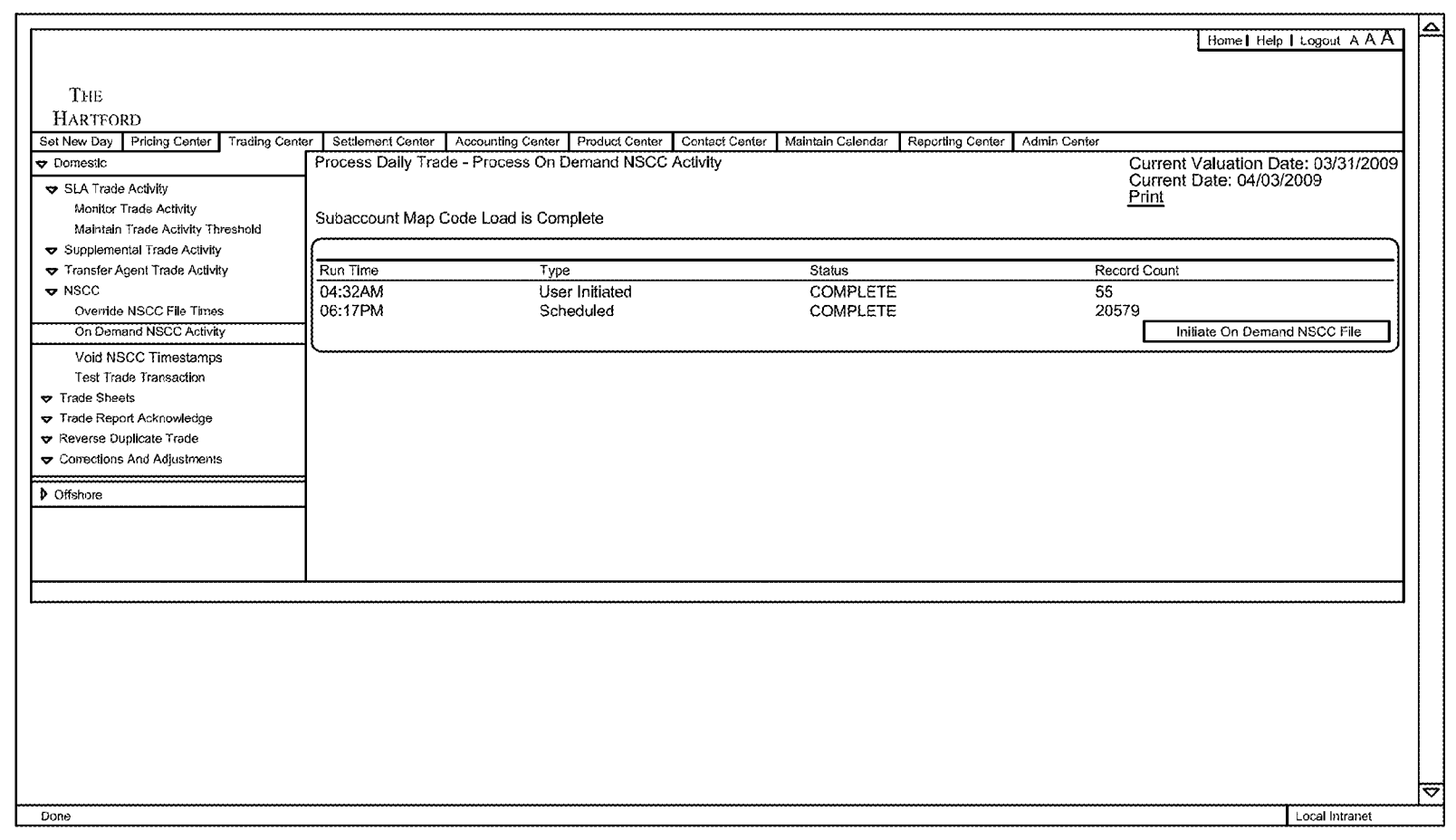

Referring to FIG. 29, a display 2910 is shown, resulting from receipt of data indicative of user selection of on demand NSCC activity from the trading center menu. The user may provide files for use by a securities clearinghouse, such as the National Securities Clearing Corporation (NSCC). The display shows the status of a completed transfer of a file to NSCC and the next scheduled file. A radio button 2920 may be provided to provide a signal to the system to initiate a process of generating a file for forwarding to the NSCC. Referring to FIG. 30, after the on demand initiation is complete, the system has identified 55 records that are available for NSCC reconciliation, and has completed a load of map codes and trade data related to each of those records.

Referring to FIG. 31, display 3110 is generated by the system in response to receiving data indicative of a user selection of void NSCC Timestamps in the Trading Center Menu. The removal of timestamps applied by NSCC from files returned by NSCC is necessary to avoid duplicate processing. [is this correct?]. The user may employ drop down menu 3120 to select filters for categories of fund companies with respect to which to void NSCC timestamps.

Figure 32:
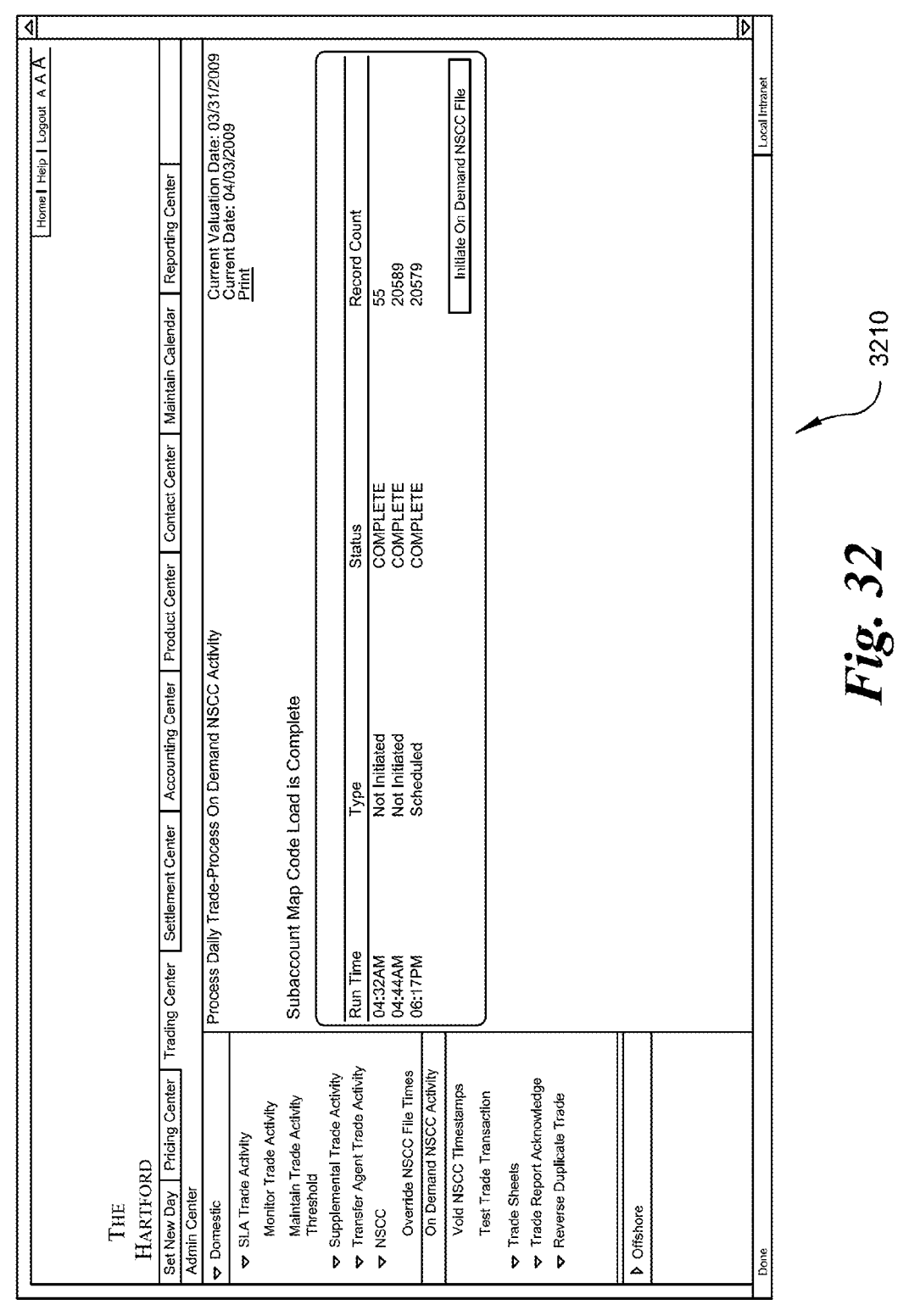

Referring to FIG. 32, display 3210 is generated in response to receiving data indicative of a user selection of On Demand NSCC Activity in the Trading Center menu. The display shows that user initiated file transfer to NSCC is scheduled. The display shows data after a step of voiding NSCC timestamps has been completed. As a result of this step, the record count has decreased from 20589 to 20579, as duplicate files were identified after voiding of the NSCC timestamps.

Figure 33:
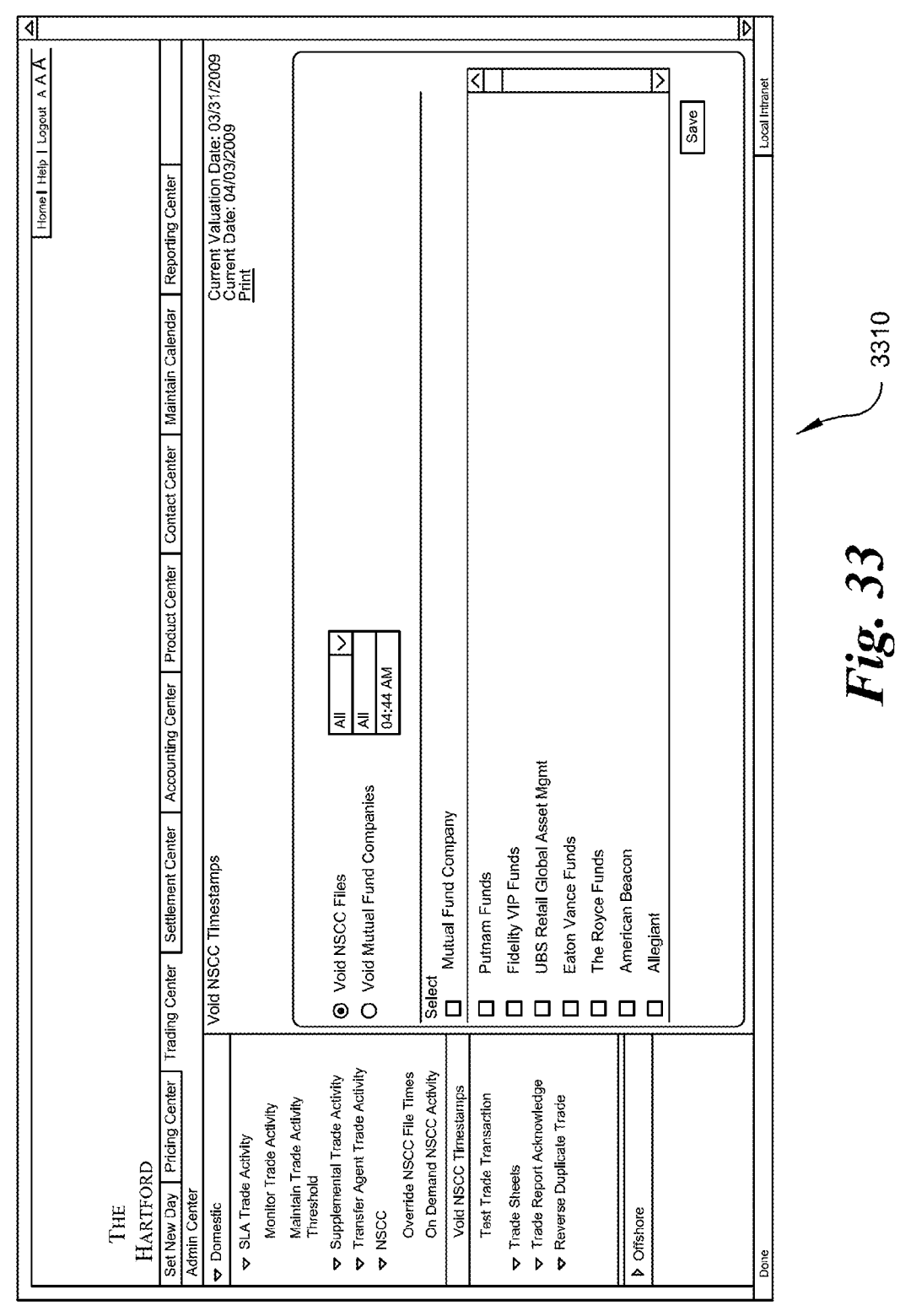

Referring to FIG. 33, display 3310 is generated in response to receiving data indicative of a user selection of Void NSCC Timestamps in the Trading Center menu. The dropdown shows an option of voiding files associated with the 4:44 AM NSCC activity.

Figure 34:
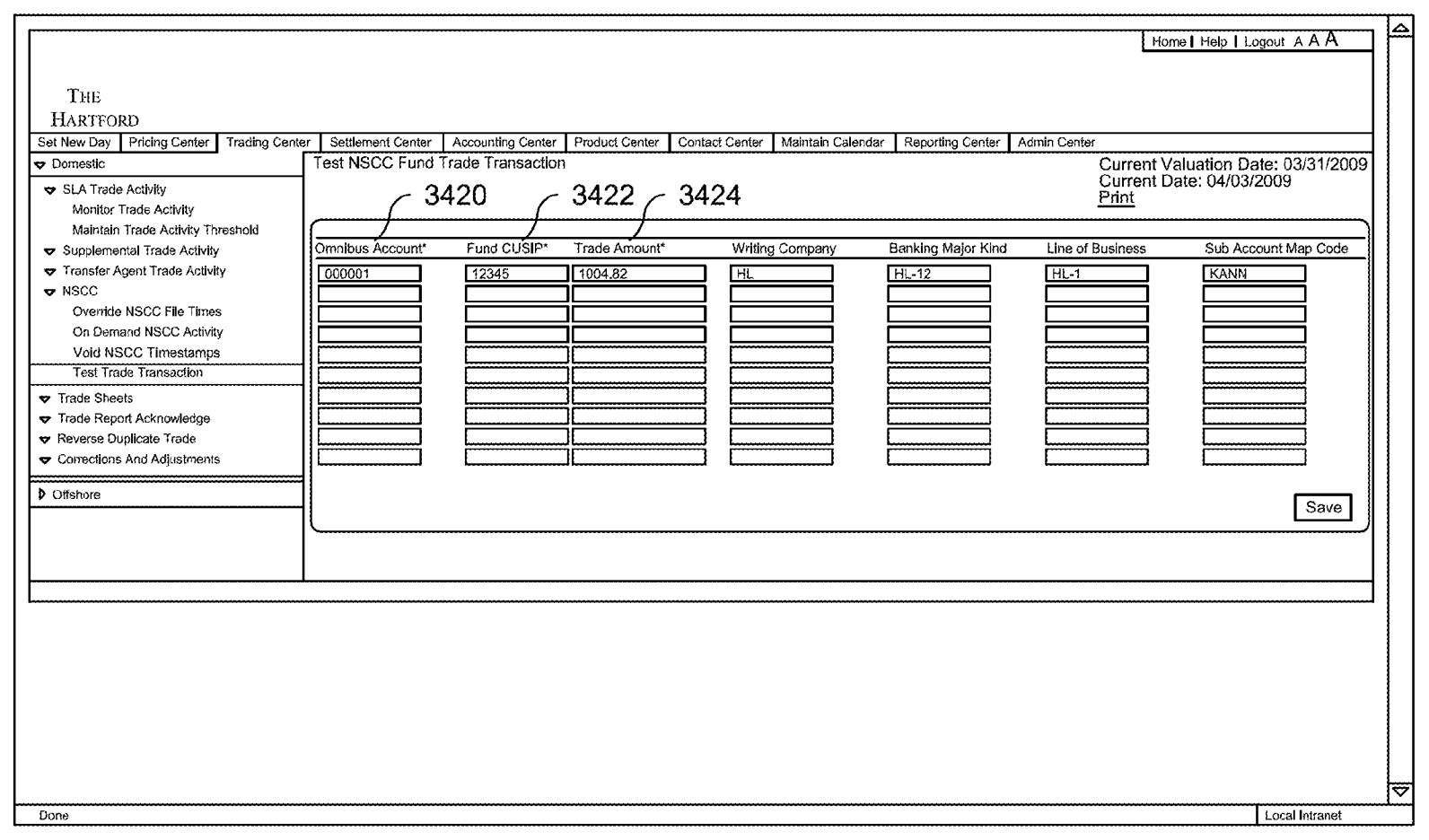
Figure 35:
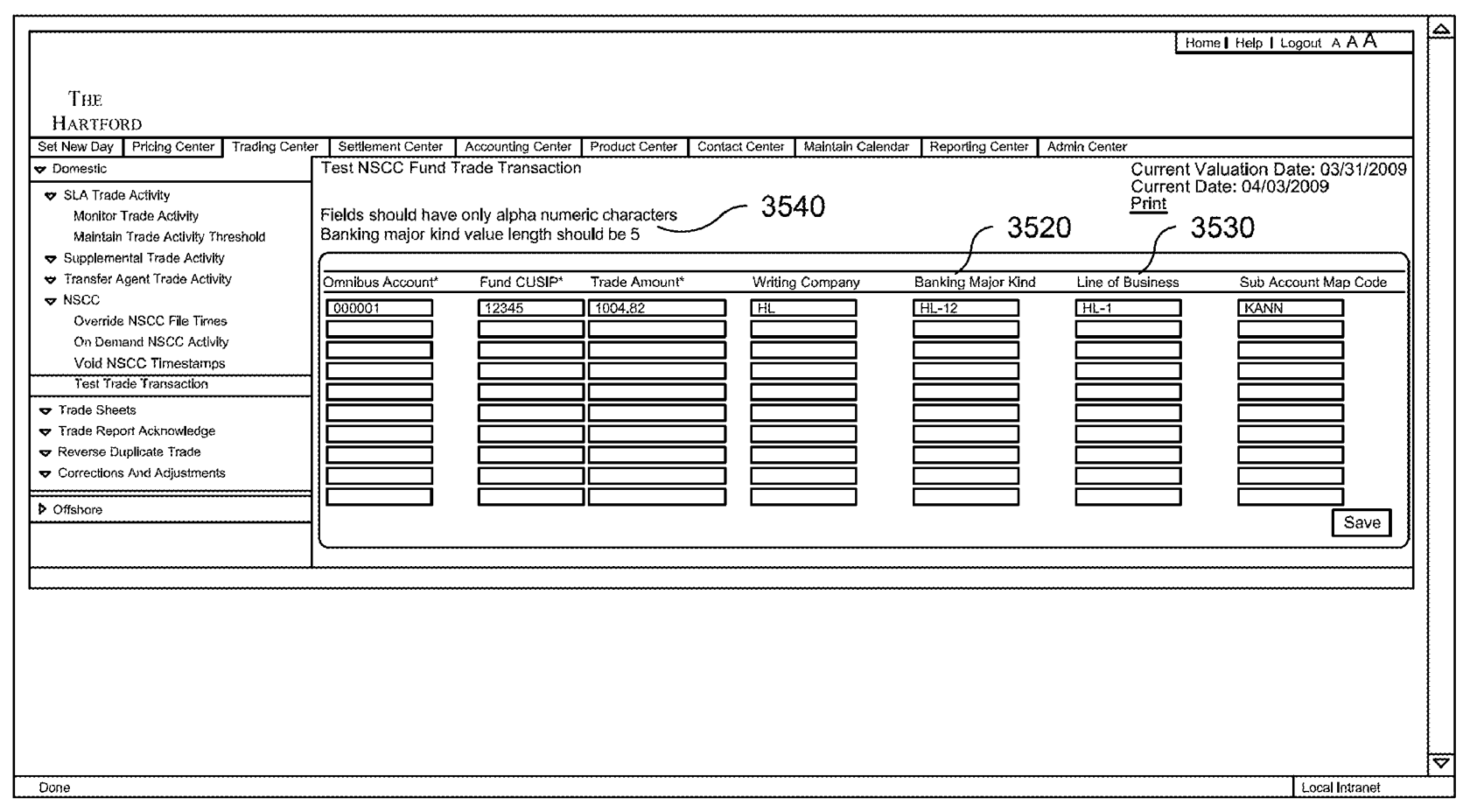
Figure 36:
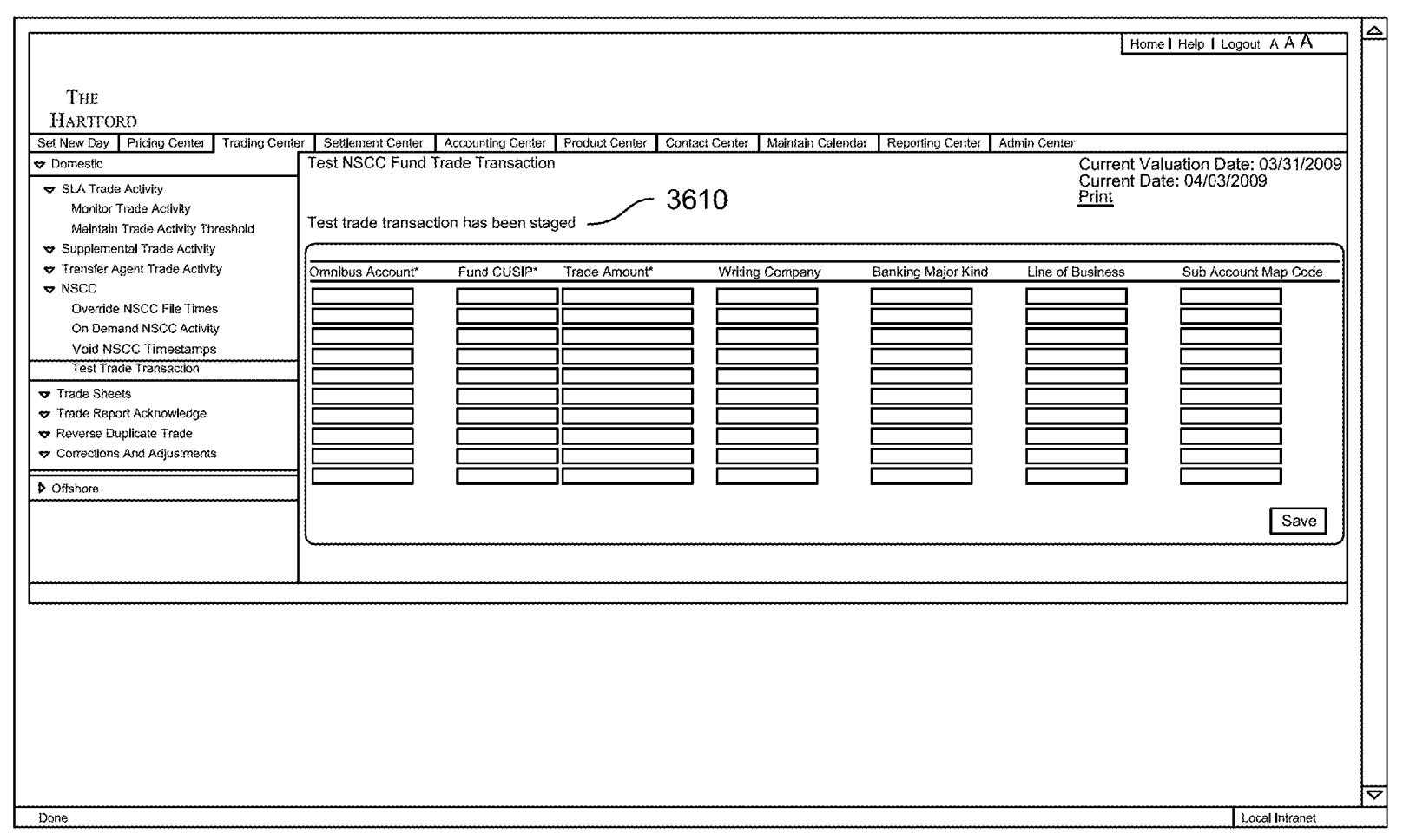

Referring to FIG. 34, display 3410 is generated in response to receiving data indicative of user selection of Test Trade Transaction in the Trading Center menu. The display is formatted for manual entry of trade transactions. The displayed data indicates an account identifier 3420, a fund identifier 3422, a trade amount 3424, the company that writes the funds, major banking, business line, and map code. Upon entry of the data, the system may apply rules to the received data. If the received data violates any of the applied rules, the system will return an error message, such as that shown in display 3510 of FIG. 35, identifying the fields with incorrect information at 3520, 3530, and providing a text description of the rules that have been violated at 3540. If the received data does not violate any of the applied rules, then the system returns a message indicating that the test transaction has been staged, such as that shown at 3610 in FIG. 36.

Figure 37:
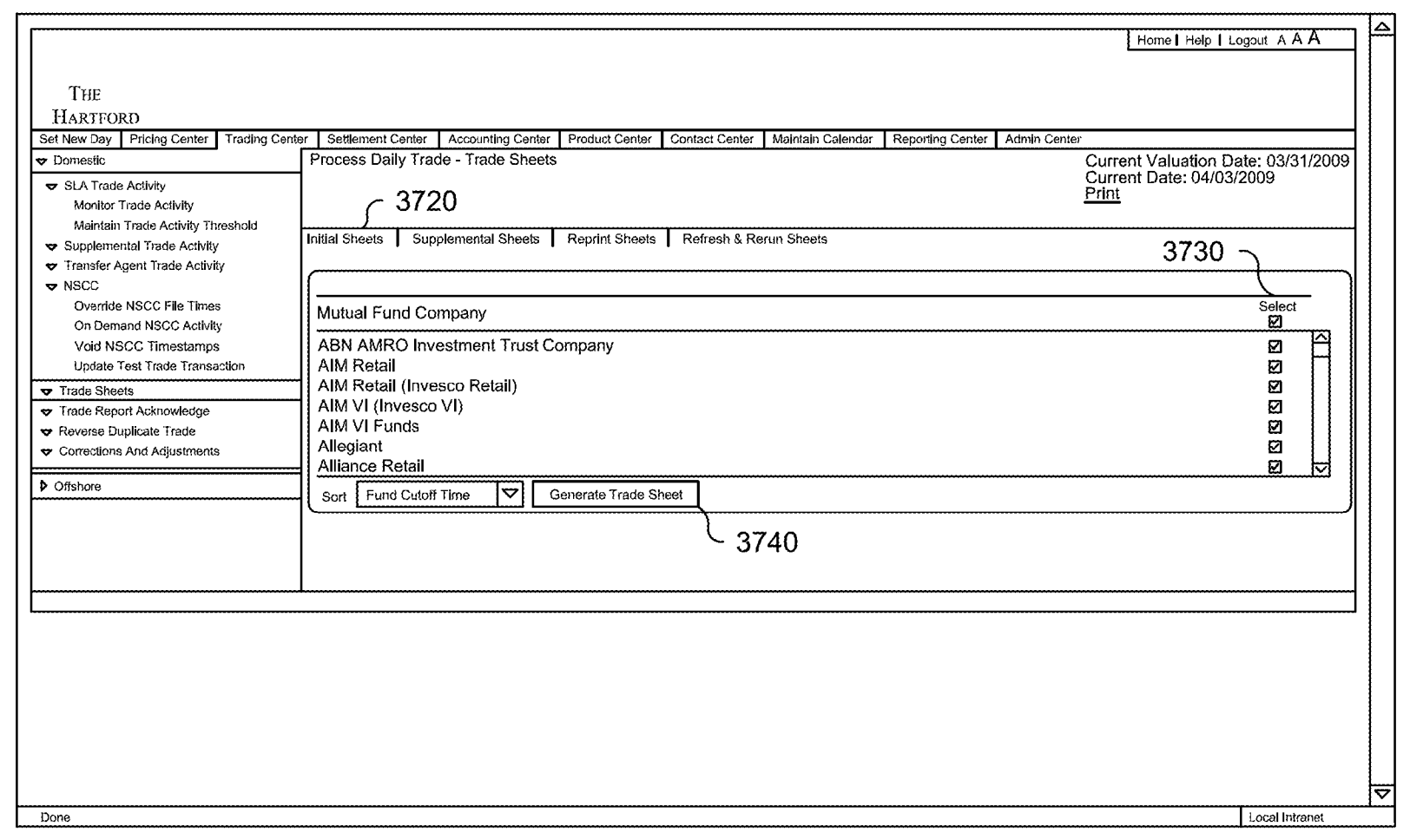

Functionality related to trade sheets will now be explained, with reference initially to FIG. 37. Trade sheets are printed documents that incorporate trading instructions for funds. A trade sheet is to be sent to a particular fund company, and identifies the funds to be traded, types of trades, numbers of shares, accounts, and other pertinent information. Trade sheets may be transmitted via fax or digitally imaged, with image files transmitted via any electronic communications protocol, including e-mail as an attachment, ftp or other posting technology. Display 3710 is returned in response to a user selection of Trade Sheets in the Trading Center menu, followed by a selection of Initial sheets 3720. Initial sheets may refer to trade sheets generated based on available data at that time in the cycle, but necessarily excluding sheets to be generated on trade instructions received late in the cycle or trades added after review and correct of errors. The data may include all fund companies, and the user may have the option of selecting or deselecting individual fund companies at 3730 prior to providing an instruction to the system to generate a trade sheet for each selected fund company, such as by using radio button 3740.

Figure 38:
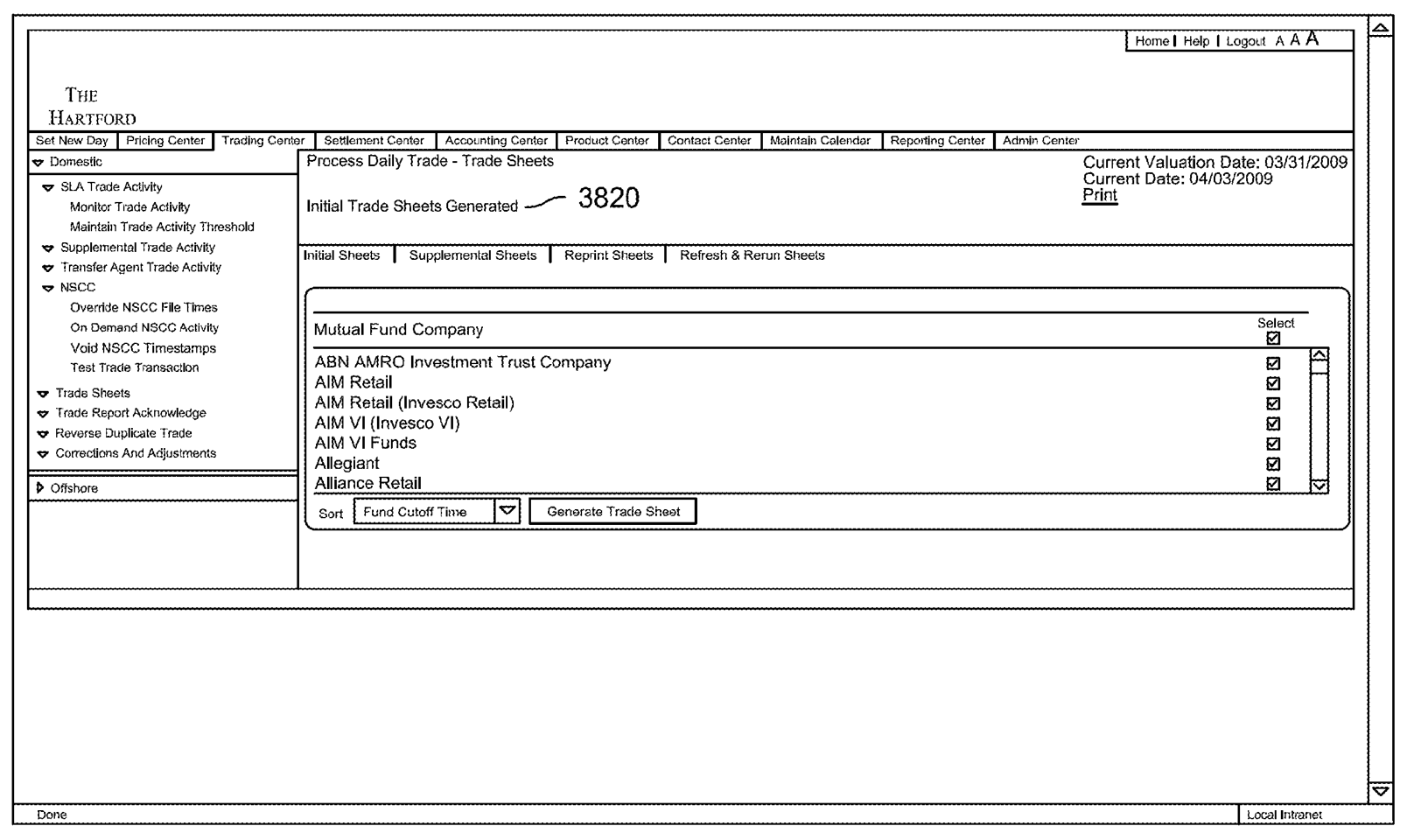

In response, the system may generate, as shown in FIG. 38, a display indicating that initial trade sheets have been generated, at 3820.

Figure 39:
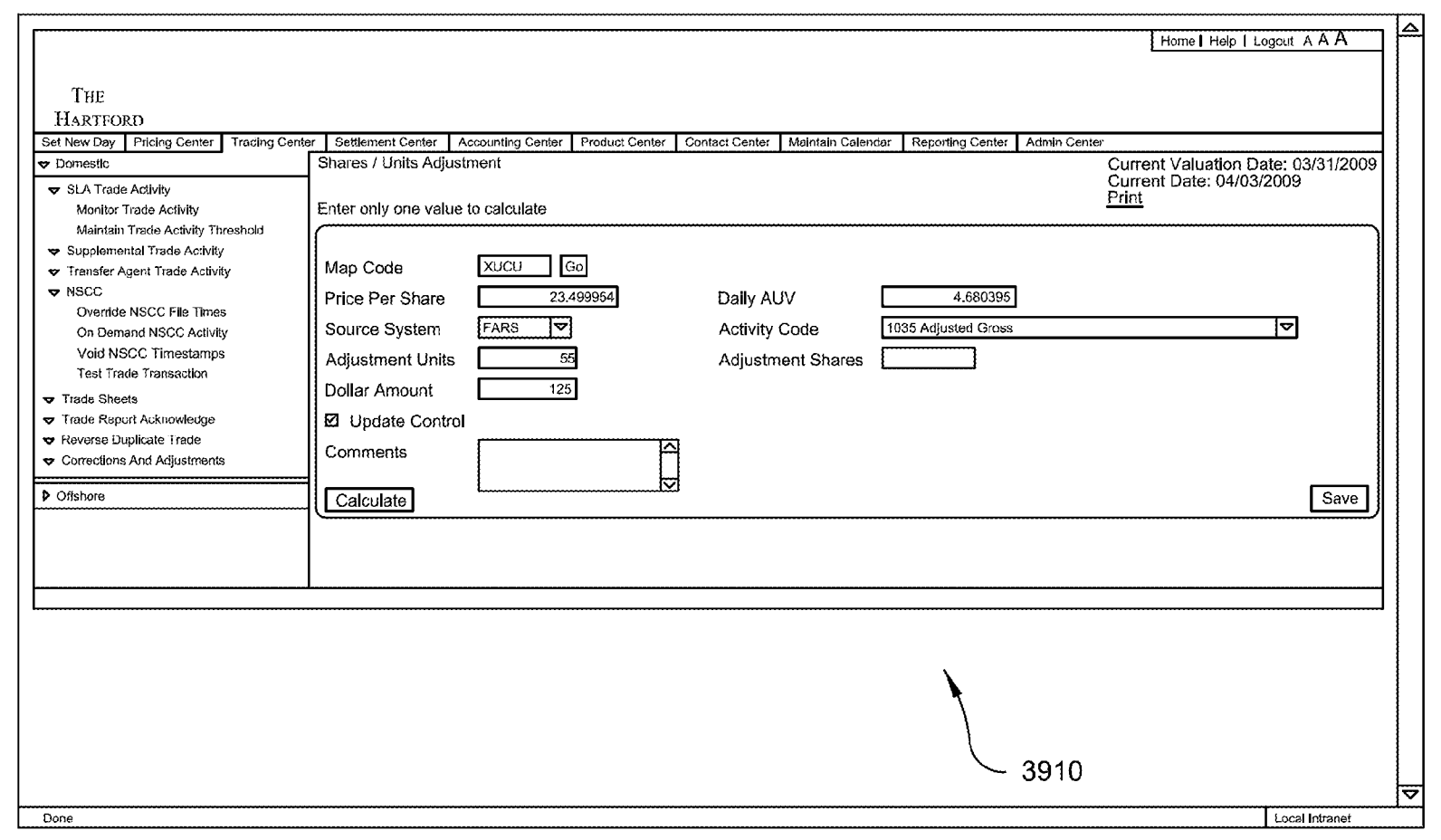
Figure 40:
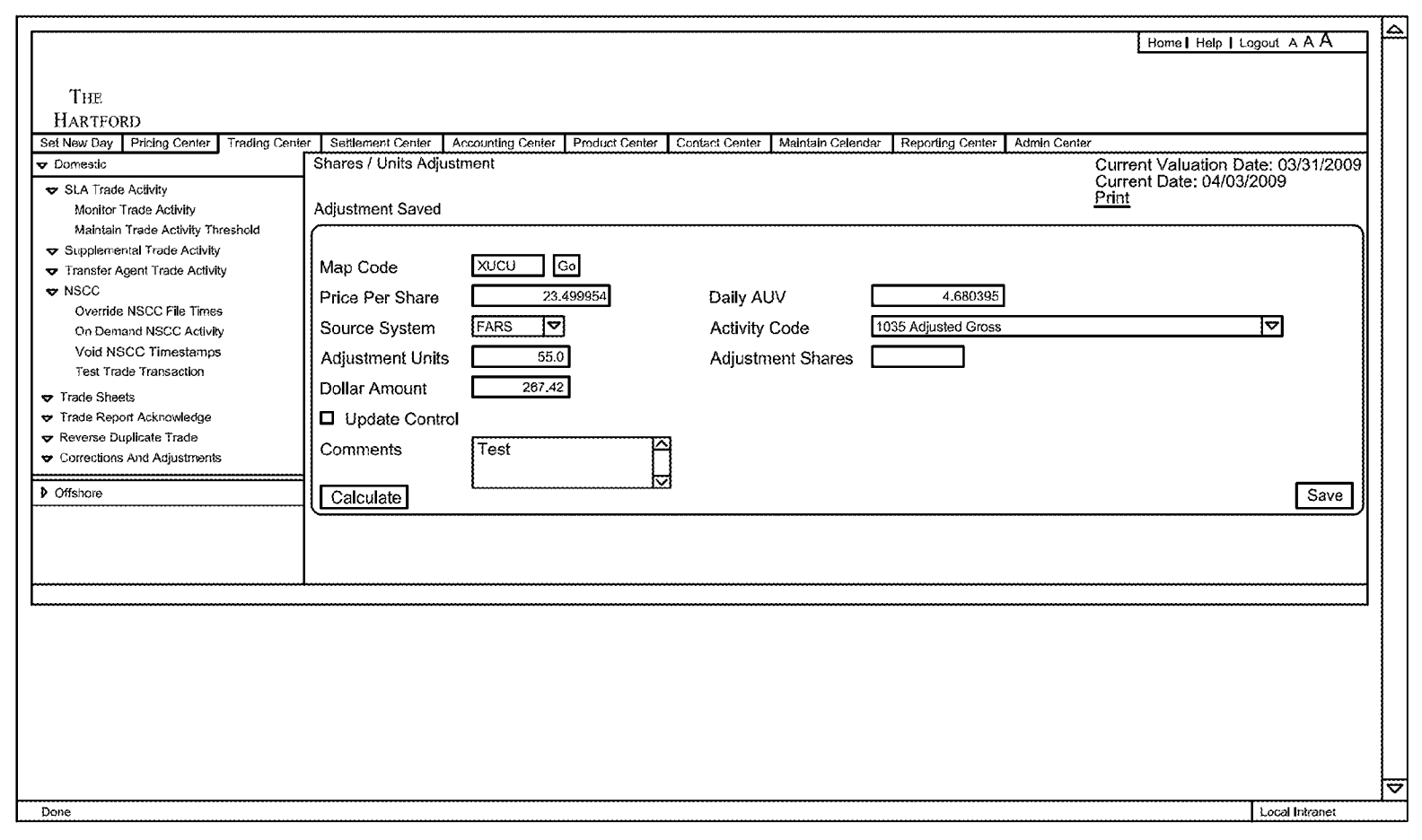
Figure 41:
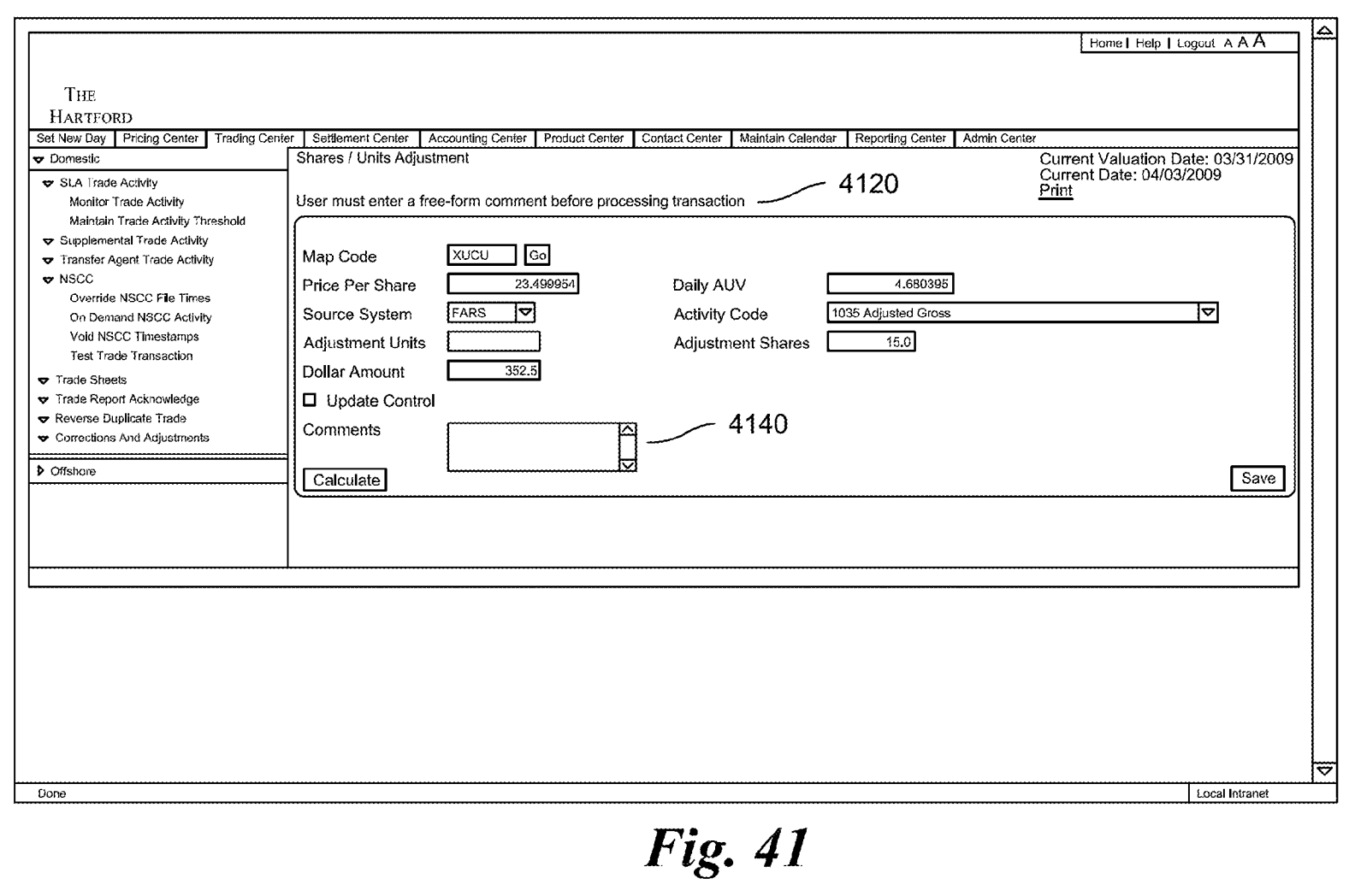

Functionality related to correction and adjustment to trades will now be discussed, commencing with reference to FIG. 39. The display 3910 of FIG. 39 is provided responsive to user selection of Corrections and Adjustments in the Trading Center menu. The user may select a fund by map code, and then input, as appropriate, adjustment units, dollar amount, and activity code. The system accesses price per share and daily adjustment unit value (AUV) from pricing files. In an embodiment, a free text box is provided for the user to input comments; in other embodiments, the user may be provided with a drop down menu as an alternative to or in addition to a free text comment box. The system reviews received values against rules for consistency, and If the values fail to comply with any of the rules, will provide an error message. For example, in FIG. 39, the adjustment units and dollar amount are inconsistent; in FIG. 40, the dollar amount has been system calculated to be consistent with the manually-input dollar amount. In FIG. 41, the system has returned an error message, shown at 4120, as the lack of text comments in box 4140 has violated a rule.

Figure 42:
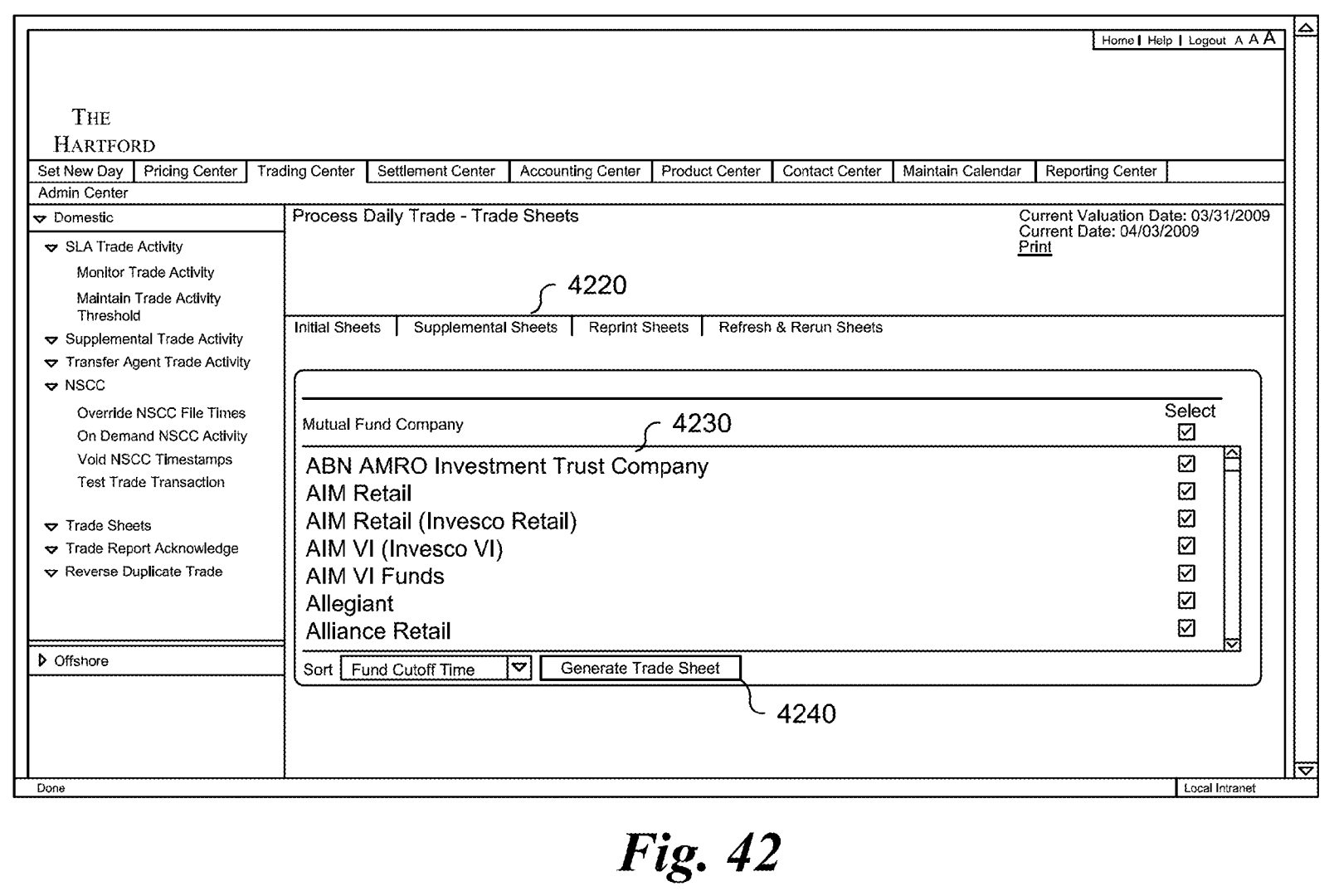

Referring to FIG. 42, in response to user selection of supplemental sheets tab 4220 under the Trade Sheets item of the Trading Center Menu, the system accesses data for trades that have not been included in the initial sheets and provides a listing 4230 of fund companies having funds for which such trades are identified. The user may select all or a subset of fund companies for which supplemental trade sheets are to be generated, and then provide a instruction to the system to generate supplemental trade sheets by selecting button 4240.

Figure 43:
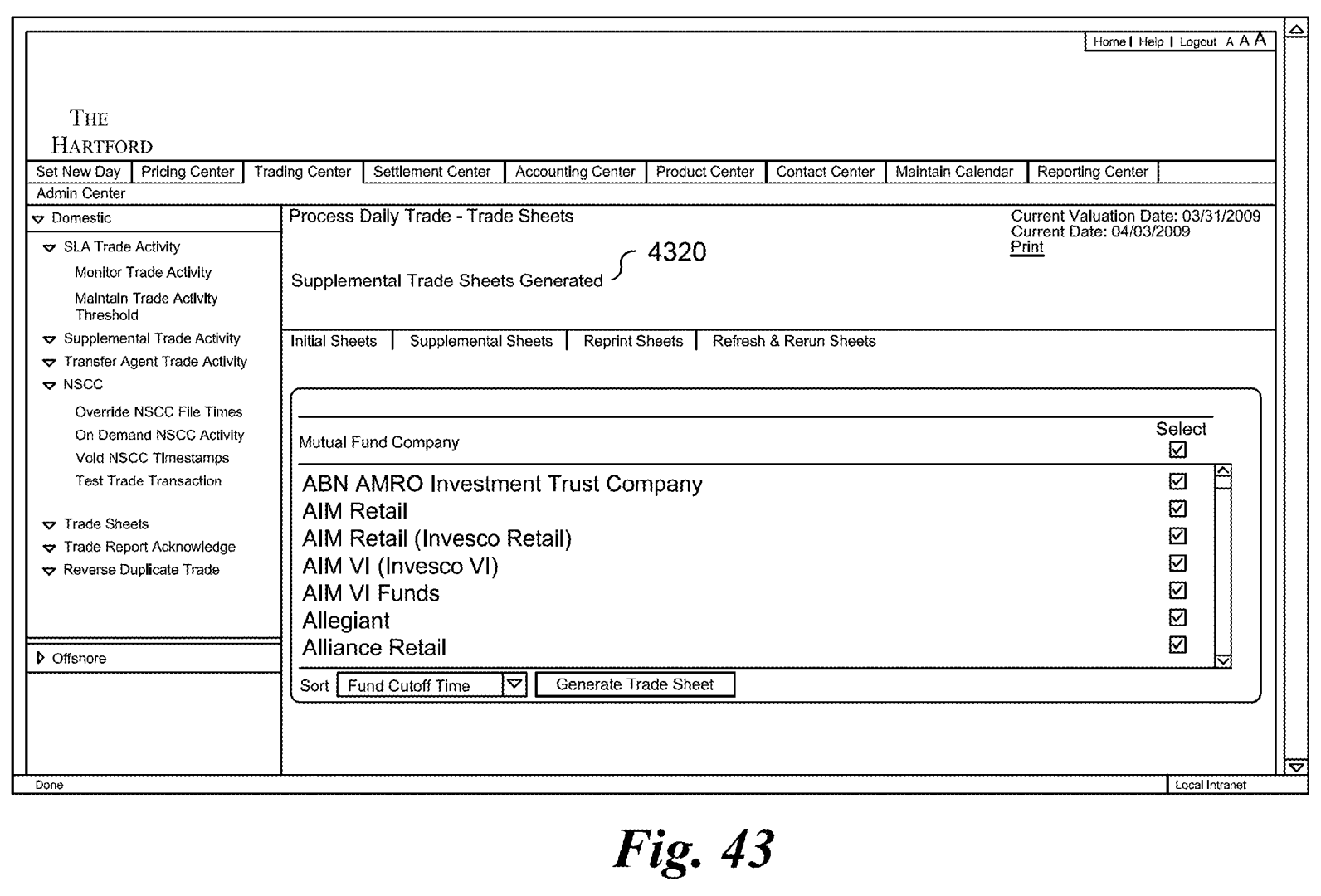

Referring to FIG. 43, responsive to receiving the user instruction to generate supplemental trade sheets, the system has generated the supplemental trade sheets successfully, and has generated display 4310, including a message 4320 indicative that the supplemental trade sheets have been generated successfully. Fund companies with trades for which trade sheets have not been generated are displayed again, and the user may select those fund companies and provide an indication to the system to generate corresponding trade sheets.

Figure 44:
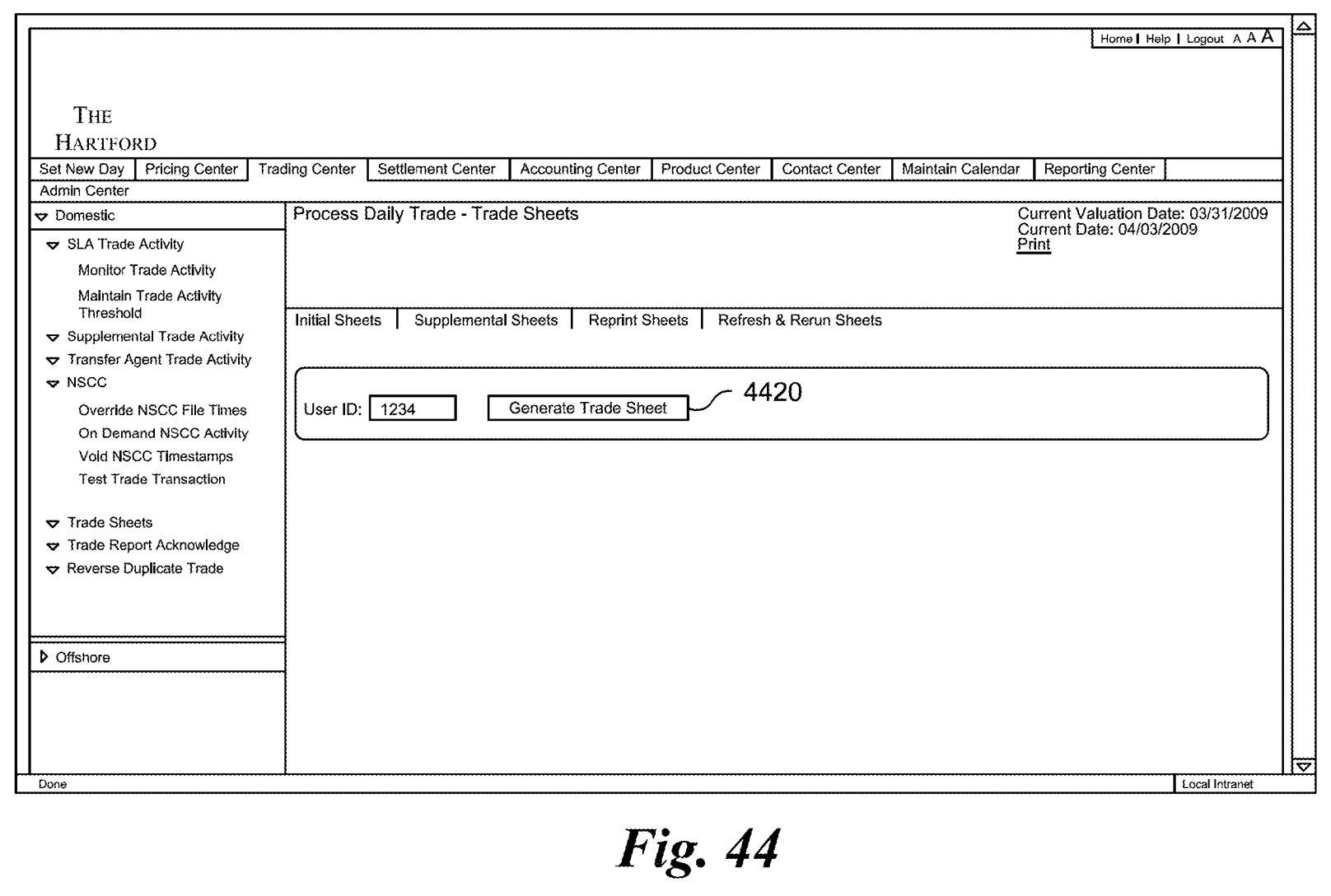
Figure 45:
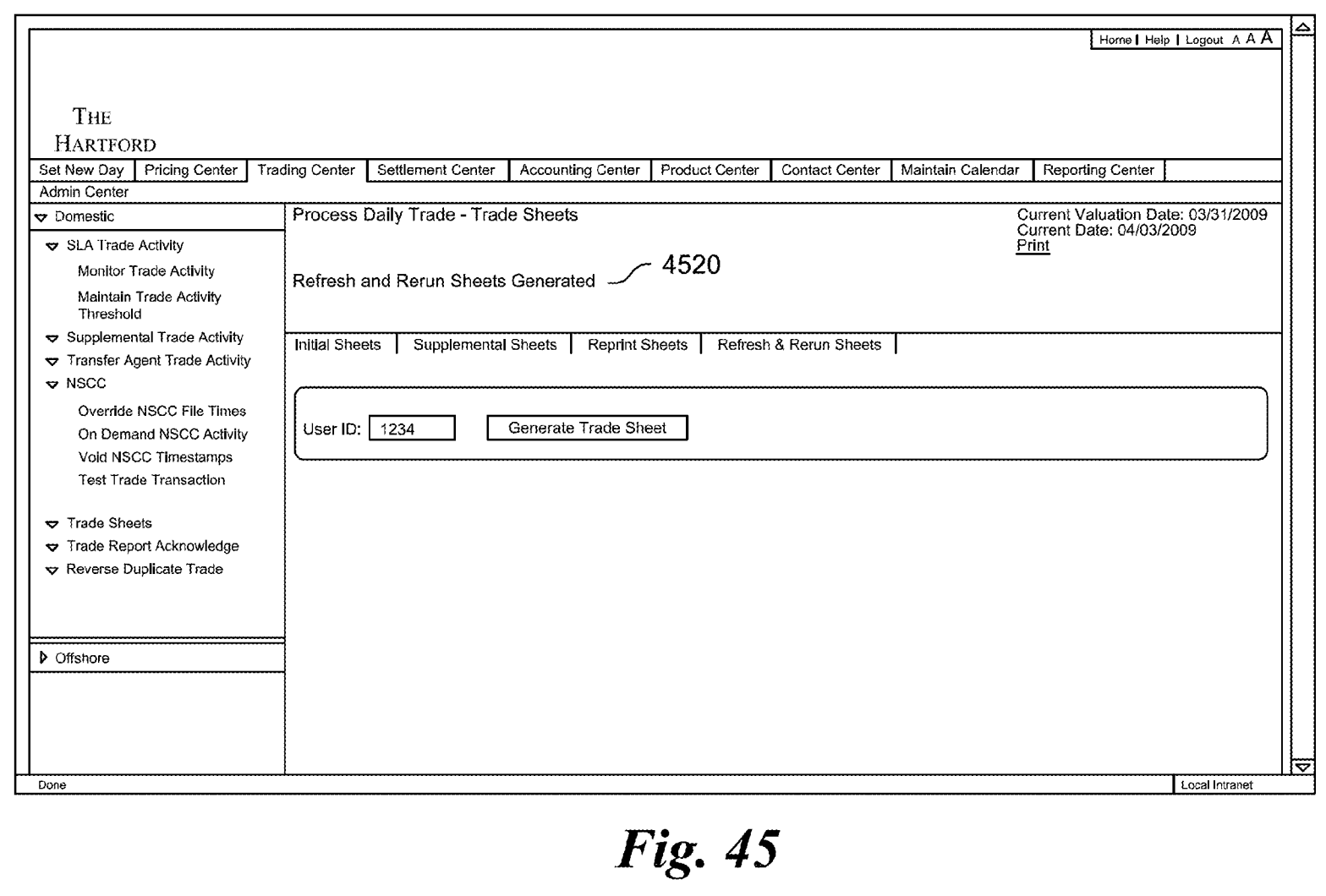

Referring to FIG. 44, responsive to receiving a user selection of the Refresh and Rerun Sheets tab, the system displays a button 4420 for the user to instruct the system to clear the trade sheet files and regenerate trade sheet files from trading data. This button may be selected, for example, if additional pricing data has been received and processed after trade sheets were created but prior to the trade sheets being sent to clearinghouses. In response to selection of button 4420, the system clears or deletes existing trade sheets, and regenerates trade sheets from trade data. As indicated in FIG. 45, if the clearing and regenerating process is successful, the system displays a message 4520 notifying the user of the success of the clearing and regenerating process.

Figure 46:
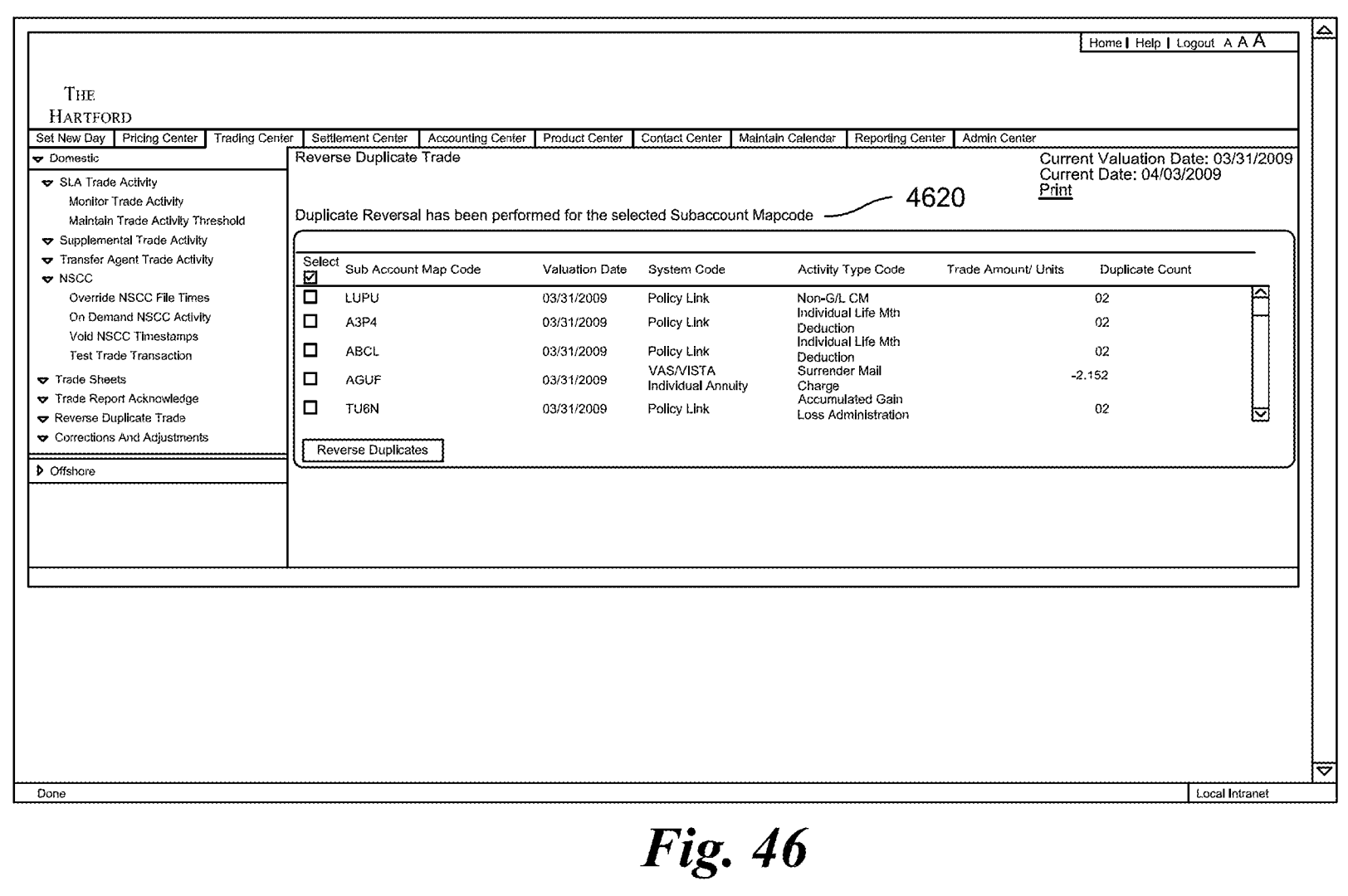

Referring to FIG. 46, a reverse duplicate trade process associated with a system trading functionality will be explained. The reverse duplicate trade process may be performed after creation of trade sheets. The reverse duplicate trade process may be performed after trade sheets have been created and dispatched. If errors are determined after creation and dispatch of trade sheets, a user may select the reverse duplicate trade function from the Trading Center menu. The system performs a search for duplicate trades in the trade data and returns a listing of duplicate trades. The user may approve individual trades and provide a signal to the system to reverse duplicates. The system reverses duplicate trades, such as by removing one of the trades from the trade data. The system may also generate trade sheets to provide instructions to reverse trade. Such trade sheets may be in the form of trade sheets instructing a reversal of the transaction. If the transaction to be reversed is a sale of a certain number of shares of a given fund, then the reverse duplicate trade sheet functionality may generate a trade sheet providing instructions for a purchase of the same number of shares of the same fund. Upon successful completion of the reverse duplicate trade sheet process, a suitable message, such as message 4620 confirming successful removal of trades, may be displayed to the user.

Figure 47:
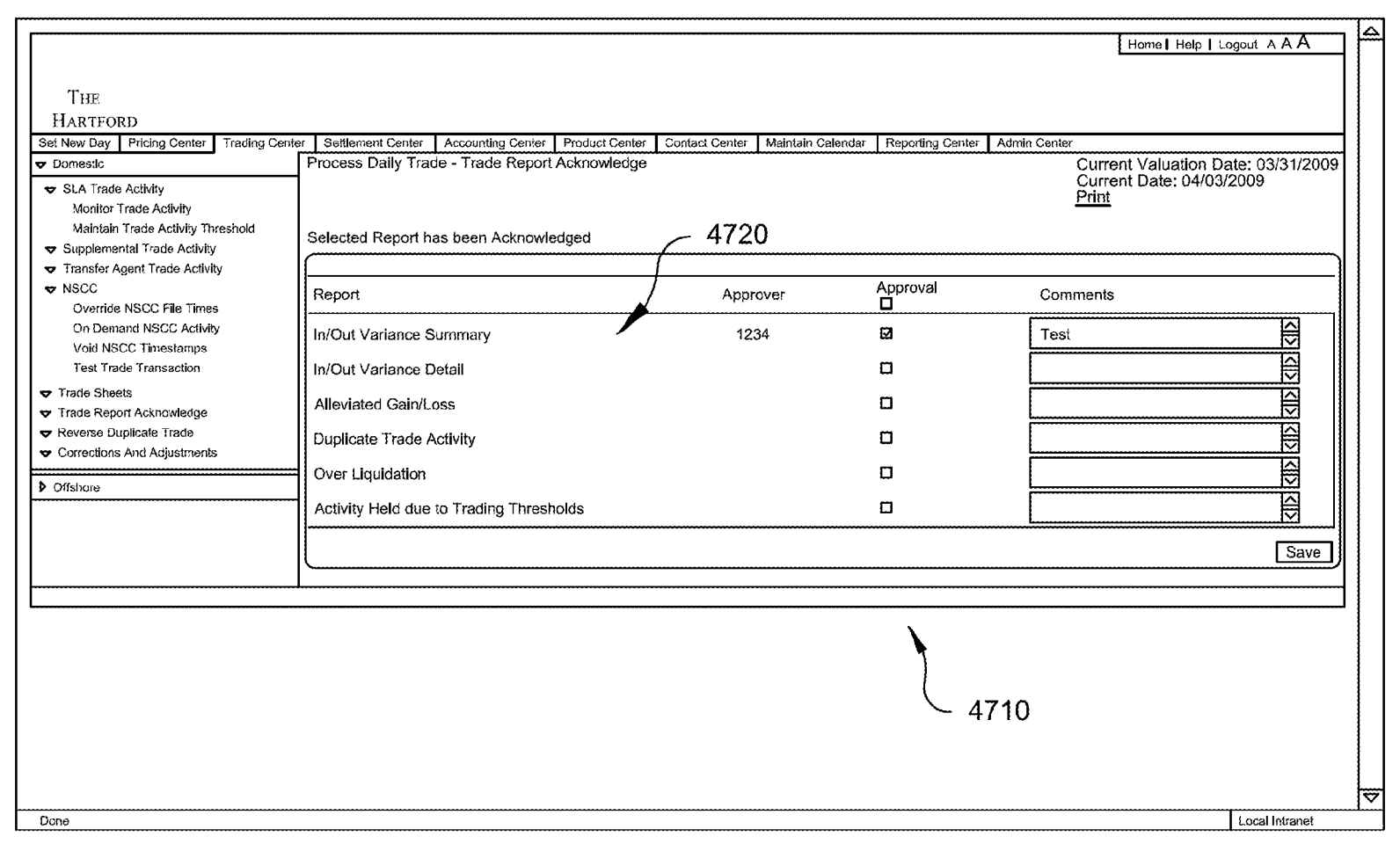

Upon completion of the trading process for the daily cycle, including transmission of trade files and updating of journals, the system may generate reports required by certain business rules. As illustrated in FIG. 47, a display 4710 may identify reports 4720 created in response to identification of variances between received instructions and outbound instructions, reflected as In/Out Variance Summary and In/Out Variance Detail. Any alleviated gain or loss, duplicate trade activity, over liquidation of holdings, or activity held, i.e., trading instructions not executed, due to trading thresholds.

Figure 48:
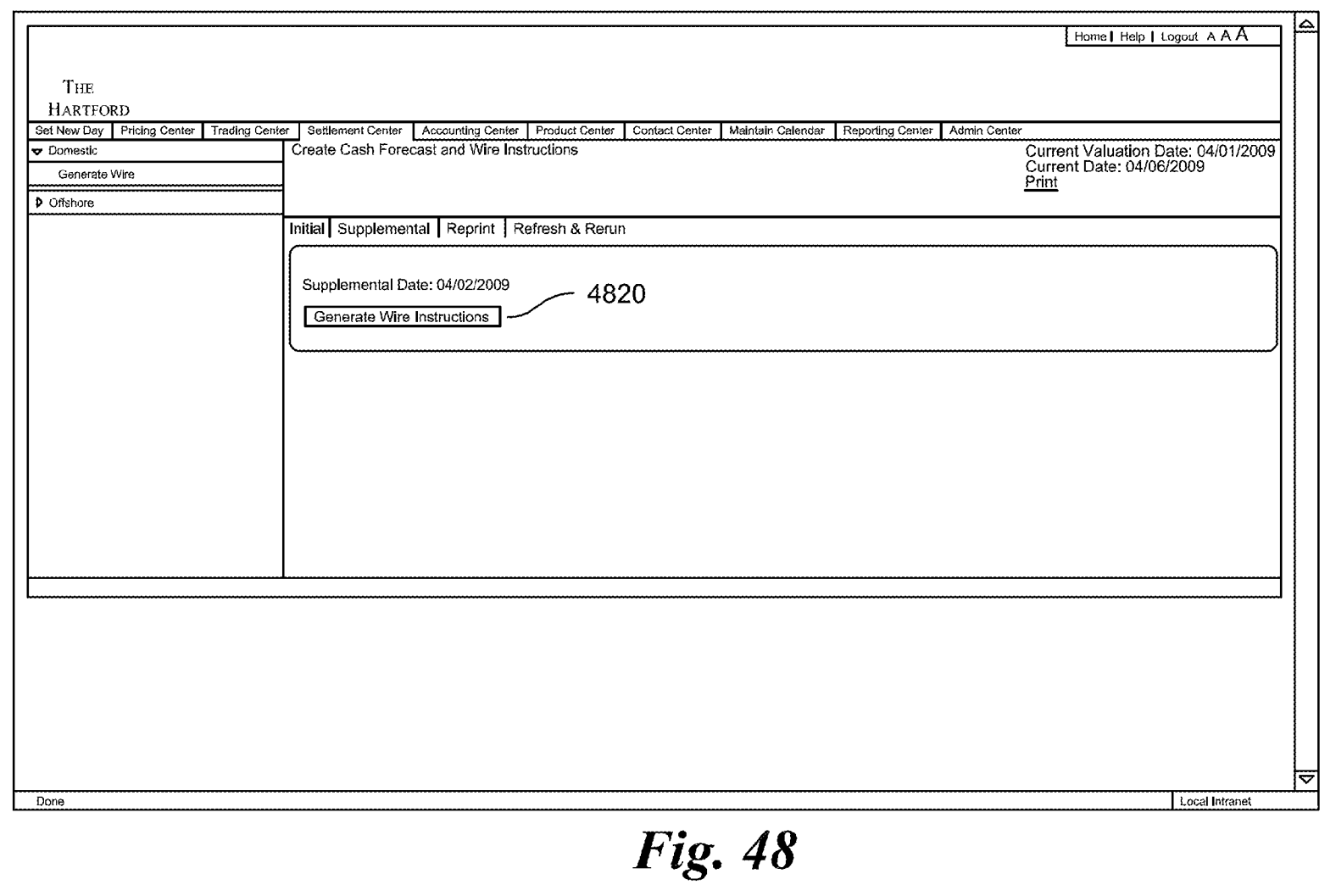

Settlement process activities will now be discussed, commencing with FIG. 48. In response to user selection of the Initial tab under the Generate Wire item in the Settlement Center menu, the system will generate a screen permitting a user option to provide an instruction for creation of wire instructions and a forecast of cash needed. The wire instructions will provide instructions to banking institutions to wire funds to fund companies sufficient to support net buy trading instructions, for example. The system may apply a rule that verifies completion of the trading process prior to permitting a user option to provide an instruction for creation of wire instructions; if the trading process is not complete, an error message may be displayed for the user.

In response to user selection of the Supplemental tab, the system applies a rule requiring that the initial wire instructions must have been generated prior to commencement of the process for generation of supplemental wire instructions. Referring to FIG. 49, the system may generate an error message 4920, indicating that the initial wires process must be initiated prior to initiating the supplemental wire process. Once the rule that the initial wire instructions must have been generated has been satisfied, a user may provide an instruction to the system to generate supplemental wire instructions, such as by selecting button 4930.

Figure 50:
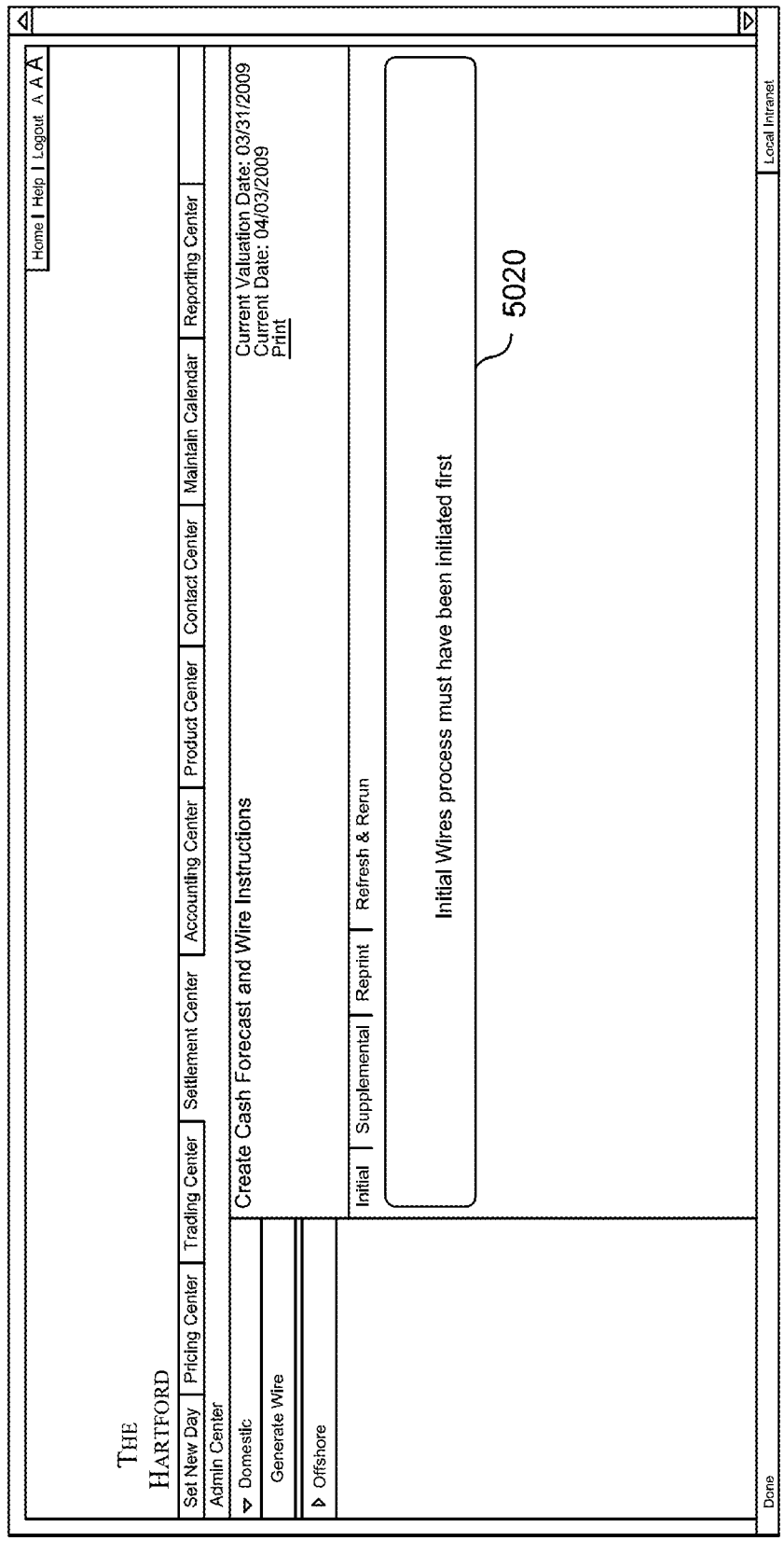
FIG. 50 is an exemplary screen indicating an error message reflecting application of a further rule in a settlement process displayed to a user according to an embodiment.
Figure 51:
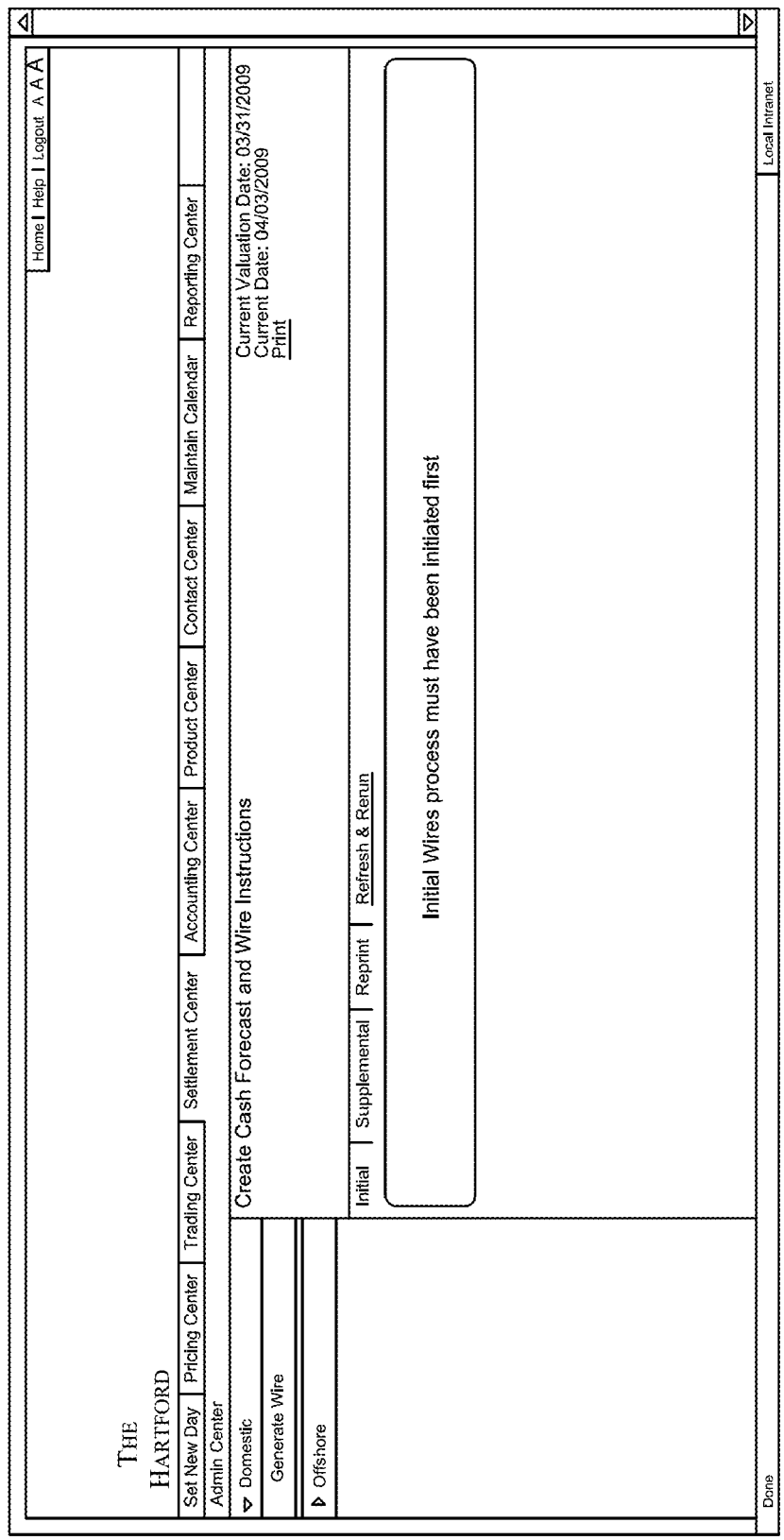
FIG. 51 is an exemplary screen indicating an error message reflecting application of a further rule in a settlement process displayed to a user according to an embodiment.

In response to user selection of the Reprint tab, the system applies a rule requiring that the initial wire instructions must have been generated prior to commencement of the process for reprint of the wire instructions. If the application of the rule shows that the initial wire instructions have not been generated, the system may generate an error message, such as the error message 5020 shown in FIG. 50. Similarly, in response to user selection of the Refresh & Return tab, the system applies a rule requiring that the initial wire instructions must have been generated, and generates an error message for display to the user, as indicated in FIG. 51.

Figure 53:
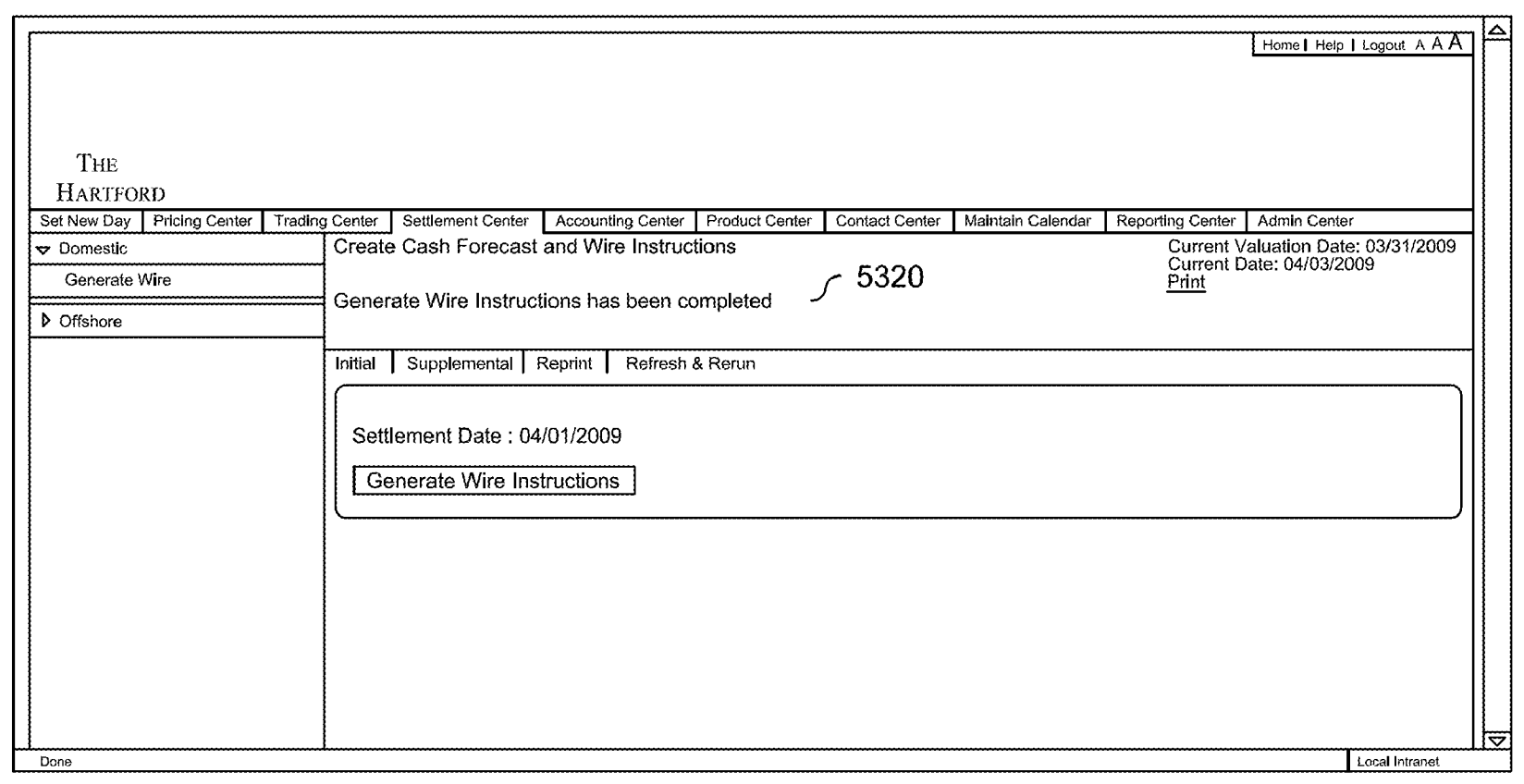

Once initial wire instructions are generated, a confirmation message, such as message 5220 of FIG. 52, is generated for display to the user. Journals applicable to settlement data are populated with data substantially as contained in the wire instructions. Similarly, the user may provide an instruction for the system to generate supplemental wire instructions for wiring of supplemental trades. Upon successful completion of generation of supplemental wire instructions, the system generates a confirmation message 5320 of FIG. 53.

Figure 54:
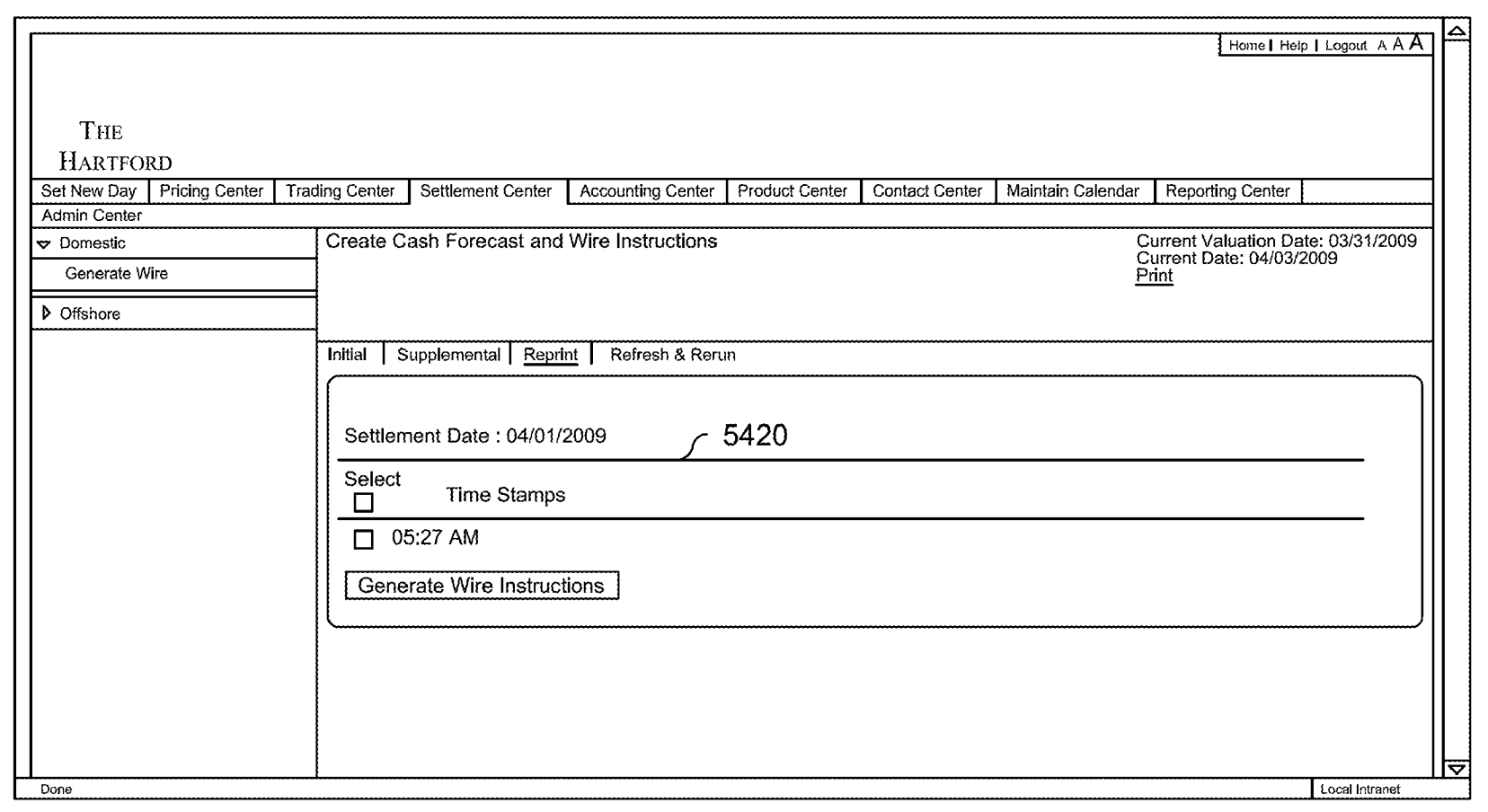
Figure 55:
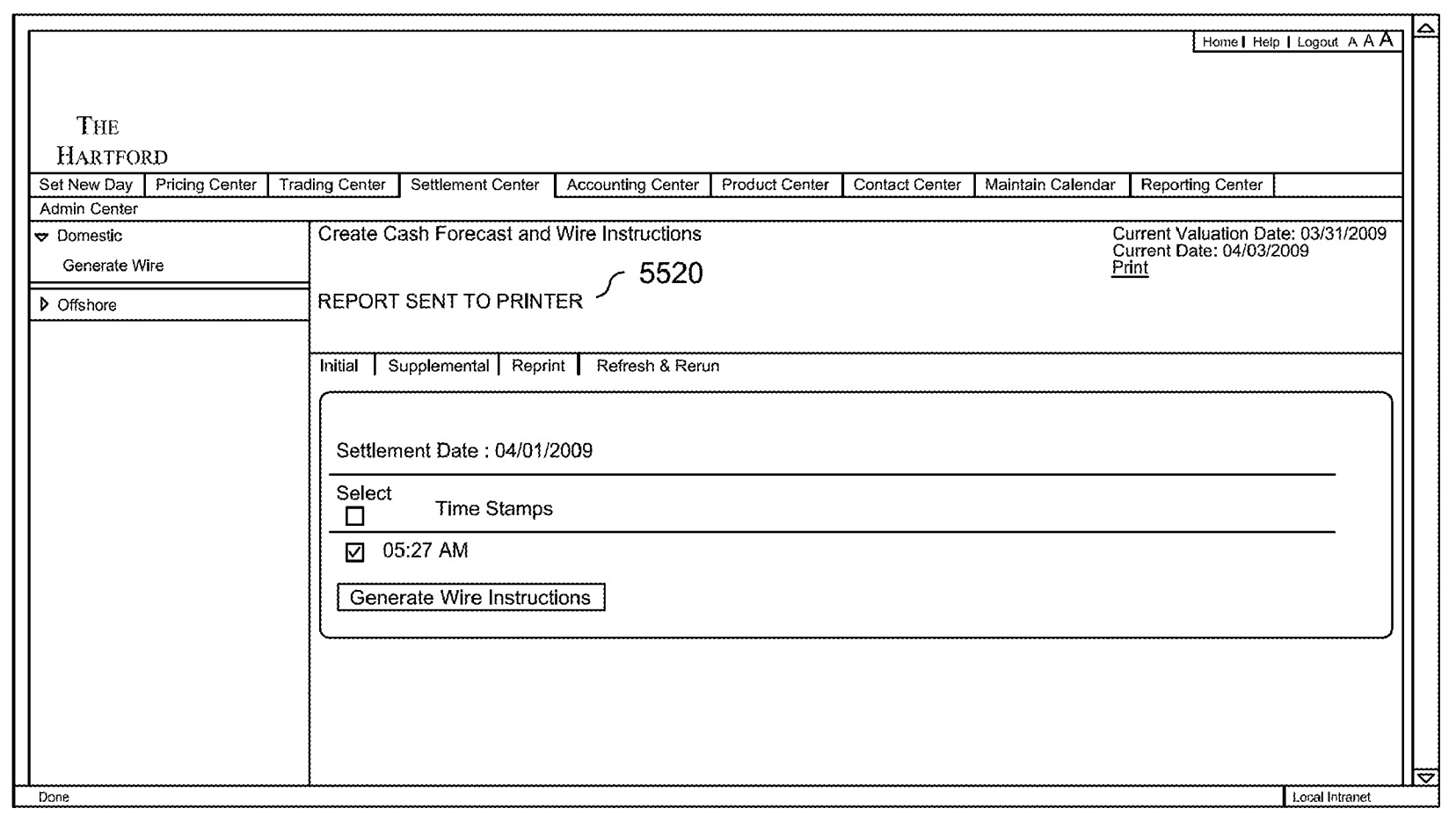

Referring to FIG. 54, if the user selects the reprint tab, the system presents a listing of wire instructions, organized by the time of generation, such as at 5420. Upon receipt of a user instruction to reprint, existing wire instructions are reprinted. Upon completion of the reprint process, the system generates a message indicating that the report has been sent to the printer, such as message 5520 of FIG. 55.

Figure 56:
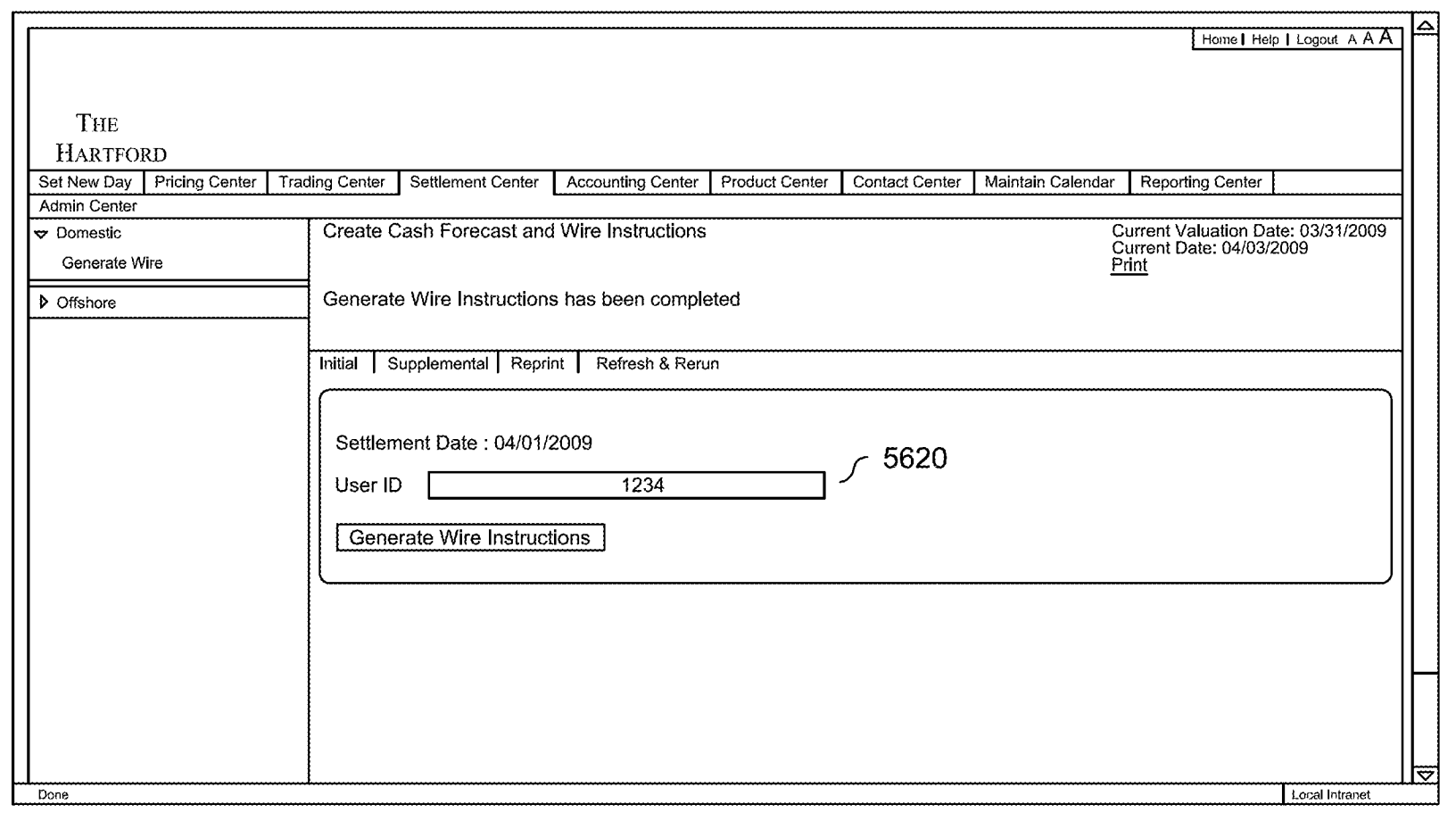

In response to user selection of the Refresh & Rerun tab, if the selection is valid according to applied rules, then the system generates, referring to FIG. 56, a display 5620 prompting a user to instruct the system to delete the existing wire instructions and generate a new set of wire instructions from the trade data.

Figure 57:
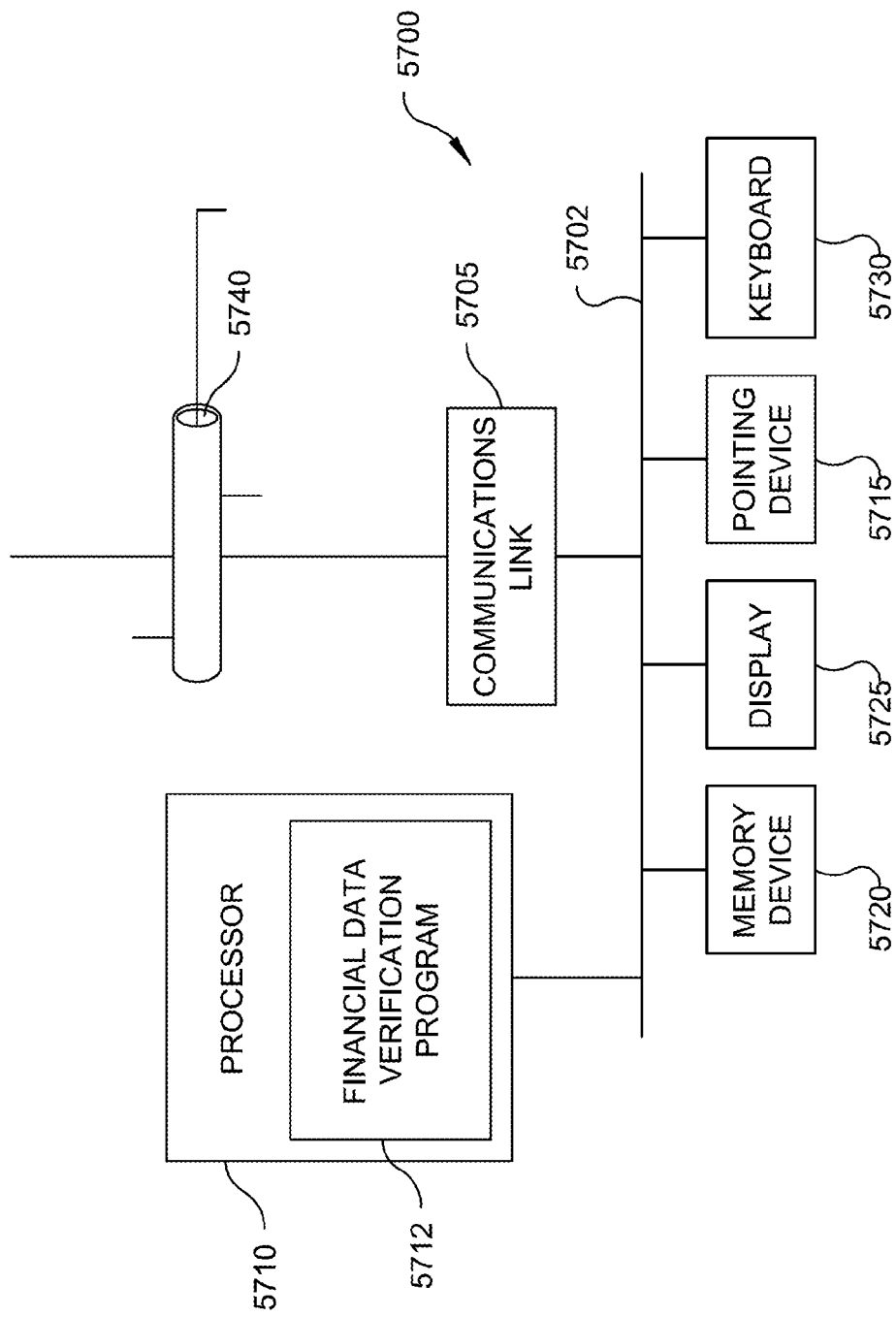
FIG. 57 is an exemplary schematic diagram of a computer system for implementing a method and system according to an embodiment.

Referring now to FIG. 57, a schematic diagram illustrates an exemplary computer system for use in embodiments disclosed herein. In computer system 5700, processor 5710 executes instructions contained in programs such as financial data verification program 5712. Programs may be stored on suitable media, such as optical or magnetic disks, fixed disks with magnetic storage (hard drives), tapes accessed by tape drives, and other storage media. Processor 5710 communicates, such as through bus 5702 and/or other data channels, with communications port 5705, receives data from user inputs such as pointing device 5715 and keyboard 5730, and provides data to display 5725. Memory device 5720 is configured to exchange data with processor 5710, and may store programs containing processor-executable instructions, and values of variables for use by such programs. User input may include devices other than pointing devices and keyboards, such as touch screens. In an embodiment, users may interface with system 5700 via communications port 5705 and suitable wired and wireless networks to workstations, laptops, personal digital assistants, smart phones and other devices. By way of non-limiting example, suitable video drivers may cause display 5725 to display data to human operators. Human operators may provide inputs in response to prompts, numerous examples of which are described and illustrated above. Communications port 305 may communicate with remote sources of data, file servers and other computing systems and devices via LAN 5740. LAN 5740 is merely exemplary, and communication may be by one or more of suitable communication methods, including over wired or wireless local area networks and wide area networks, and over communications between networks, including over the Internet. Any suitable data and communication protocols may be employed.

Embodiments of the present invention are operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by a processor executing instructions contained in programs which may be stored in a storage medium, such as a magnetic or optical storage medium. The instructions may, when executed by a processor, cause the processor to execute algorithms disclosed in association with each step. It will be appreciated that any of the steps in the methods in accordance with the invention described herein may be so implemented.

Figure 58:
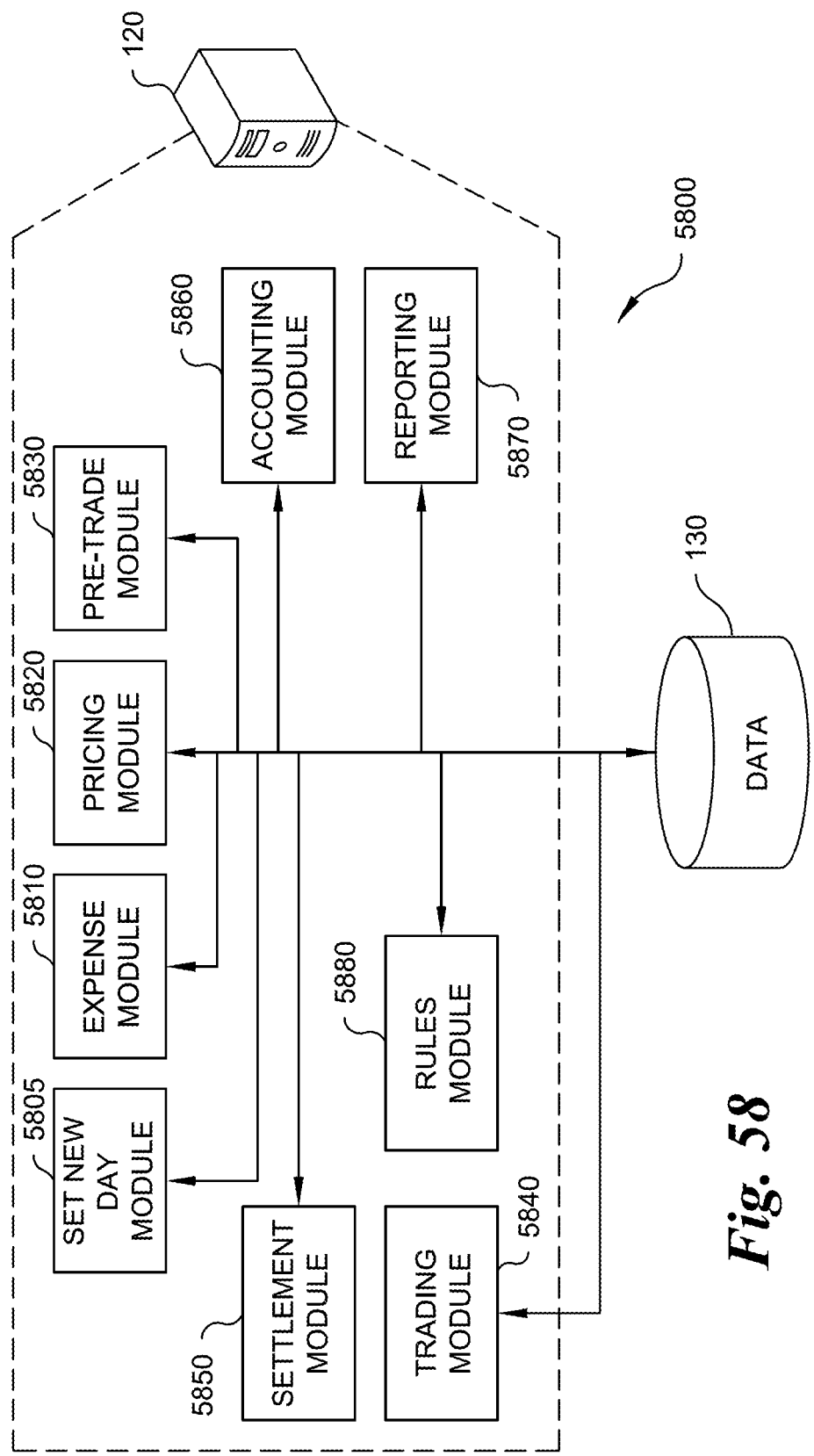
FIG. 58 is an exemplary schematic diagram showing modules in a system according to an embodiment.

An exemplary advantage of a system and method in accordance with an embodiment is that accurate records may be maintained of numerous investment management functions. Creation and updating of accounting journals for each process serves to render the process more susceptible to auditing. Each process illustrated in FIG. 2 may be modular, in that each process operates using separate code. In an embodiment illustrated in FIG. 58, system 5800 includes modules operating in a computer system, such as in servers 120 of FIG. 1. Each of the illustrated modules performs operations and reads and writes to datastore 130. For ease of illustration, other system components, such as database servers, are not shown in FIG. 58. Servers 120 may constitute a server farm, and each module is not limited to execution on a single one of the servers in the server farm. Set new day module 5805 includes code which, when executed by a processor of server 120, performs the set new day processes discussed above. Set new day module 5805 accesses data in datastore 130, and stores data in datastore 130. Data stored in datastore 130 by set new day module 5805 employs a common data format that is used by each module.

Expense module 5810 includes code which, when executed by a processor of server 120, performs operations to implement the functionality of expense process 210 (of FIG. 2), including functionality for calculation of expenses on accounts, as described in greater detail above. Expense module 5810 accesses data in datastore 130 and stores data in datastore 130. Data stored in datastore 130 by expense module 5810 employs the common data format that is used by each module.

Pricing module 5820 includes code which, when executed by a processor of server 120, performs operations to implement the pricing process 220 (of FIG. 2), including functionality for receiving, verifying and providing as an output fund prices, as described in greater detail above. Pricing module 5820 accesses data in datastore 130 and stores data in datastore 130. Data stored in datastore 130 by pricing module 5820 employs the common data format that is used by each module.

Pre-trade module 5830 includes code which, when executed by a processor of server 120, performs operations to implement the pre-trade process 230 (of FIG. 2). Pre-trade module 5830 accesses data, such as data regarding prices stored by pricing module 5820, in datastore 130 and stores data in datastore 130. Data stored in datastore 130 by pre-trade module 5830 employs the common data format that is used by each module.

Trading module 5840 includes code which, when executed by a processor of server 120, performs operations to implement the trading process 240 (of FIG. 2), including generation of trading instructions for dispatch to fund companies. Trading module 5840 accesses data in datastore 130, such as pricing data stored by pricing module 5820 and trade-related data stored by pre-trade module 5830, and stores data in datastore 130. Data stored in datastore 130 by trading module 5840 employs the common data format that is used by each module.

Settlement module 5850 includes code which, when executed by a processor of server 120, performs operations to implement the settlement process 250 (of FIG. 2), including generation of payment instructions. Settlement module 5850 accesses data in datastore 130, including data relating to trades stored by trading module 5840, and stores data in datastore 130. Data stored in datastore 130 by settlement module 5850 employs the common data format that is used by each module.

Accounting module 5860 includes code which, when executed by a processor of server 120, performs operations to implement accounting process 260 (of FIG. 2), including creation of accounting ledgers 262. Accounting module 5860 accesses data in datastore 130, including data stored by each of expense module 5810, pricing module 5820, pre-trade module 5830, trading module 5840 and settlement module 5850. Data stored in datastore 130 by accounting module 5860 employs the common data format that is used by each module.

Reporting module 5870 includes code which, when executed by a processor of server 120, performs operations to implement reporting process 270 (of FIG. 2). Reporting module 5870 accesses data stored in datastore 130, including accounting data stored by accounting module 5860. Data stored in datastore 130 by reporting module 5870 employs the common data format that is used by each module.

Rules module 5880 includes code which provides rules restricting execution of each of the modules. For example, rules which prohibit a commencement of operations by expense process module 5810 until set new day module 5805 has completed its operations on a daily cycle may be contained in rules module 5880.

The use of modules and a common data format facilitates interactions with other systems in which only selected modules of system 5800 perform operations on data; other operations are performed by other systems. The other systems, in order to interact with system 5800, accept or access data stored in the common data format. If the other systems furnish data for use by modules of system 5800, the other systems must comply with rules requiring that the data be in the common format used by all of the modules. By way of example, for selected data, system 5800 may perform only the functions executed by pricing module 5820. Another system may furnish data in the common format for the use of pricing module 5820, and receive data in the common format after processing by pricing module 5820. In another embodiment, system 5800 may perform only the functions executed by trading module 5840 for selected data. Another system may furnish data in the common format to system 5800 for the use of trading module 5840, and access data stored by trading module 5840 in the common format. In another embodiment, for certain accounts or funds, the functions performed by pricing module 5820, pre-trade module 5830, and trading module 5840, may be performed by another system. The other system may access data stored by expense module 5810, and provide data in the common format for storage in datastore 130 for the use of settlement module 5850, accounting module 5860, and reporting module 5870. In another embodiment, for certain data, reporting module 5870 may not perform operations. Another system may access or otherwise receive data stored in the common format, such as data stored by accounting module 5860, and perform reporting functions.

In another embodiment of system 5800, the functions performed by trading module 5840 are not performed by system 5800. Another system may access data stored by pricing module and pre-trade module 5830 and perform the functions of trading module 5840, including creating and transmitting data indicative of instructions for execution of trades. The data indicative of instructions for execution of trades is stored in the common data format and is accessed by settlement module 5850 for performing settlement functionality.

In another embodiment of system 5800, the functions performed by settlement module 5850 are not performed by system 5800. Another system may access data stored by trading module 5840 and perform settlement functions, including providing instructions for effecting payment for trades. The another system may store data indicative of the performance of the settlement functions in the common data format in memory devices accessible to accounting module 5860.

In an embodiment, additional functionality may be embodied in additional modules, which may be added in added standalone components. By modification of rules in rules module 5880 to provide for timing and conditions for launching of the additional standalone components, the additional standalone components may be implemented. Minimal programming resources are required to employ new functionality.

In an embodiment, the functionality of each module may be modified, and additional functionality within a module may be added, with no need to modify code of any other module, or to modify the common data format.

In an embodiment, different modules may share certain code. Shared code may relate to processes common to all modules, such as code related to display of data on a user interface in a consistent format. Shared code is code which is not affected by changes in one module, or the addition of an additional module.

In an embodiment, a system according to an embodiment, and any module, may receive data from and provide data to third party systems. In embodiments, a system and each module may receive data in electronic form via one or more networks from other system, and may format data for transmission in electronic form to one or more other networks. Each module may format data to be provided to printers as suitable forms; by way of example, the trading module may format trade data, and forward the formatted data to a printer for printing trade sheets in hard copy. The hard copy trade sheets may be faxed to fund companies. In another embodiment, the trading module may format trade data which is stored in printed form as files in pdf, jpeg, tiff or other image file formats, which files are then transmitted to fax machines, associated with receiving fax machine telephone data, and faxed to fund companies.

Data, such as pricing data, may be received in the form of structured faxes or other structured printed documents on paper. The printed documents may be scanned into image files, and optical character recognition performed on the image files to create data files. The data files may be processed and formatted in an appropriate common data format and caused to be stored in an appropriate common data format prior to being accessed by the system and one or more modules.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for management of data in funds holding financial investments, comprising:
   a processor;
   a memory storage device in communication with the processor;
   the processor configured to perform the following steps on a business day cycle:
   access a memory storage device having fund expense calculation data, perform verification of the fund expense calculation data and store in one of the memory storage devices verified fund expense data, and store at least a portion of the verified fund expense data in fund expense accounting journals;
   after completion of verification of the expense calculation data; receive data indicative of prices of the funds, perform verification with respect to the received price data, store the verified price data in one or more of the memory storage devices, and store at least a portion of the verified price data in fund price accounting journals;
   after completion of verification of the fund price data, receive data indicative of trades, perform verification on the received trade data, store verified trade data in at least one of the memory devices, and store at least a portion of the verified trade data in trade accounting journals;
   after completion of verification of the trade data, provide output signals indicative of instructions for execution of trades consistent with the verified price and trade data, and store at least a portion of the trade execution instructions data in trade instructions accounting journals;
   based on the trade instructions data, determine instructions for payment in settlement of trades, provide output signals indicative of the instructions for payment in settlement of trades, and store data comprising at least a portion of the instructions for payment in settlement of trades in settlement accounting journals; and
   access accounting ledgers stored in one or more of the memory storage devices and update the accounting ledgers with data from the accounting journals.

2. The system of claim 1, wherein the processor is further configured to, in the business day cycle, determining a calendar day prior to accessing the expense calculation data.

3. The system of claim 1, wherein the verification of the received price data includes applying verification rules on the received price data and generating user alerts responsive to violations of the verification rules.

4. The system of claim 3, wherein the processor is further configured to receive and store in the fund price accounting journals user comments to close the user alerts.

5. The system of claim 1, wherein the processor is further configured to complete processing of price files related to selected funds with priority, and to format the completed price files with priority for output.

6. The system of claim 1, wherein the processor is further configured to, generate instructions for payment only responsive to confirmation that trade processing has been completed.

7. A computer system for management of financial data relating to funds holding investments, comprising:
   a processor; and
   a memory storage device in communication with the processor;

the processor configured to:
perform the following steps on a business day cycle:
access a memory storage device having fund expense calculation data, perform verification of the fund expense calculation data and store in one of the memory storage devices verified fund expense data;
after completion of verification of the expense calculation data; receive data indicative of prices of the funds, perform verification with respect to the received price data, store the verified price data in one or more of the memory storage devices;
after completion of verification of the fund price data, receive data indicative of trades, perform verification on the received trade data, store verified trade data in at least one of the memory devices;
after completion of verification of the trade data, provide output signals indicative of instructions for execution of trades consistent with the verified price and trade data;
based on the trade instructions data, determine instructions for payment in settlement of trades, provide output signals indicative of the instructions for payment in settlement of trades; and
access accounting ledgers stored in one or more of the memory storage devices and update the accounting ledgers in accordance with data from the business day cycle.

8. The computer system of claim 7, further comprising a primary production database server and a secondary production database server in communication with the processor and a database in communication with the first and second database servers, the primary and secondary production database servers performing mirrored operations in normal operation, wherein, responsive to failure of one of primary and secondary production database servers, alterations in records as a result of any jobs in process at a time of failure are returned to a value immediately prior to the commencement of the in process jobs.

9. The computer system of claim 7, further comprising a load balancing server in communication with the processor.

10. The computer system of claim 9, further comprising a database server in communication with the processor and a storage area network in communication with the database server.

11. The computer system of claim 7, wherein the processor is further configured to display to a user a status of receipt of fund pricing data.

12. The computer system of claim 11, wherein the processor is further configured to display to a user a listing of data missing from fund pricing data.

13. The computer system of claim 7, wherein the processor is further configured to provide a user option to display fund pricing data on a fund by fund basis.

14. The computer system of claim 7, wherein the processor is further configured to determine and display to a user a comparison of a rate of return of each one of a plurality of funds to a market index rate of return.

15. The computer system of claim 7, wherein the processor is further configured to complete fund pricing calculations selectively based on holdings of recipients requiring data at relatively earlier times in the business day cycle.

16. A computer-implemented method for management of data relating to financial assets including funds holding investments, comprising:
accessing by a processor a memory storage device having fund expense calculation data, performing verification of the fund expense calculation data and storing in a memory storage device verified fund expense data;
after completion of verification of the expense calculation data, receiving by the processor data indicative of prices of the funds, performing by the processor verification with respect to the received price data, and storing by the processor the verified price data in one or more of the memory storage devices;
after completion of verification of the fund price data, receiving by the processor data indicative of trades, performing by the processor verification of the received trade data, and storing by the processor the verified trade data in at least one memory device;
after completion of verification of the trade data, providing by the processor output signals indicative of instructions for execution of trades consistent with the verified price and trade data;
based on the trade instructions data, determining by the processor instructions for payment in settlement of trades and providing output signals indicative of the instructions for payment in settlement of trades; and
accessing by the processor accounting ledgers stored in one or more of the memory storage devices and updating the accounting ledgers in accordance with data from a business day cycle.

17. The computer-implemented method of claim 16, wherein the steps of storing further comprise storing by a database server in communication with the processor.

18. The computer-implemented method of claim 16, further comprising, after receiving and verifying a portion of the pricing data, providing an output signal with data indicative of instructions to furnish the verified portion of the pricing data to a recipient.

19. The computer-implemented method of claim 18, further comprising, after receiving and verifying a remainder of the pricing data, providing an output signal with data indicative of instructions to furnish to the recipient a remainder of the pricing data for the recipient.

20. The computer-implemented method of claim 16, further comprising, in response to identifying discrepancies as a result of verification of the fund price data, providing user notification.

21. The computer-implemented method of claim 16, further comprising provide an output signal having data indicative of the verified price data.

22. The computer-implemented method of claim 21, wherein the output signal is received by a fax machine for fax transmission.

23. The computer-implemented method of claim 16, wherein the providing by the processor output signals indicative of instructions for execution of trades includes generation of trade files.

24. The computer-implemented method of claim 23, further comprising, in response to detecting a failure to pass a rule in one of the trade files, providing by the processor an output signal to provide an alert to a user.

25. The computer-implemented method of claim 24, further comprising, in response to user instructions to clear an error, storing data indicating that the error is cleared and storing data relating to the user instructions to clear the error.

26. A computer-readable medium having a plurality of instructions thereon for management of financial data, which instructions, when executed by a processor, cause the processor to:
access a memory storage device having fund expense calculation data, perform verification of the fund expense calculation data and store in one of the memory storage devices verified fund expense data;

after completion of verification of the expense calculation data; receive data indicative of prices of the funds, perform verification with respect to the received price data, store the verified price data in one or more of the memory storage devices;

after completion of verification of the fund price data, receive data indicative of trades, perform verification on the received trade data, store verified trade data in at least one of the memory devices;

after completion of verification of the trade data, provide output signals indicative of instructions for execution of trades consistent with the verified price and trade data;

based on the trade instructions data, determine instructions for payment in settlement of trades, provide output signals indicative of the instructions for payment in settlement of trades; and access accounting ledgers stored in one or more of the memory storage devices and update the accounting ledgers in accordance with data from a business day cycle.

27. The computer-readable medium of claim 26, wherein the instructions further cause the processor to, in response to receiving a user instruction to generate instructions for settlement of trades, determine whether a trading process using the trade data is completed and, responsive to determining that the trading process is not completed, provide an output signal having data to display an error message to the user.

28. The computer-readable medium of claim 26, wherein the instructions further cause the processor to receive user data indicative of changes to the trade data and to update the trade data in accordance with the received user data.

29. The computer-readable medium of claim 26, wherein the instructions further cause the processor to:

store at least a portion of the verified fund expense data in fund expense accounting journals; store at least a portion of the verified price data in fund price accounting journals; store at least a portion of the verified trade data in trade accounting journals; store at least a portion of the trade execution instructions data in trade instructions accounting journals; store data comprising at least a portion of the instructions for payment in settlement of trades in settlement accounting journals; and employ the accounting journals in the updating of the accounting ledgers.

30. A computer system for management of financial data relating to funds holding investments, comprising:

an expense module for accessing fund expense calculation data, performing verification of the fund expense calculation data and storing the verified fund expense data in a memory storage device;

a pricing module for receiving data indicative of prices of the funds, performing verification with respect to the received price data, and storing the verified price data in one or more memory storage devices;

a trading module for receiving data indicative of trades, performing verification on the received trade data, storing verified trade data in at least one of the memory devices, and for providing output signals indicative of instructions for execution of trades consistent with the verified price and trade data;

a settlement module for accessing the trade instructions data, determining instructions for payment in settlement of trades consistent with the trade instructions data, and providing output signals indicative of the instructions for payment in settlement of trades; and an accounting module for accessing accounting ledgers stored in one or more of the memory storage devices and updating the accounting ledgers in accordance with data from a business day cycle.

31. The computer system of claim 30, further comprising a rules module for maintaining and executing rules determining permissions for each of the modules to execute operations.

32. The computer system of claim 30, further comprising at least one printer for receiving formatted data from at least one of the modules and printing in accordance with the received formatted data.

33. The computer system of claim 32, wherein the formatted data is received from the trading module and causes the printer to print trade sheets.

34. A computer system for management of financial data relating to funds holding investments, comprising:

an expense module for accessing fund expense calculation data, performing verification of the fund expense calculation data and storing the verified fund expense data in a memory storage device;

a pricing module for receiving data indicative of prices of the funds, performing verification with respect to the received price data, and storing the verified price data in one or more memory storage devices;

a settlement module for accessing data indicative of instructions for execution of trades, determining instructions for payment in settlement of trades consistent with the trade instructions data, and providing output signals indicative of the instructions for payment in settlement of trades; and an accounting module for accessing accounting ledgers stored in one or more of the memory storage devices and updating the accounting ledgers in accordance with data from a business day cycle.

35. The computer system of claim 34, further comprising a rules module for maintaining and executing rules determining permissions for each of the modules to execute operations.

36. The computer system of claim 34, further comprising at least one printer for receiving formatted data from at least one of the modules and printing in accordance with the received formatted data.

37. A computer system for management of financial data relating to funds holding investments, comprising:

an expense module for accessing fund expense calculation data, performing verification of the fund expense calculation data and storing the verified fund expense data in a memory storage device;

a pricing module for receiving data indicative of prices of the funds, performing verification with respect to the received price data, and storing the verified price data in one or more memory storage devices;

a trading module for receiving data indicative of trades, performing verification on the received trade data, storing verified trade data in at least one of the memory devices, and for providing output signals indicative of instructions for execution of trades consistent with the verified price and trade data; and an accounting module for accessing accounting ledgers stored in one or more of the memory storage devices and updating the accounting ledgers in accordance with data from a business day cycle.

38. The computer system of claim 37, further comprising a rules module for maintaining and executing rules determining permissions for each of the modules to execute operations.

39. The computer system of claim 37, further comprising at least one printer for receiving formatted data from at least one of the modules and printing in accordance with the received formatted data.

* * * * *